US012631207B2

(12) United States Patent
Van Venrooy et al.

(10) Patent No.: US 12,631,207 B2
(45) Date of Patent: May 19, 2026

(54) VESSEL MOUNTING SYSTEM

(71) Applicant: AGILENT TECHNOLOGIES, INC.,
Santa Clara, CA (US)

(72) Inventors: Manuel Van Venrooy, Karlsruhe (DE);
Patrick Matz, Landau (DE); Alan Norman, Shrewsbury (GB)

(73) Assignee: AGILENT TECHNOLOGIES, INC.,
Santa Clara, CA (US)

( * ) Notice: Subject to any disclaimer, the term of this patent is extended or adjusted under 35 U.S.C. 154(b) by 850 days.

(21) Appl. No.: 17/969,584

(22) Filed: Oct. 19, 2022

(65) Prior Publication Data

US 2024/0133412 A1　　Apr. 25, 2024
US 2024/0229851 A9　　Jul. 11, 2024

(51) Int. Cl.
*F16B 21/06*　　(2006.01)
*F16B 21/04*　　(2006.01)

(52) U.S. Cl.
CPC ............ *F16B 21/065* (2013.01); *F16B 21/04* (2013.01); *F16B 2200/406* (2018.08)

(58) Field of Classification Search
CPC ... F16B 21/065; F16B 21/04; F16B 2200/406
See application file for complete search history.

(56) References Cited

U.S. PATENT DOCUMENTS

| | | | |
|---|---|---|---|
| 4,898,278 A | 2/1990 | Leoncavallo | |
| 8,687,299 B1 | 4/2014 | Sanford et al. | |
| 9,371,863 B2 | 6/2016 | Juh et al. | |
| 2002/0051734 A1 | 5/2002 | Dean | |
| 2003/0161764 A1 | 8/2003 | Itoh | |
| 2005/0123457 A1 | 6/2005 | Tajima | |
| 2010/0035336 A1 | 2/2010 | Inana | |
| 2011/0052102 A1 | 3/2011 | Stiers et al. | |
| 2015/0290640 A1 | 10/2015 | Goettke | |
| 2016/0210486 A1 | 7/2016 | Porreca | |
| 2021/0291169 A1 | 9/2021 | Laugharn, Jr. | |

FOREIGN PATENT DOCUMENTS

| | | |
|---|---|---|
| CN | 102590461 A | 7/2012 |
| CN | 209878731 U | 12/2019 |
| JP | 2019197050 A | 11/2019 |
| WO | 2013082208 A2 | 6/2013 |

OTHER PUBLICATIONS

International Search Report and Written Opinion for PCT Application No. PCT/US2023/033854, mailed Jan. 16, 2024, 11 pages.
US Office Action—U.S. Appl. No. 17/969,528—mailed Jul. 10, 2025—29 pages.
US Office Action—U.S. Appl. No. 17/969,564—mailed Jun. 18, 2025—31 pages.
US Office Action—U.S. Appl. No. 17/969,574—mailed Sep. 5, 2025—41 pages.
US Office Action—U.S. Appl. No. 17/969,564—mailed Nov. 7, 2025—33 pages.
US Office Action—U.S. Appl. No. 17/969,528—mailed Dec. 3, 2025, 2025—34 pages.

*Primary Examiner* — Jennifer Wecker
*Assistant Examiner* — Steven Ray Castaneda

(57) ABSTRACT

In some examples, a vessel mounting system may include a first collar and a second collar. The second collar may include a clip engageable with an edge of the first collar to engage the second collar with the first collar.

19 Claims, 43 Drawing Sheets

102

200

102

212

210

202

200

204

206

208

220
200

212

220
200
300

104

104

402

400

420

420 422 424

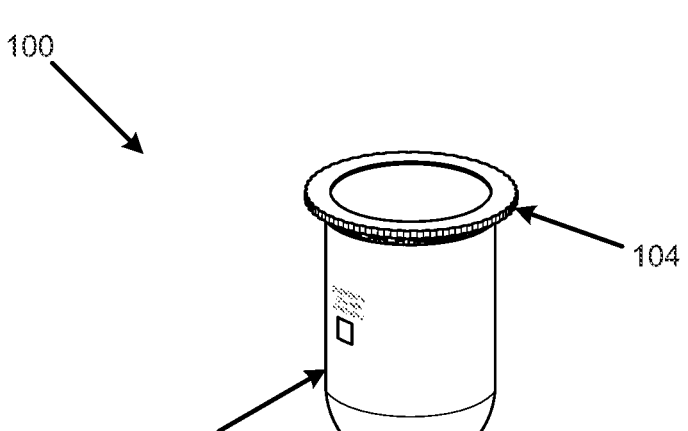
100
104
106
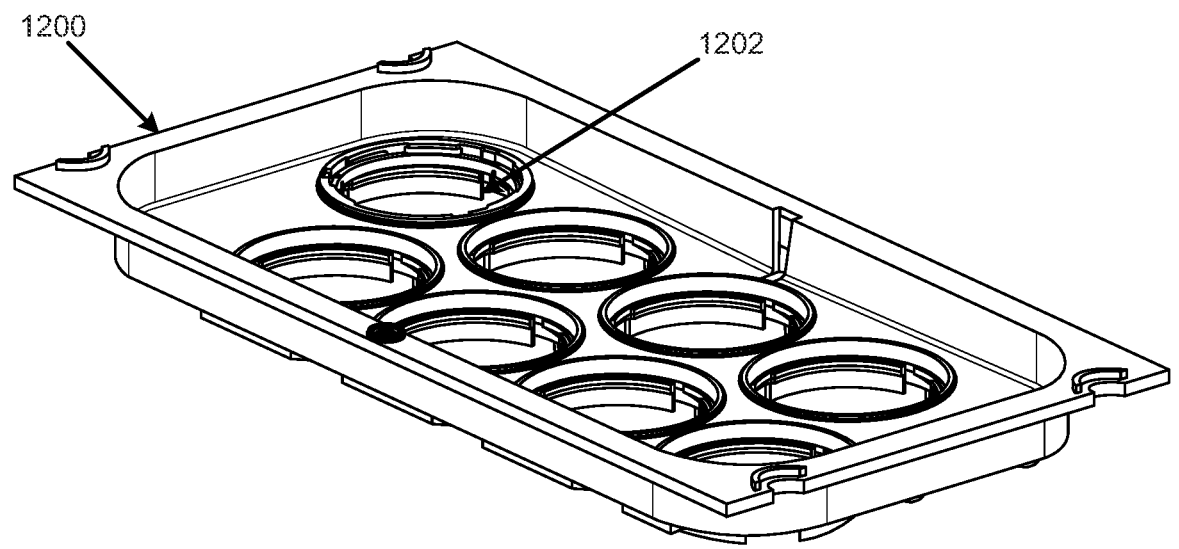
1200
1202
FIG. 12B

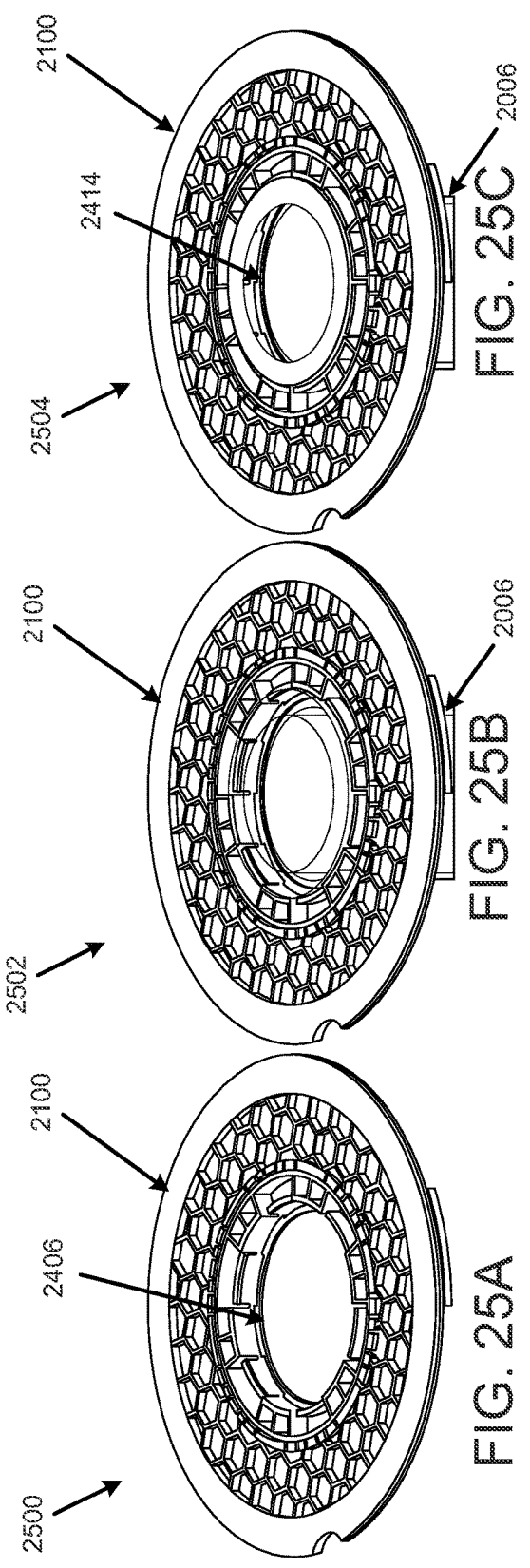
FIG. 25A
FIG. 25B
FIG. 25C
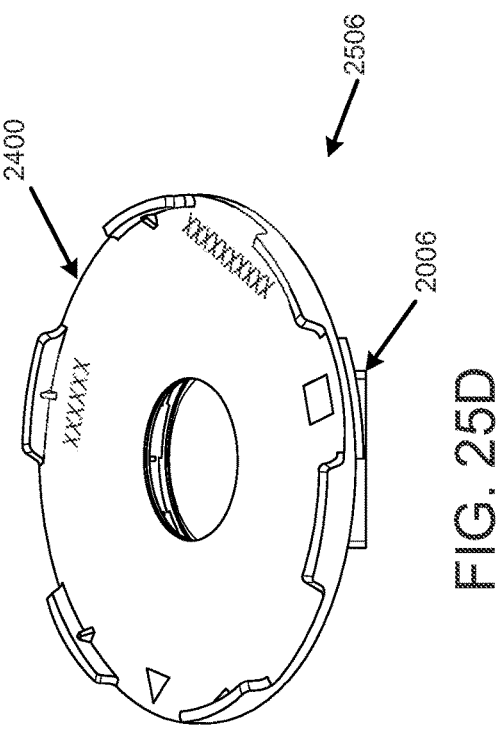
FIG. 25D

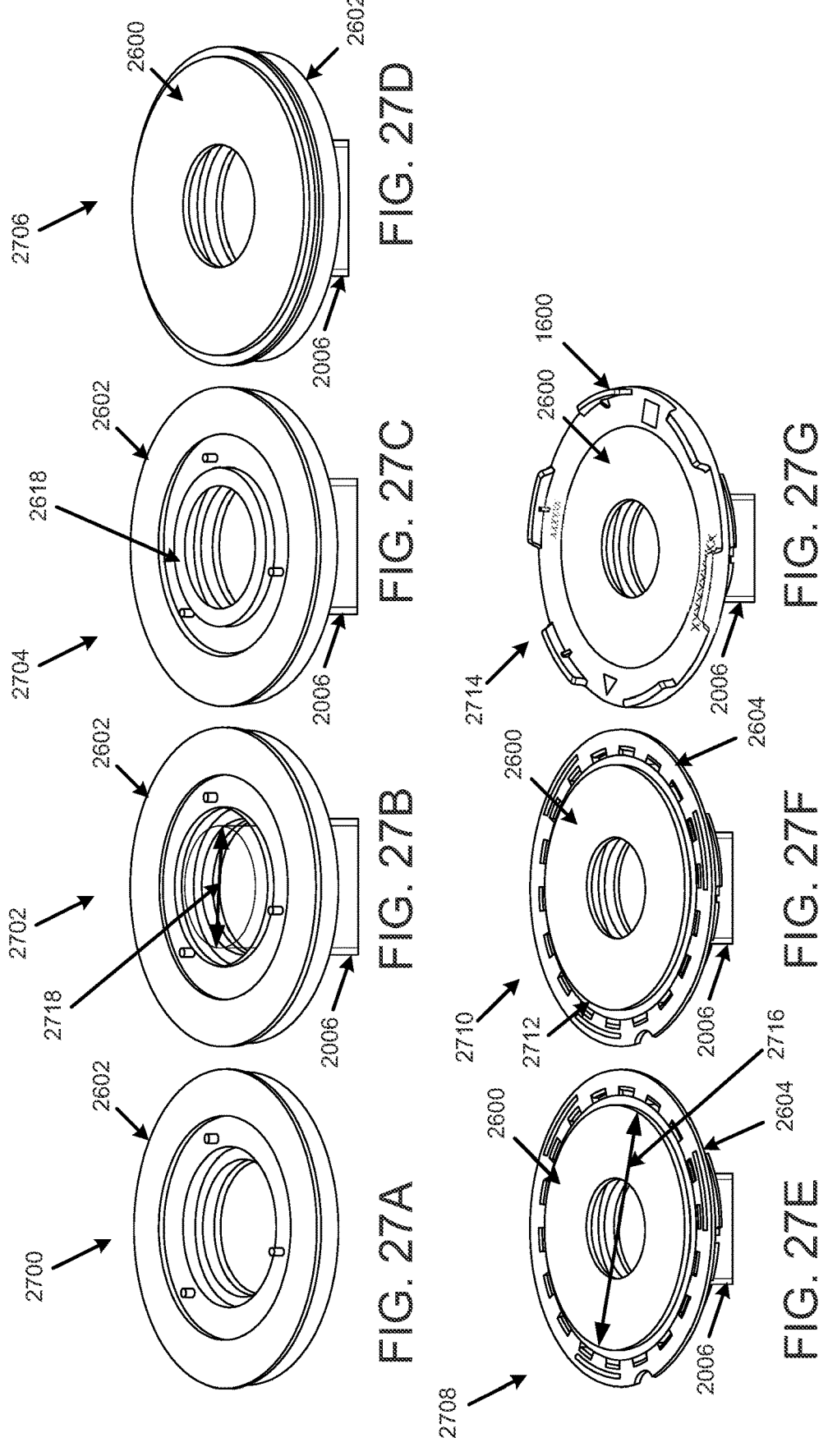

VESSEL MOUNTING SYSTEM

BACKGROUND

In certain types of tests, such as dissolution tests, a vessel, such as a dissolution vessel, may be utilized as part of a dissolution test apparatus to measure the extent and rate of solution formation from a specified dosage. The dissolution vessel may include different sizes and/or configurations depending on the type of dissolution test. Various factors, such as the orientation of the vessel in a dissolution test apparatus, the time and repeatability associated with mounting and dismounting of a vessel with respect to the dissolution test apparatus, etc., may impact, for example, dissolution test results, repeatability associated with a test, and overall time associated with a test.

BRIEF DESCRIPTION OF DRAWINGS

Features of the present disclosure are illustrated by way of example and not limited in the following figure(s), in which like numerals indicate like elements, in which:

FIG. 12B illustrates the vessel of FIG. 12A including first and second collars installed thereon, and the adapter installed onto the vessel holder, in accordance with an example of the present disclosure;

FIGS. 14A-14B illustrate isometric and top views of the adapter of FIG. 7B, in accordance with an example of the present disclosure;

Figures 18A, 18B, 18C:
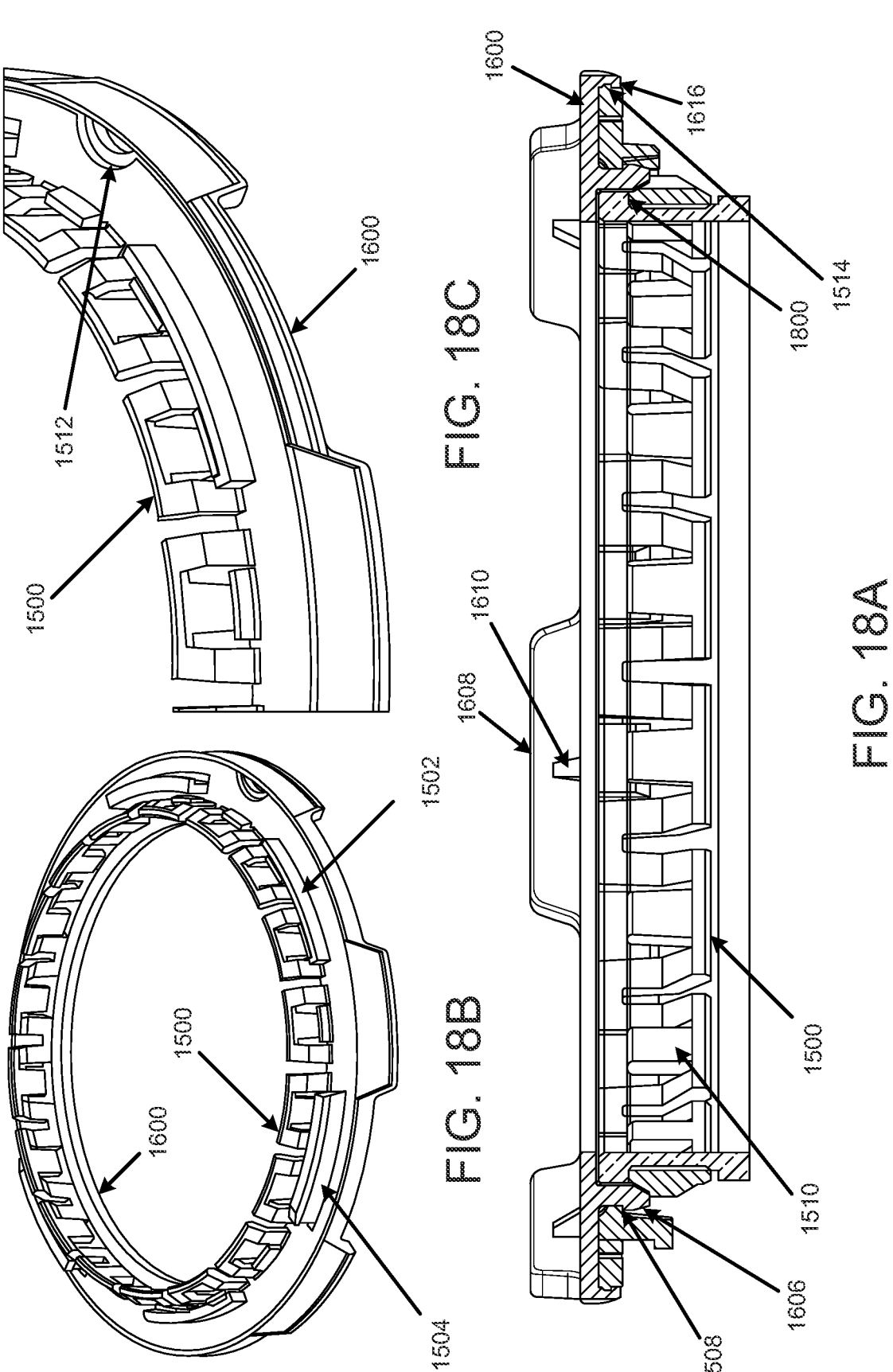
FIGS. 18A-18C illustrate isometric, isometric cutout, and side views of the first collar, the second collar, and the vessel with respect to the examples of FIGS. 15A-15C and 16A-
Figure 19:
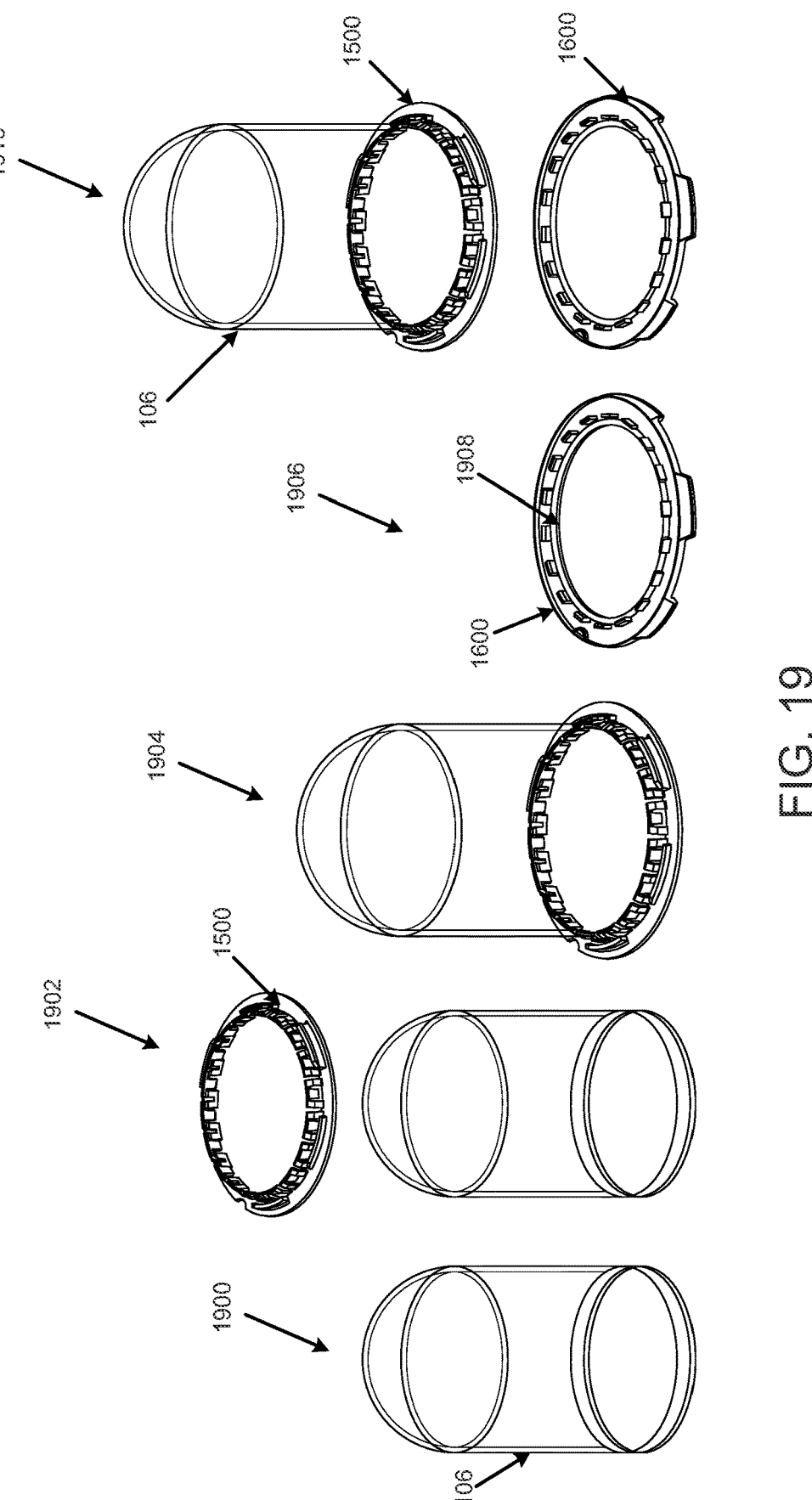
Figure 20:
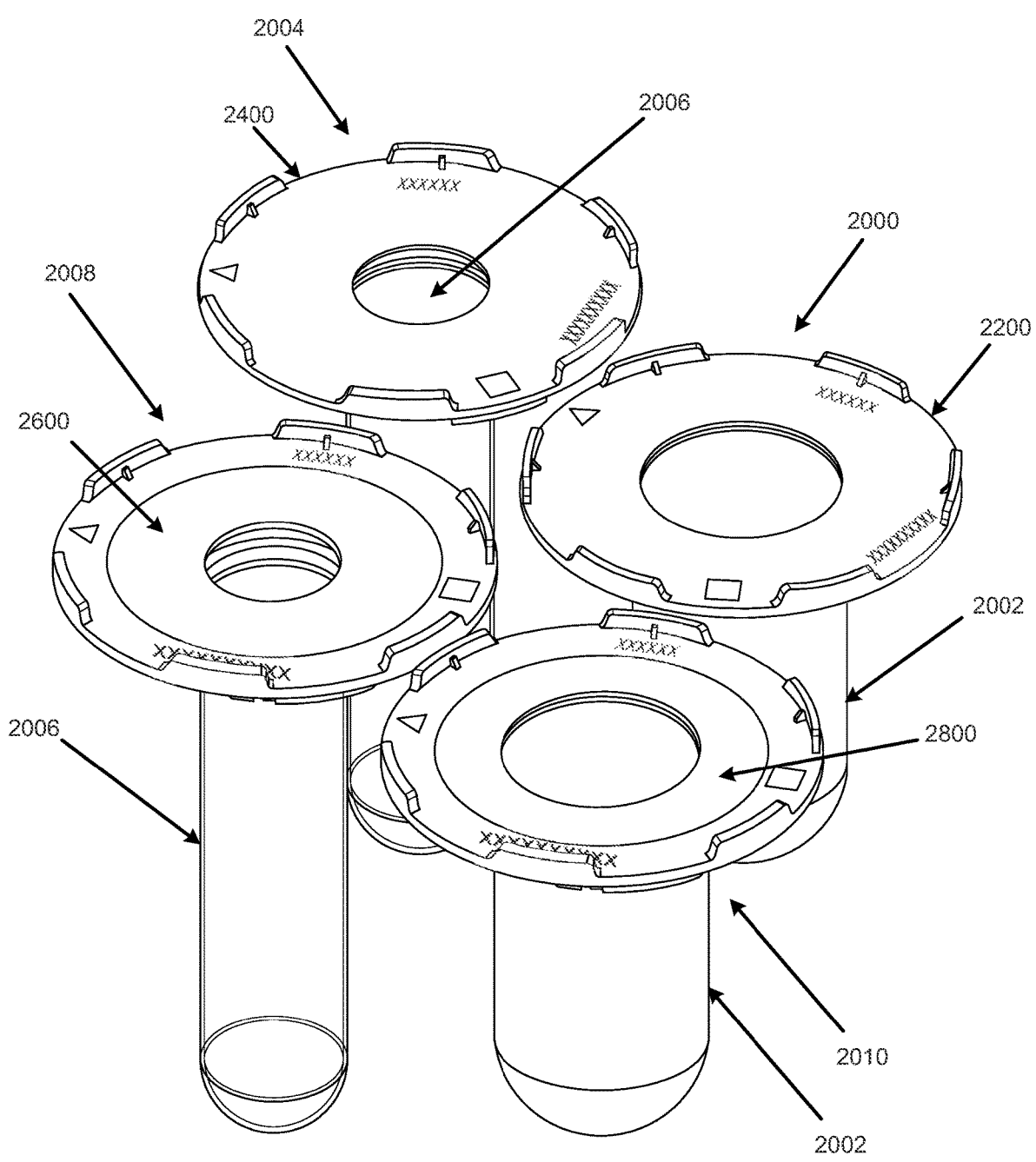
Figures 21A, 21B, 21C, 21D:
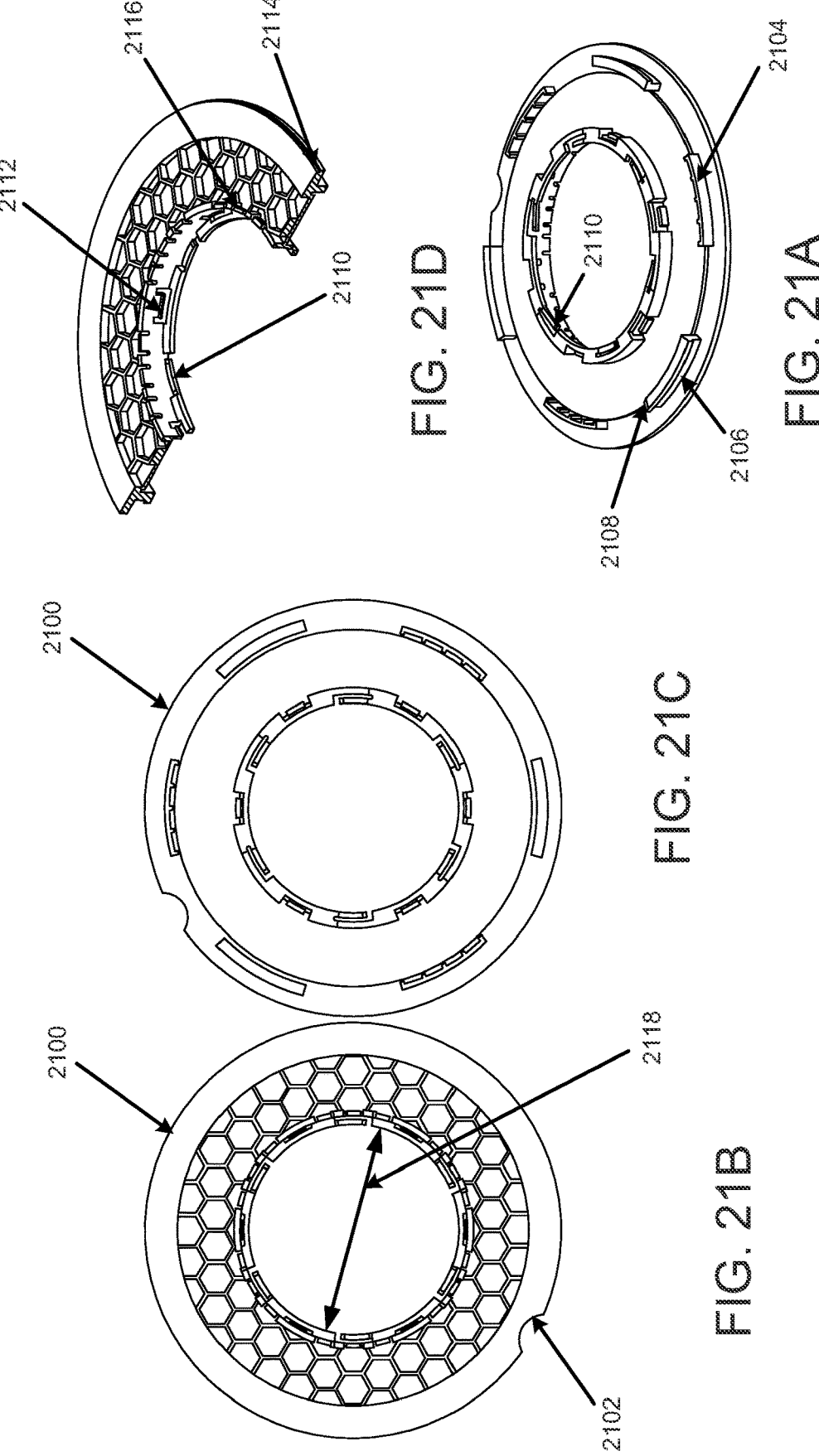
Figures 22A, 22B, 22C:
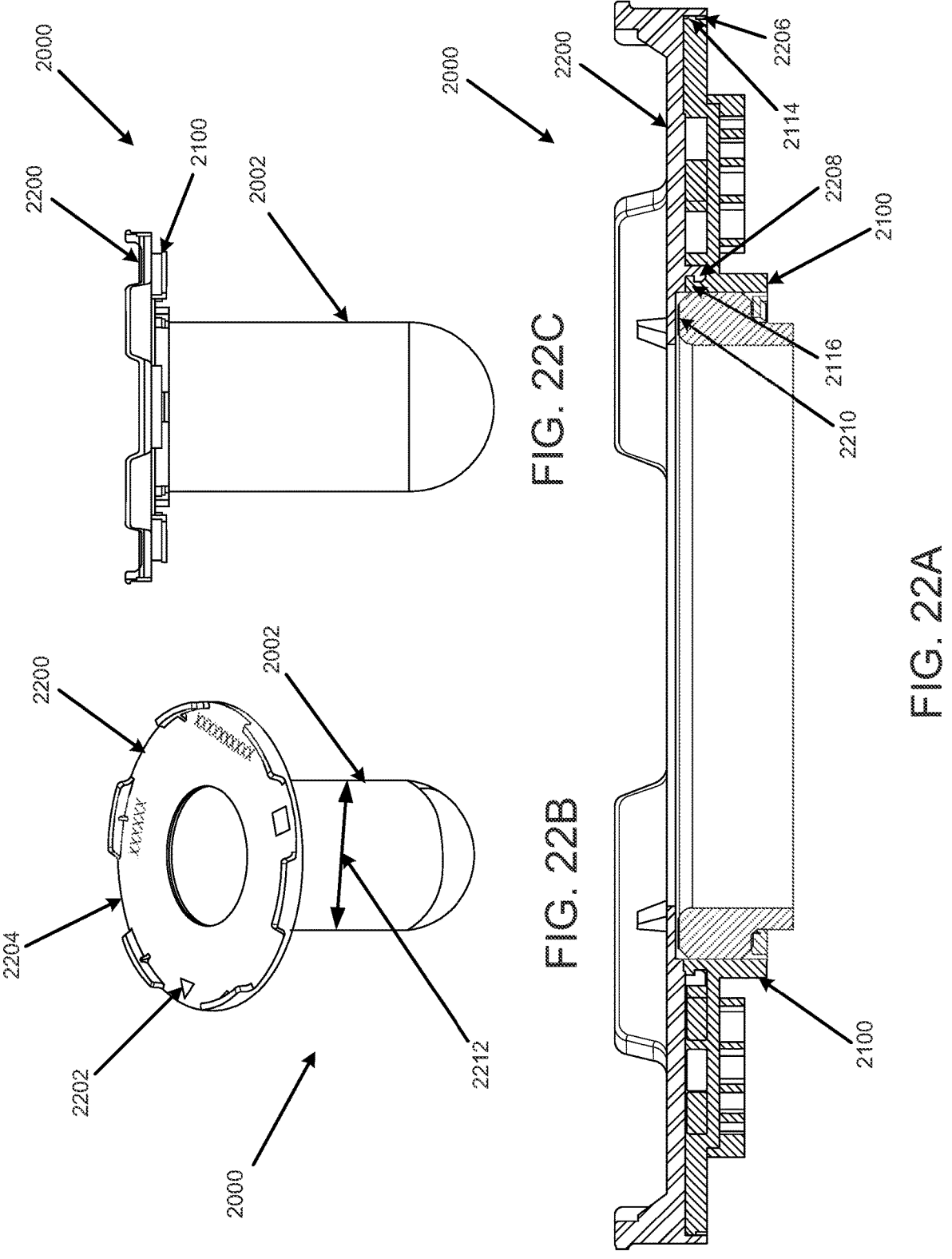
Figures 24A, 24B, 24C, 24D, 24E, 24F:
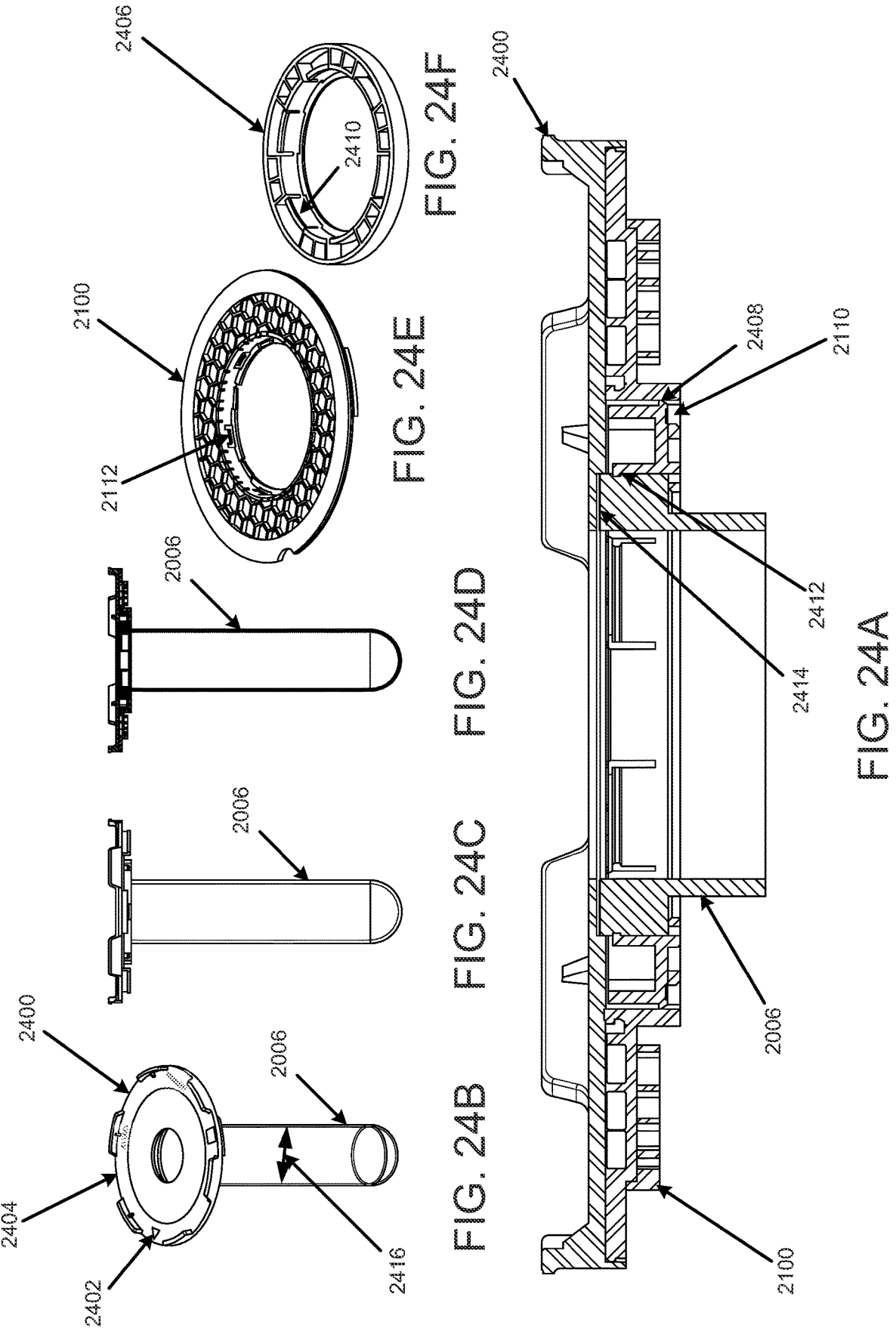

16C, illustrating alignment of the first collar and the second collar relative to the vessel, in accordance with an example of the present disclosure;

FIG. 19 illustrates assembly views of a vessel and the first and second collars of FIGS. 18A-18C, in accordance with an example of the present disclosure;

FIG. 20 illustrates isometric views of different configurations of the first and second collars of FIGS. 15A-15C and 16A-16C for different vessel sizes, in accordance with an example of the present disclosure;

FIGS. 21A-21D illustrate isometric, top, bottom, and isometric cutout views of another example of the first collar for a relatively small volume vessel, in accordance with an example of the present disclosure;

FIGS. 22A-22C illustrate side cutout, isometric and side views of the first collar of FIGS. 21A-21D and one of the second collars of FIG. 20 installed onto a relatively small volume vessel, in accordance with an example of the present disclosure;

FIGS. 23A-23D illustrate installment stages of the first collar of FIGS. 21A-21D and one of the second collars of FIG. 20, for installment onto a relatively small volume vessel, in accordance with an example of the present disclosure;

FIGS. 24A-24F illustrate side cutout, isometric and side views of the first collar of FIGS. 21A-21D, one of the second collars of FIG. 20, and a ring installed onto a relatively small volume vessel, in accordance with an example of the present disclosure;

FIGS. 25A-25D illustrate installment stages of the first collar and the adapter ring of FIGS. 24A-24C, and one of the second collars of FIG. 20, for installment onto a relatively small volume vessel, in accordance with an example of the present disclosure;

FIGS. 26A-26G illustrate side cutout, isometric and side views of another example of a first collar, one of the second collars of FIG. 20, and an example of a collar adapter installed onto a relatively small volume vessel, in accordance with an example of the present disclosure;

FIGS. 27A-27G illustrate installment stages of the first collar and the collar adapter of FIGS. 26A-26G, and one of the second collars of FIG. 20, for installment onto a relatively small volume vessel, in accordance with an example of the present disclosure;

FIGS. 28A-28G illustrate side cutout, isometric and side views of another example of a first collar, one of the second collars of FIG. 20, and another example of a collar adapter installed onto a relatively small volume vessel, in accordance with an example of the present disclosure; and FIGS. 29A-29G illustrate installment stages of the first collar and the collar adapter of FIGS. 28A-28G, and one of the second collars of FIG. 20, for installment onto a relatively small volume vessel, in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to tests, such as dissolution tests, a vessel, such as a dissolution vessel, may be utilized as part of a dissolution test apparatus to measure the extent and rate of solution formation from a specified dosage. As disclosed herein, various factors, such as the orientation of the vessel in a dissolution test apparatus, the time and repeatability associated with mounting and dismounting of a vessel with respect to the dissolution test apparatus, etc., may impact, for example, dissolution test results, repeatability associated with a test, and overall time associated with a test. In this regard, it is technically challenging to accurately and repeatedly mount a vessel into a vessel holder, and to adjust a vessel orientation (e.g., rotation, x/y/z direction placement with respect to inner and outer vessel surfaces, etc.) with respect to the vessel holder. It is also technically challenging to accurately and reliably retain, remove, and replace a vessel in a vessel holder.

In order to address at least the aforementioned technical challenges, a vessel mounting system is disclosed herein and may include a first collar with positioning and interlocking features for mounting onto vessels of different sizes. An adjustable adapter (e.g., receptacle) may be mounted in a vessel holder (e.g., vessel plate) for concentric positioning and interlocking of vessels of different sizes. The first collar may be referenced to a theoretical central axis of the vessel. For non-precision vessels (e.g., hand-formed vessels), this reference may be created by using a fixture. For high-precision vessels (e.g., vacuum-formed vessels), this reference may be created between the first collar and a groove. A vessel may include, for example, a 2-dimensional (2D) barcode (e.g., printed, etched, engraved, etc.), graphics, or other indicia generally for identification and recording of a specific vessel. The vessel may also include a standardized inner depth for freedom of vessel positioning.

The vessel mounting system may thus be less prone to error with respect to vessel mounting, testing, and dismounting. For example, the vessel mounting system may eliminate the need for vessel adjustment in the vessel holder due to precise vessel assembly and adapter adjustability. Moreover, the vessel mounting system may eliminate the need for additional adjustment of consumable height to a specific inner depth of the vessel.

The vessel mounting system may eliminate the need for marking of the position and orientation of a vessel. Further, the vessel mounting system may eliminate the need for clamps or clamping of the vessel onto a vessel holder. Different vessel sizes may be mounted in one single step without any additional parts. Vessels may be scanned with a barcode scanner for efficient and error proof identification.

The vessel mounting system may provide for efficient handling of vessels (e.g., based on fewer parts, reduced mounting effort, reduced documentation effort, etc.), and thus higher throughput and reduced downtime. Moreover, the vessel mounting system may provide for an efficient and cost-effective assembly process.

The vessel mounting system may minimize the impact on reproducibility of results, even if a few vessels are exchanged (e.g., due to breakage, cleaning, etc.).

The vessel mounting system may also provide a smart solution that may include automation (e.g., automatic scanning of all mounted accessories, consumables, etc.).

According to examples disclosed herein, the vessel mounting system may include a vessel collar that may be formed as two collars (e.g., rings) made, for example, from plastic or another such material. The collars may be denoted as a lower collar (e.g., a first collar) and an upper collar (e.g., a second collar). The collars may include two different versions suitable for non-precision (e.g., hand-formed) vessels and high precision (e.g., vacuum-formed) vessels. For vessels (e.g., non-precision and high-precision) that include a groove near a vessel opening, the first collar may be positioned with respect to the groove (e.g., snapped into place, without the need for gluing), and the second collar may be connected to first collar (e.g., by gluing, clipping, screwing, clamping, etc.).

For the vessel mounting system described above, the first collar may include positioning and interlocking features. For non-precision vessels, the positioning and interlocking features may be located in the second collar. For high-precision vessels, the positioning and interlocking features may be located in the first collar.

For the vessel mounting system described above, for non-precision vessels, an assembly fixture may be utilized to create a relationship between a vessel inner surface and collar parts to ensure precise alignment. For high-precision vessels, the assembly fixture is not needed.

For the vessel mounting system described above, for both non-precision and high-precision vessels, suitable glue (or another type of bonding material) may be utilized to permanently bind all of the parts together. In this regard, the adapter may be mounted and adjusted in the vessel holder during initial instrument assembly (e.g., to provide a precise relationship between a center of the adapter and a center of a spindle drive). The vessel may be placed in a vessel holder and interlocked by partial rotation of the vessel.

The vessel mounting system described above may eliminate the need to adjust a vessel in the x/y directions, and the clamping of the vessel to the vessel holder. The assembly process may be simplified in order to make it more efficient, repeatable, and cost effective. The vessel holder may receive the adapter that may be aligned in the vessel holder during instrument assembly. Alignment and interlocking of the vessel may take place between the adapter and the vessel assembly.

For the vessel mounting system described above, the separate part designs may provide for modification of one or more of the parts, without the need to modify a vessel design. Thus, variations in the design of the collars and the adapter may be implemented without the need to modify the vessel design, and thus procure new vessels.

For the vessel mounting system described above, due to the symmetrical design of various parts, the first collar may be self-centering on the vessel to allow for improved concentricity between the vessel, and the adapter and the vessel holder.

According to particular examples disclosed herein, the vessel mounting system may include a first collar including at least one protrusion engageable with a groove of a vessel to align the first collar relative to the vessel. A second collar may include at least one stud disposable in a corresponding aperture of the first collar to align the second collar relative to the first collar.

For the vessel mounting system described above, the second collar may include at least one clip engageable with at least one complementary tab of the first collar to align the second collar relative to the first collar.

For the vessel mounting system described above, the at least one protrusion may be formed between at least two extensions. The at least two extensions may include a gap for insertion of a bar of the second collar between adjacent extensions of the at least two extensions.

For the vessel mounting system described above, the first collar may include at least one positioning member to position the first collar relative to an adapter. The at least one positioning member may be insertable in at least one corresponding positioning opening of the adapter.

For the vessel mounting system described above, the first collar may include at least one interlocking member to lock the first collar to an adapter. The at least one interlocking member may be insertable in at least one corresponding interlocking opening of the adapter, and the at least one interlocking member may be lockable with at least one corresponding edge of the at least one corresponding interlocking opening.

For the vessel mounting system described above, the second collar may include indicia to indicate a locked or unlocked status of the second collar relative to further indicia on an adapter.

For the vessel mounting system described above, the first collar may include a cutout to receive a complementary shaped positioning member of the second collar to rotationally orient the first collar relative to the second collar.

According to further particular examples disclosed herein, a vessel mounting system may include a first collar including at least one protrusion engageable with a groove of a vessel to align the first collar relative to the vessel. A second collar may include at least one clip engageable with at least one complementary tab of the first collar to align the second collar relative to the first collar.

For the vessel mounting system described above, the second collar may include at least one stud disposable in a corresponding aperture of the first collar to align the second collar relative to the first collar.

According to yet further particular examples disclosed herein, a vessel mounting system may include an adapter including at least one positioning opening to receive at least one positioning member of a collar to position the collar relative to the adapter. The adapter may be mountable to a vessel to align the vessel relative to a vessel holder.

For the vessel mounting system described above, the adapter may further include at least one interlocking opening to receive at least one interlocking member of the collar, and the at least one interlocking member may be lockable with at least one corresponding edge of the at least one interlocking opening.

For the vessel mounting system described above, the adapter may include at least one adapter leg to mount the adapter to the vessel holder. The at least one adapter leg may include a hook-shaped portion that may be engageable with a catch of the vessel holder when the adapter is rotated relative to the vessel holder.

The vessel mounting system described above may further include a lifting guide including a tapered section to lift, based on engagement of a chamfered area of the collar with the tapered section, the collar relative to the adapter.

According to yet further particular examples disclosed herein, a vessel mounting system may include a first collar and a second collar. The second collar may include at least one positioning member to position the second collar relative to the first collar, and the second collar may include at least one interlocking member to lock the second collar to the first collar.

For the vessel mounting system described above, the at least one positioning member may be insertable in at least one corresponding positioning opening of the first collar.

Similarly, the at least one interlocking member may be insertable in at least one corresponding interlocking opening of the first collar.

For the vessel mounting system described above, the at least one interlocking member may include a hook-shaped portion to lock the second collar to the first collar.

For the vessel mounting system described above, the at least one interlocking member may be lockable with at least one corresponding edge of at least one corresponding interlocking opening of the first collar.

For the vessel mounting system described above, the second collar may include at least one flange that protrudes in a direction that is generally opposite to a direction of protrusion of the at least one interlocking member to grip the second collar.

For the vessel mounting system described above, the first collar may include a central opening that is sized to at least partially receive a vessel. Similarly, the second collar may include a central opening that is sized to at least partially receive a vessel.

The vessel mounting system described above may further include a clamp to fix the first collar and the second collar in a specified engaged position.

According to yet further particular examples disclosed herein, a vessel mounting system may include a first collar and a second collar mountable to a vessel. The second collar may include at least one positioning member to position the second collar relative to the first collar. Further, the second collar may include at least one interlocking member to lock the second collar to the first collar, and to retain the first and second collars to the vessel.

According to yet further particular examples disclosed herein, a vessel mounting system may include a first collar and a second collar mountable to a vessel. The second collar may include at least one positioning member to position the second collar relative to the first collar. Further, the second collar may include at least one interlocking member to retain the first and second collars to the vessel.

According to yet further particular examples disclosed herein, a vessel mounting system may include a first collar including at least one flexible member engageable with a groove of a vessel to align the first collar relative to the vessel. A second collar may include at least one clip engageable with a complementary clip of the first collar to engage the second collar with the first collar.

For the vessel mounting system described above, the second collar may include indicia to indicate a locked or unlocked status of the second collar relative to further indicia on an adapter.

For the vessel mounting system described above, the first collar may include a cutout to receive a complementary shaped positioning member of the second collar to rotationally orient the first collar relative to the second collar.

For the vessel mounting system described above, the first collar may include at least one positioning member to position the first collar relative to an adapter. In this regard, the at least one positioning member may be insertable in at least one corresponding positioning opening of the adapter.

For the vessel mounting system described above, the first collar may include at least one interlocking member to lock the first collar to an adapter. In this regard, the at least one interlocking member may be insertable in at least one corresponding interlocking opening of the adapter. The at least one interlocking member may be lockable with at least one corresponding edge of the at least one corresponding interlocking opening.

For the vessel mounting system described above, the first collar may include at least one finger engageable with the vessel to push the vessel towards the second collar.

For the vessel mounting system described above, the second collar may include at least one undercut engageable with a ribbed area of the first collar to grip the first collar.

For the vessel mounting system described above, the first collar may include a specified opening diameter for the vessel that includes a specified diameter. Further, the at least one flexible member may be engageable with an adapter ring to permit engagement of the first collar with another vessel that includes a diameter that is less than the specified diameter.

According to yet further particular examples disclosed herein, a vessel mounting system may include a first collar and a second collar. The second collar may include a clip engageable with an edge of the first collar to engage the second collar with the first collar.

For the vessel mounting system described above, the second collar may include indicia to indicate a locked or unlocked status of the second collar relative to further indicia on an adapter.

For the vessel mounting system described above, the first collar may include a cutout to receive a complementary shaped positioning member of the second collar to rotationally orient the first collar relative to the second collar.

For the vessel mounting system described above, the first collar may include at least one positioning member to position the first collar relative to an adapter. In this regard, the at least one positioning member may be insertable in at least one corresponding positioning opening of the adapter.

For the vessel mounting system described above, the first collar may include at least one interlocking member to lock the first collar to an adapter. In this regard, the at least one interlocking member may be insertable in at least one corresponding interlocking opening of the adapter. Further, the at least one interlocking member may be lockable with at least one corresponding edge of the at least one corresponding interlocking opening.

For the vessel mounting system described above, the second collar may include at least one undercut engageable with a ribbed area of the first collar to grip the first collar.

For the vessel mounting system described above, the first collar may include a specified opening diameter for a vessel that includes a specified diameter. The vessel mounting system may further include a collar adapter engageable with the first collar and/or the second collar to retain another vessel that includes a diameter that is less than the specified diameter. Further, the collar adapter may include a flexible portion for concentric alignment of the another vessel. The collar adapter may represent a first collar adapter, and the vessel mounting system may further include a second collar adapter engageable with the first collar adapter by at least one alignment member to seal a portion of the another vessel.

Figures 1A, 1B, 1C:
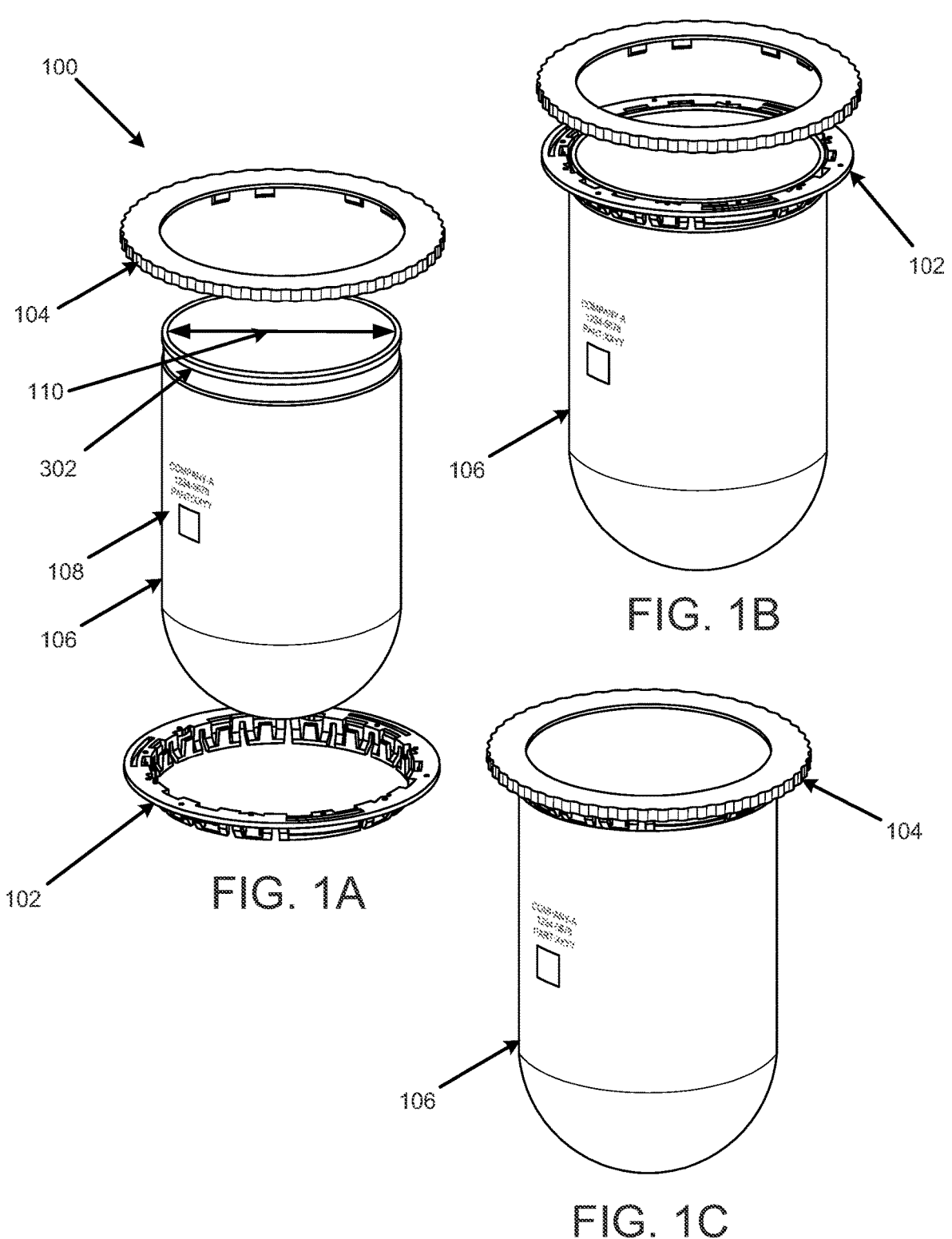
FIGS. 1A-1C illustrate isometric views of a vessel mounting system, including a first collar, a second collar, and a vessel, respectively, in disassembled, partially assembled, and assembled configurations, in accordance with an example of the present disclosure.

FIGS. 1A-1C illustrate isometric views of a vessel mounting system 100, including a first collar 102, a second collar 104, and a vessel 106, respectively, in disassembled, partially assembled, and assembled configurations, in accordance with an example of the present disclosure.

Figure 2A:
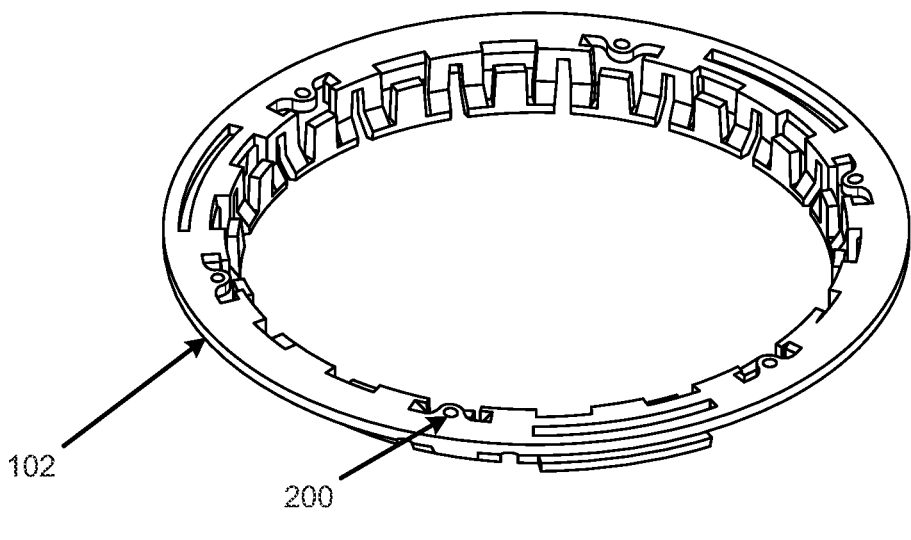
FIGS. 2A-2B illustrate isometric views of an example of the first collar including at least one aperture and at least one tab to align the second collar relative to the first collar, in accordance with an example of the present disclosure.
Figure 2B:
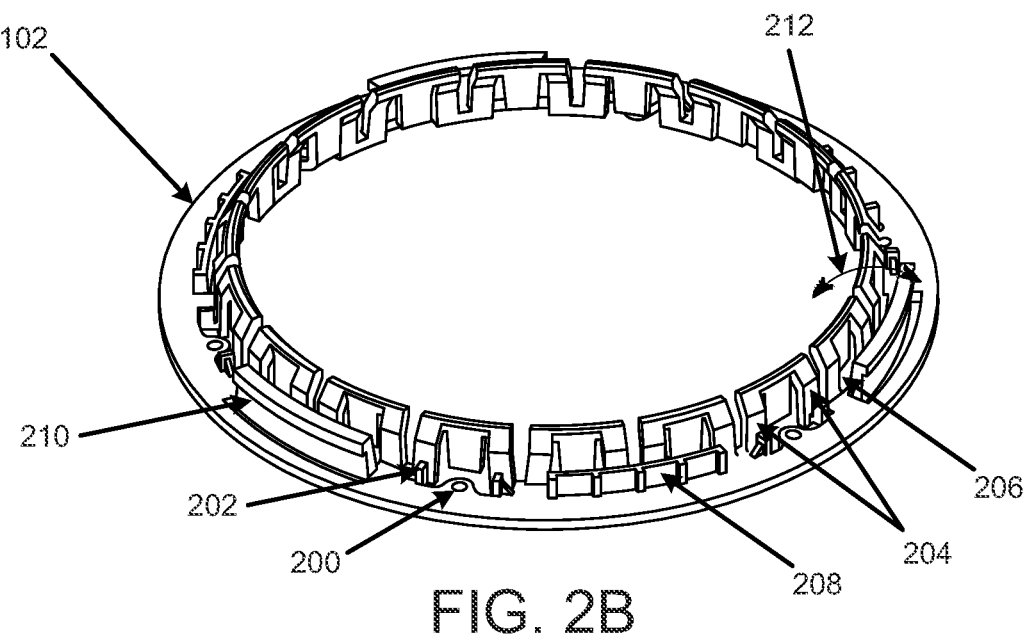
Figure 2C:
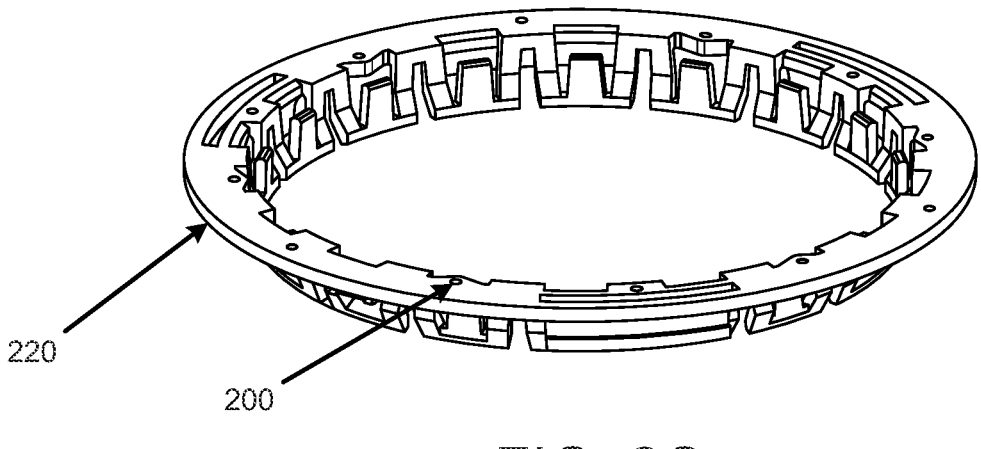
FIGS. 2C-2D illustrate isometric views of another example of the first collar including at least one aperture to align the second collar relative to the first collar, in accordance with an example of the present disclosure.
Figure 2D:
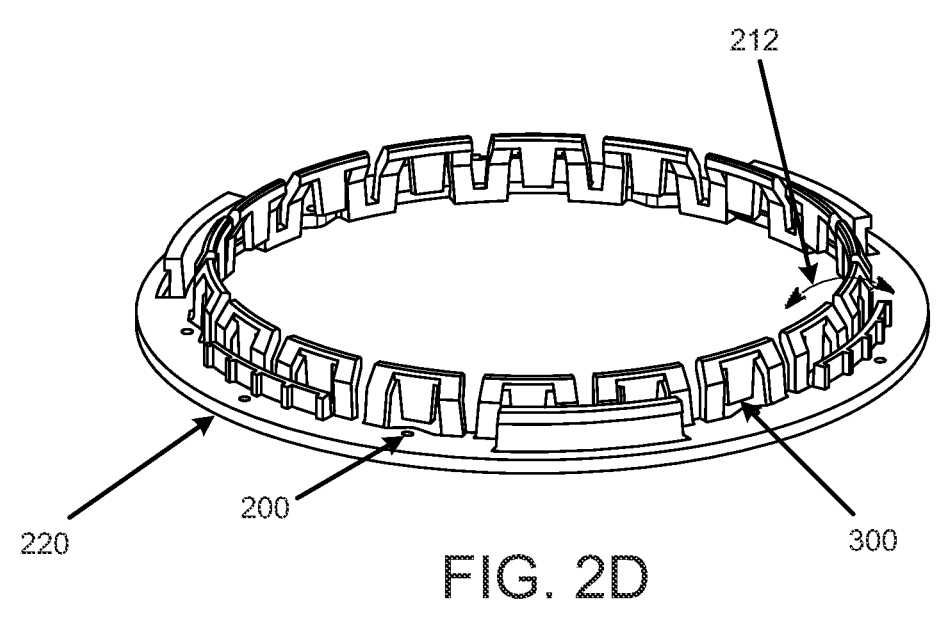

FIGS. 2A-2B illustrate isometric views of an example of the first collar 102 including at least one aperture 200 and at least one tab 202 to align the second collar 104 relative to the first collar 102, in accordance with an example of the present disclosure. FIGS. 2C-2D illustrate isometric views of another example of the first collar 102 (e.g., denoted first collar 220) including at least one aperture 200 to align a second collar 420 (e.g., see FIG. 4D) relative to the first collar 220, in accordance with an example of the present disclosure. Thus, compared to the example of FIGS. 2A-2B that includes at least one aperture 200 and at least one tab 202, the example of FIGS. 2C-2D eliminates the at least one tab 202 and instead includes at least one aperture 200 to align the second collar 420 relative to the first collar 220. Alternatively, the first collar 102 may include at least one tab 202 (without the at least one aperture 200) to align the second collar 104 relative to the first collar 102.

Figure 3A:
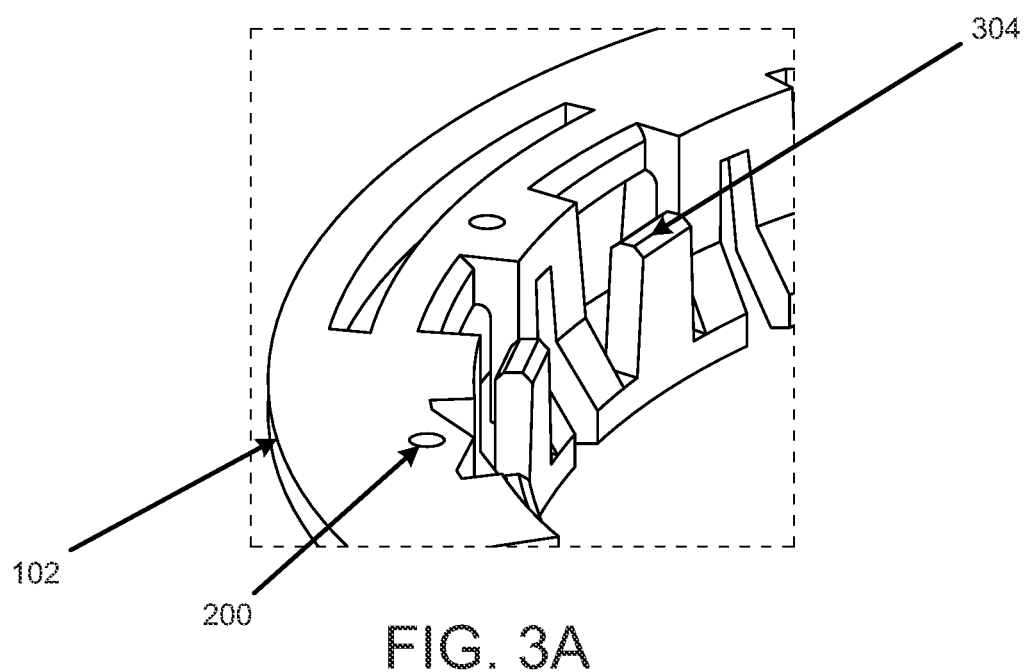
FIGS. 3A-3B illustrate isometric cutout views of the first collar and the vessel with respect to the example of FIGS. 2C-2D, illustrating engagement of at least one protrusion with at least one groove of the vessel to align the first collar relative to the vessel, in accordance with an example of the present disclosure.
Figure 3B:
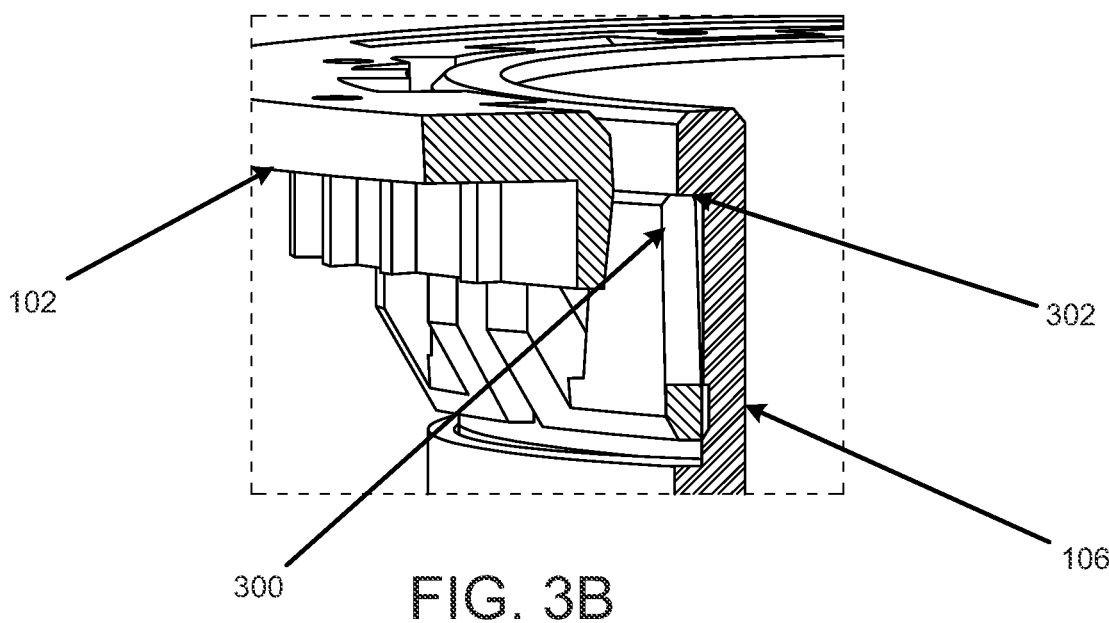

FIGS. 3A-3B illustrate isometric cutout views of the first collar 102 and the vessel 106 with respect to the example of FIGS. 2C-2D, illustrating engagement of at least one protrusion 300 with at least one groove 302 of the vessel 106 to align the first collar 220 (and similarly the first collar 102) relative to the vessel 106, in accordance with an example of the present disclosure.

Figure 4A:
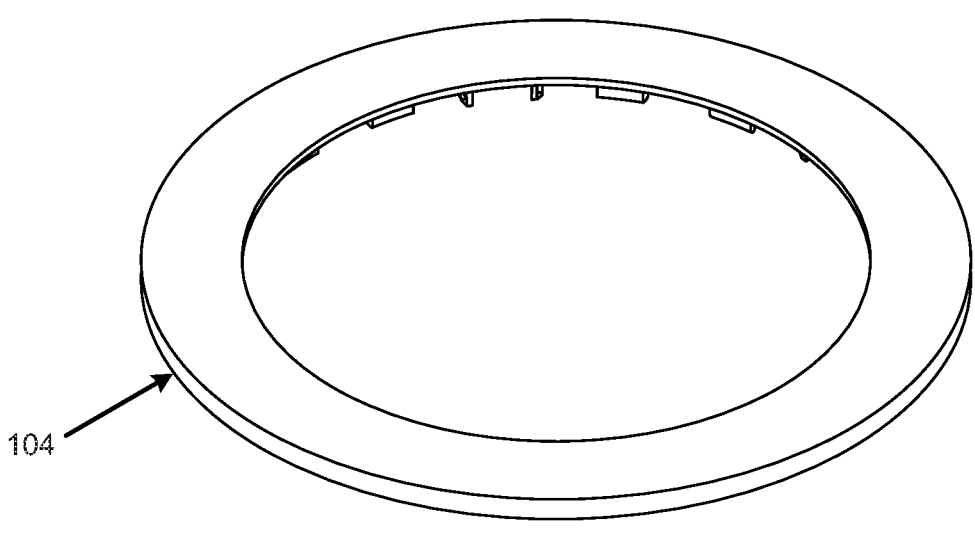
FIGS. 4A-4B illustrate isometric views of an example of the second collar including at least one stud and at least one clip to align the second collar relative to the first collar, in accordance with an example of the present disclosure.
Figure 4B:
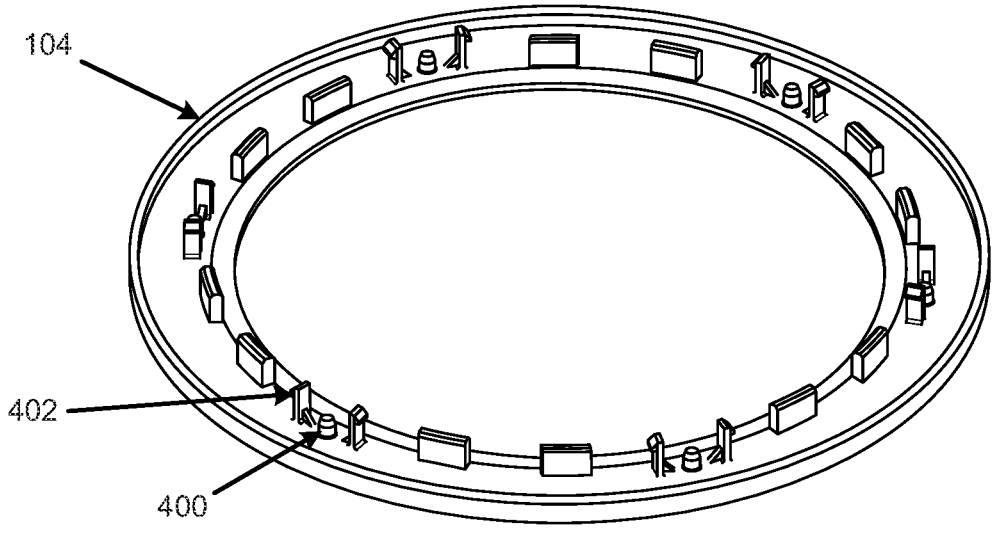

FIGS. 4A-4B (corresponding to the configuration of FIGS. 2A-2B) illustrate isometric views of an example of the second collar 104 including at least one stud 400 and at least one clip 402 to align the second collar 104 relative to the first collar 102, in accordance with an example of the present disclosure. Further, FIGS. 4C-4D (corresponding to the configuration of FIGS. 2C-2D) illustrate isometric views of another example of the second collar 420 including at least one stud 400 (without the at least one clip 402) to align the second collar 420 relative to the first collar 220, in accordance with an example of the present disclosure. Alternatively, the second collar 104 may include at least one clip 402 (without the at least one stud 400) to align the second collar 104 relative to the first collar 102, in accordance with an example of the present disclosure.

Referring to FIGS. 1A-4D, and particularly FIGS. 1A, 2B, 3B, and 4B, the vessel mounting system 100 may include the first collar 102 including at least one protrusion 300 engageable with a groove 302 of the vessel 106 to align the first collar 102 relative to the vessel 106. The at least one protrusion 300 may include a surface 304 that contacts the groove 302 of the vessel 106. The groove 302 of the vessel 106 may serve as a reference relative to the at least one protrusion 300.

A second collar 104 may include at least one stud 400 disposable in a corresponding aperture 200 of the first collar 102 to align the second collar 104 relative to the first collar 102.

Referring to FIGS. 1A, 2B, and 3B, the vessel 106 may include the groove 302 for receiving the at least one protrusion 300 of the first collar 102. For certain vessels (e.g., where a vessel volume is less than 1 L), a groove may not be suitable (e.g., due to insufficient wall thickness). In this regard, a flange or another feature may be provided on the vessel 106 to receive the protrusion or another feature of the first collar 102.

The vessel 106 may include human readable and machine readable indicia 108 that may include, for example, a part and unique serial number for identification of the vessel and/or an associated test. For example, the human readable and machine readable indicia 108 may be readable by a device, such as, an instrument barcode scanner. The information provided in the indicia 108 may be utilized, for example, for data-logging, during production, for inspection, and/or for certification processes.

In some examples, the vessel 106 may be formed as a glass body, for example, from Borosilicate glass, or another such material. The vessel 106 may be hand formed, for example, from am extruded glass tube, or vacuum formed for added precision.

The groove 302 may provide a surface that is concentric to the inner surface of the vessel 106. The groove 302 may also be formed as an undercut or a step that sits on at least one extrusion of the first collar 102.

As shown in FIGS. 1A, 2B, and 4B, the second collar 104 may include at least one clip 402 engageable with at least one complementary tab 202 of the first collar 102 to align the second collar 104 relative to the first collar 102.

Figure 4C:
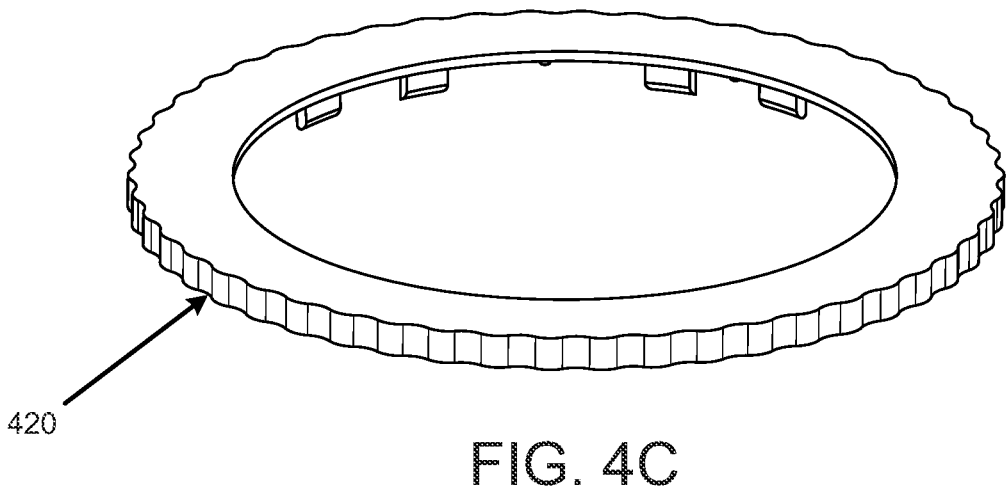
FIGS. 4C-4D illustrate isometric views of another example of the second collar including at least one stud to align the second collar relative to the first collar, in accordance with an example of the present disclosure.

Referring to FIGS. 4A and 4C, the second collar 104 and the second collar 420, respectively, may include a profiled shape for facilitating gripping thereof. For example, the profiled shape may include knurls to facilitate gripping of the second collar 104 and the second collar 420.

Figure 4D:
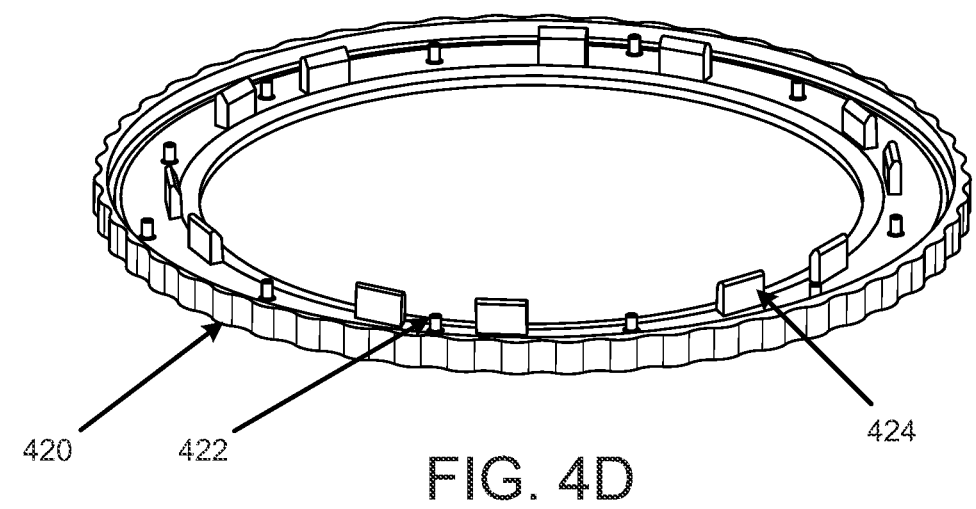
Figures 5A, 5B, 5C:
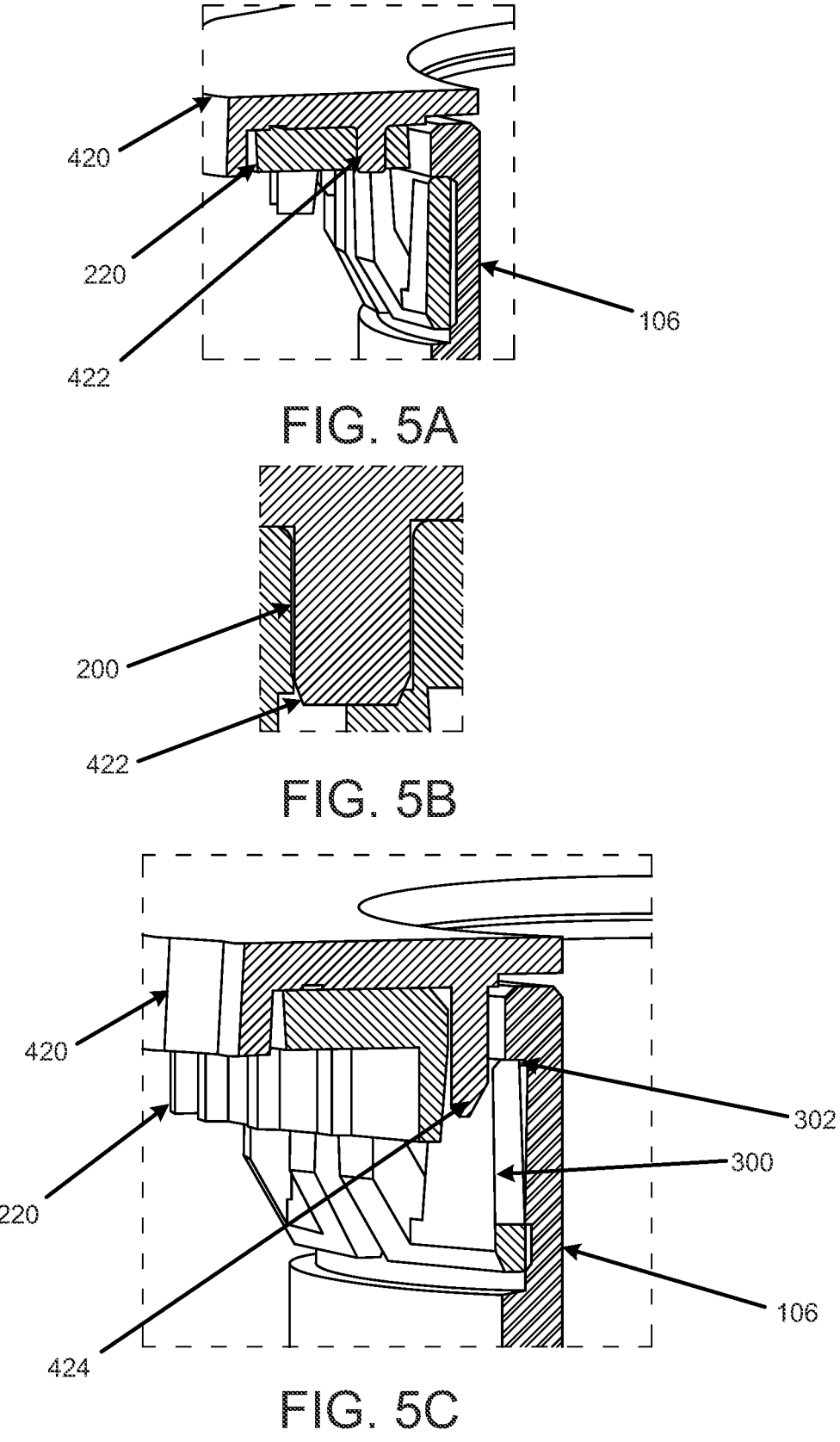
FIGS. 5A-5C illustrate isometric cutout views of the first collar, the second collar, and the vessel with respect to the example of FIGS. 4C-4D, illustrating engagement of the protrusion with the groove of the vessel to align the first collar relative to the vessel, in accordance with an example of the present disclosure.

FIGS. 5A-5C illustrate isometric cutout views of the first collar 220, the second collar 420, and the vessel 106 with respect to the example of FIGS. 4C-4D, illustrating engagement of the protrusion 300 with the groove 302 of the vessel 106 to align the first collar 220 relative to the vessel 106, in accordance with an example of the present disclosure.

Referring to FIGS. 4C, 4D, 5A, and 5B, at least one stud 422 (similar to stud 400) may be press-fit in a corresponding aperture 200 to align the first collar 220 relative to the second collar 420. Further, as shown in FIG. 5C, at least one clip locker 424 may be positioned as shown, and prevented from moving backwards away from the protrusion 300. The at least one clip locker 424 may hold the protrusion 300 in place to thus provide a secure fit onto the vessel 106.

Figure 6:
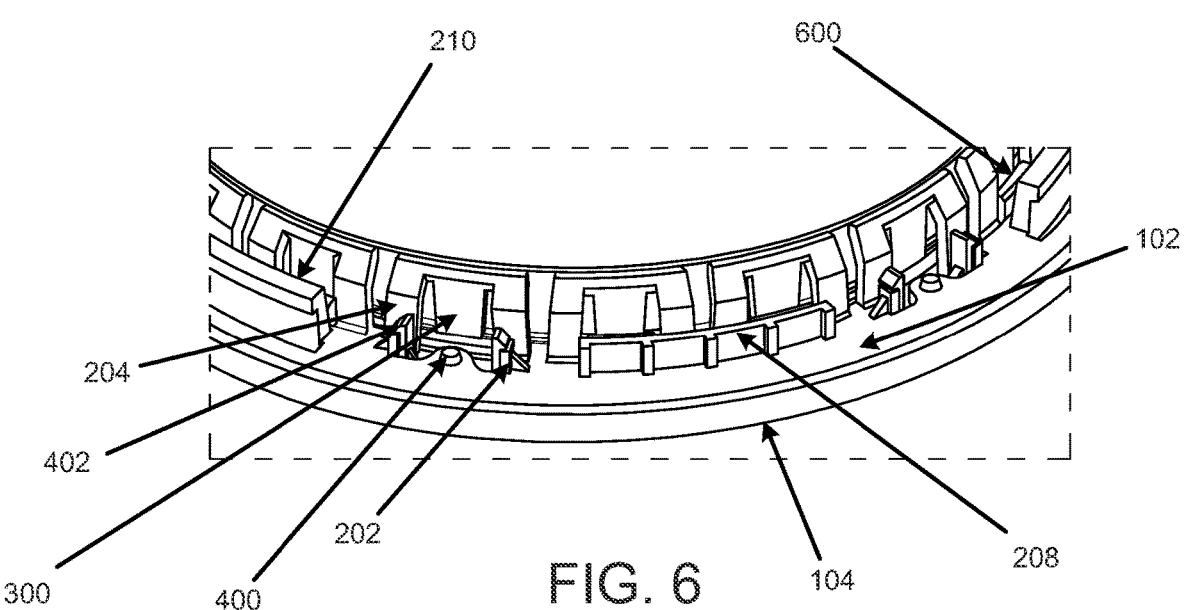
FIG. 6 illustrates an isometric cutout view of the first collar, the second collar, and the vessel, illustrating engagement of the at least one stud and the at least one clip, respectively with the at least one aperture and the at least one tab, to align the second collar relative to the first collar, in accordance with an example of the present disclosure.

FIG. 6 illustrates an isometric cutout view of the first collar 102, the second collar 104, and the vessel 106, illustrating engagement of the at least one stud 400 and the at least one clip 402, respectively with the at least one aperture 200 and the at least one tab 202, to align the second collar 104 relative to the first collar 102, in accordance with an example of the present disclosure.

As shown in FIGS. 1A, 2B, 3B, and 6, the at least one protrusion 300 may be formed between at least two extensions 204. The at least two extensions 204 may include a gap 206 for insertion of a bar 600 of the second collar 104 between adjacent extensions of the at least two extensions 204. The at least two extensions 204 may be flexible as shown by the arrows 212 to provide adjustment for variations in a vessel outer diameter, as well as to provide a relatively tight fit of the first collar 102 onto the vessel 106. The bar 600 may prevent the protrusion 300 from slipping away from the groove 302.

Figure 7A:
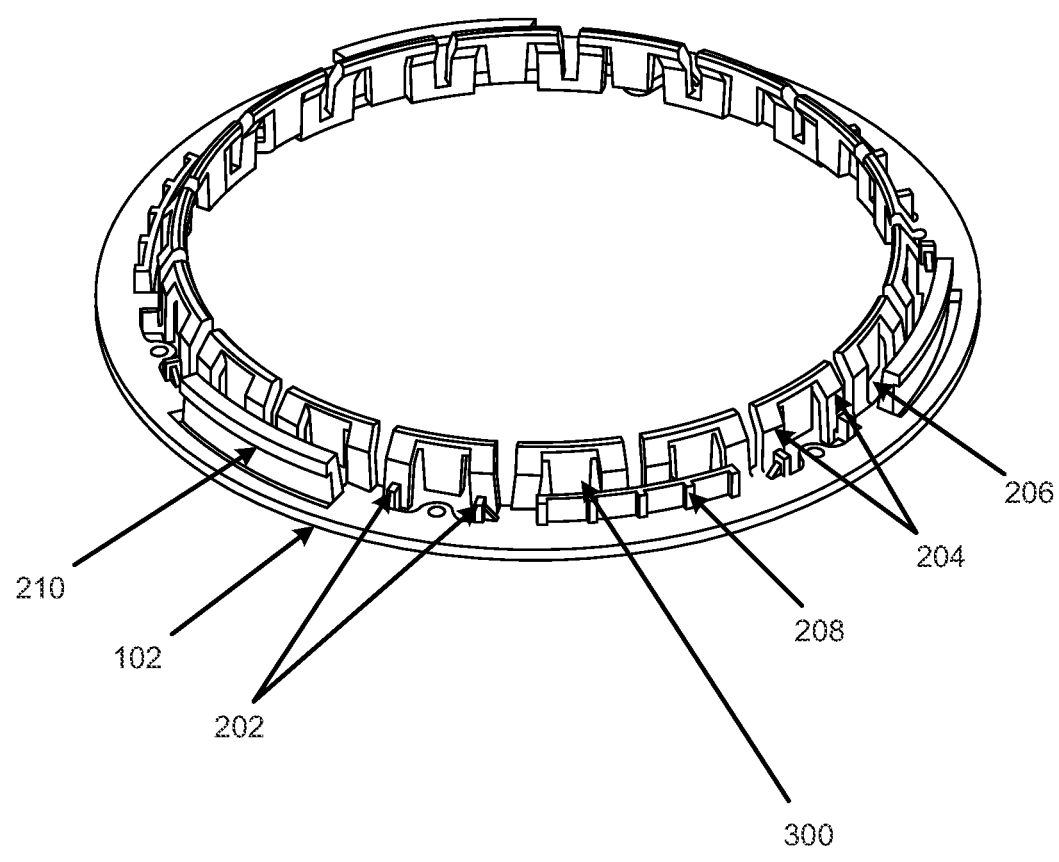
FIGS. 7A-7C illustrate isometric views of the first collar, an adapter, and another example of a second collar, and various features of the first collar, the adapter, and the another example of the second collar for positioning of the first collar and the second collar, respectively, relative to the adapter, in accordance with an example of the present disclosure.
Figure 7B:
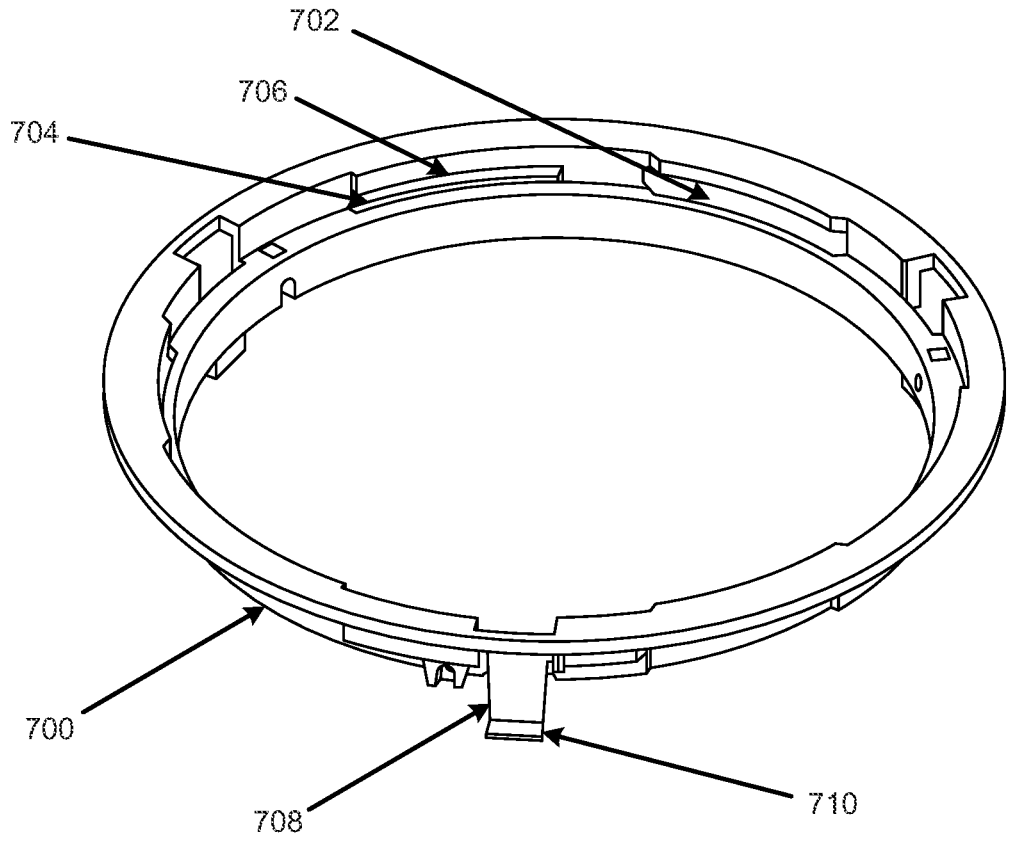
Figure 7C:
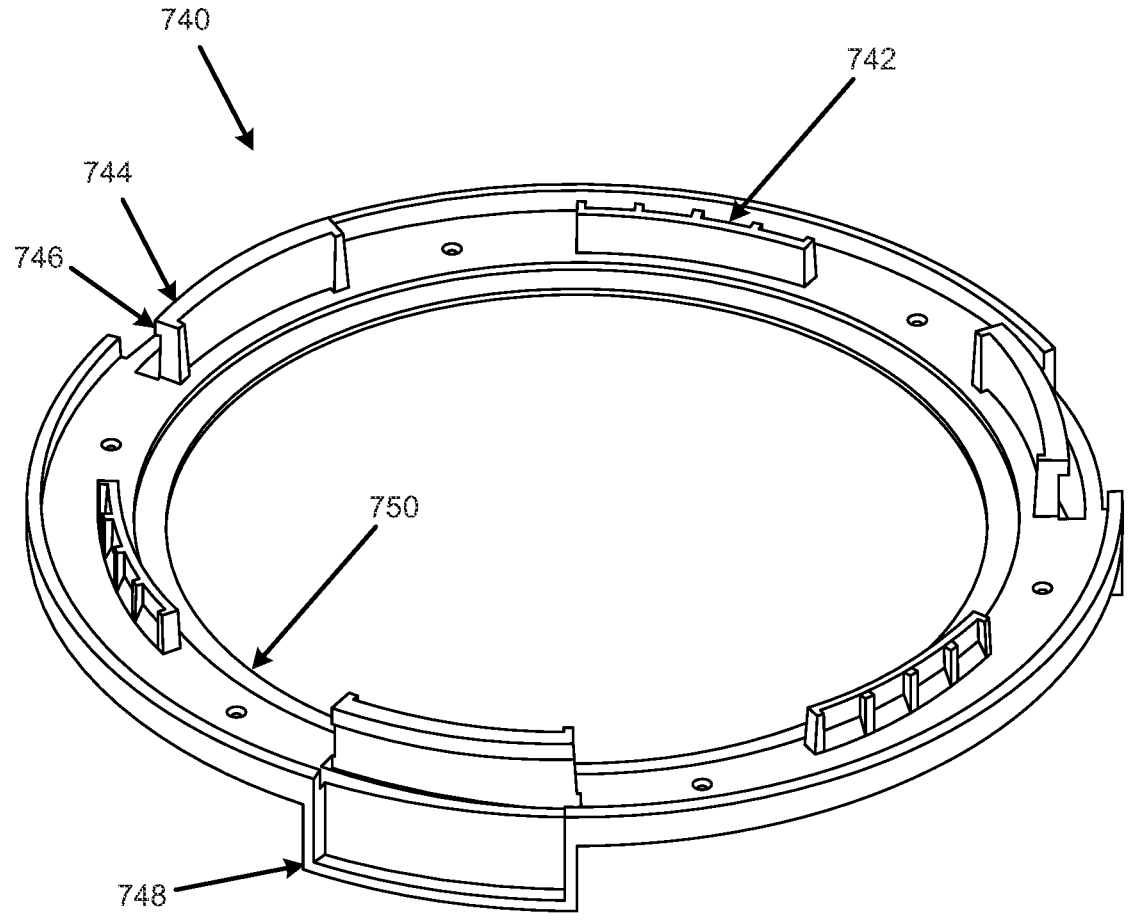

FIGS. 7A-7C illustrate isometric views of the first collar 102, an adapter 700, and another example of a second collar 740, and various features of the first collar 102, the adapter 700, and the another example of the second collar 740 for positioning of the first collar 102 and the second collar 740, respectively, relative to the adapter 700, in accordance with an example of the present disclosure.

As shown in FIGS. 1A, 2B, 7A, and 7B, the first collar 102 may include at least one positioning member 208 to position the first collar 102 relative to the adapter 700. The at least one positioning member 208 may be insertable in at least one corresponding positioning opening 702 of the adapter 700.

With continued reference to FIGS. 1A, 2B, 7A, and 7B, the first collar 102 may include at least one interlocking member 210 to lock the first collar 102 to the adapter 700. The at least one interlocking member 210 may be insertable in at least one corresponding interlocking opening 704 of the adapter 700. Further, the at least one interlocking member 210 may be lockable with at least one corresponding edge 706 of the at least one corresponding interlocking opening 704.

For the another example of the second collar 740 of FIG. 7C, the second collar 740 may include at least one positioning member 742 and at least one interlocking member 744. The at least one positioning member 742 and the at least one interlocking member 744 may respectively function similarly as the at least one positioning member 208 and the at least one interlocking member 210 of the first collar 102. The at least one interlocking member 744 may include a hook-shaped portion 746 to lock the second collar 740 to the first collar. The at least one positioning member 742 may be insertable in at least one corresponding positioning opening 814 (e.g., FIG. 8) of the first collar (e.g., first collar 800 of FIG. 8). Similarly, the at least one interlocking member 744 may be insertable in at least one corresponding interlocking opening 816 (e.g., FIG. 8) of the first collar (e.g., first collar 800 of FIG. 8). The second collar 740 may include at least one flange 748 that protrudes in a direction that is generally opposite to a direction of protrusion of the at least one interlocking member 744 to facilitate gripping of the second collar 740. The first collar (e.g., first collar 800 of FIG. 8) may include a central opening 818 that is sized to at least partially retain the vessel 106. Similarly, the second collar 740 may include a central opening 750 that is sized to at least partially retain the vessel 106.

As shown in FIGS. 1A, 2B, 3B, and 4B, in another example of the vessel mounting system 100, the vessel mounting system 100 may include the first collar 102 including at least one protrusion 300 engageable with the groove 302 of the vessel 106 to align the first collar 102 relative to the vessel 106. The second collar 104 may include at least one clip 402 engageable with at least one complementary tab 202 of the first collar 102 to align the second collar 104 relative to the first collar 102.

Figure 8:
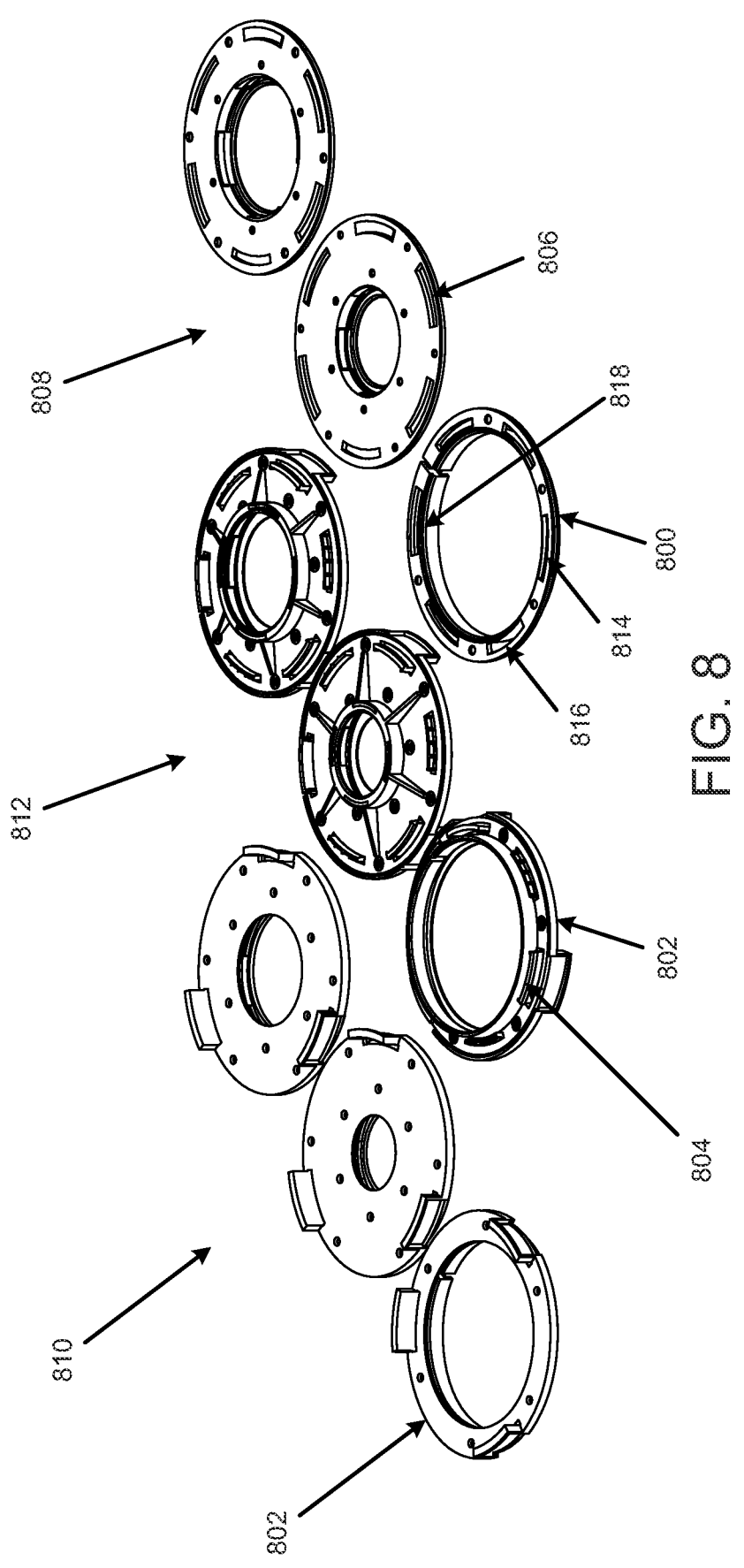
FIG. 8 illustrates isometric views of different configurations of the first and second collars for different vessel sizes, in accordance with an example of the present disclosure.

FIG. 8 illustrates isometric views of different configurations of the first and second collars for different vessel sizes, in accordance with an example of the present disclosure.

Referring to FIGS. 7C and 8, first collar 800 may include different types of configurations as shown for different vessel types. Second collar 802 (similar to second collar 740) may include interlocking members 804 and different types of configurations as shown for different vessel types. Both the first collar 800 and the second collar 802 may be engageable with each other based on engagement of the interlocking members 804 with corresponding interlocking openings 806. For the first collar 800, isometric views of are shown at 808. For the second collar 802, isometric views of one surface are shown at 810, and isometric views of an opposite surface are shown at 812.

Figure 9:
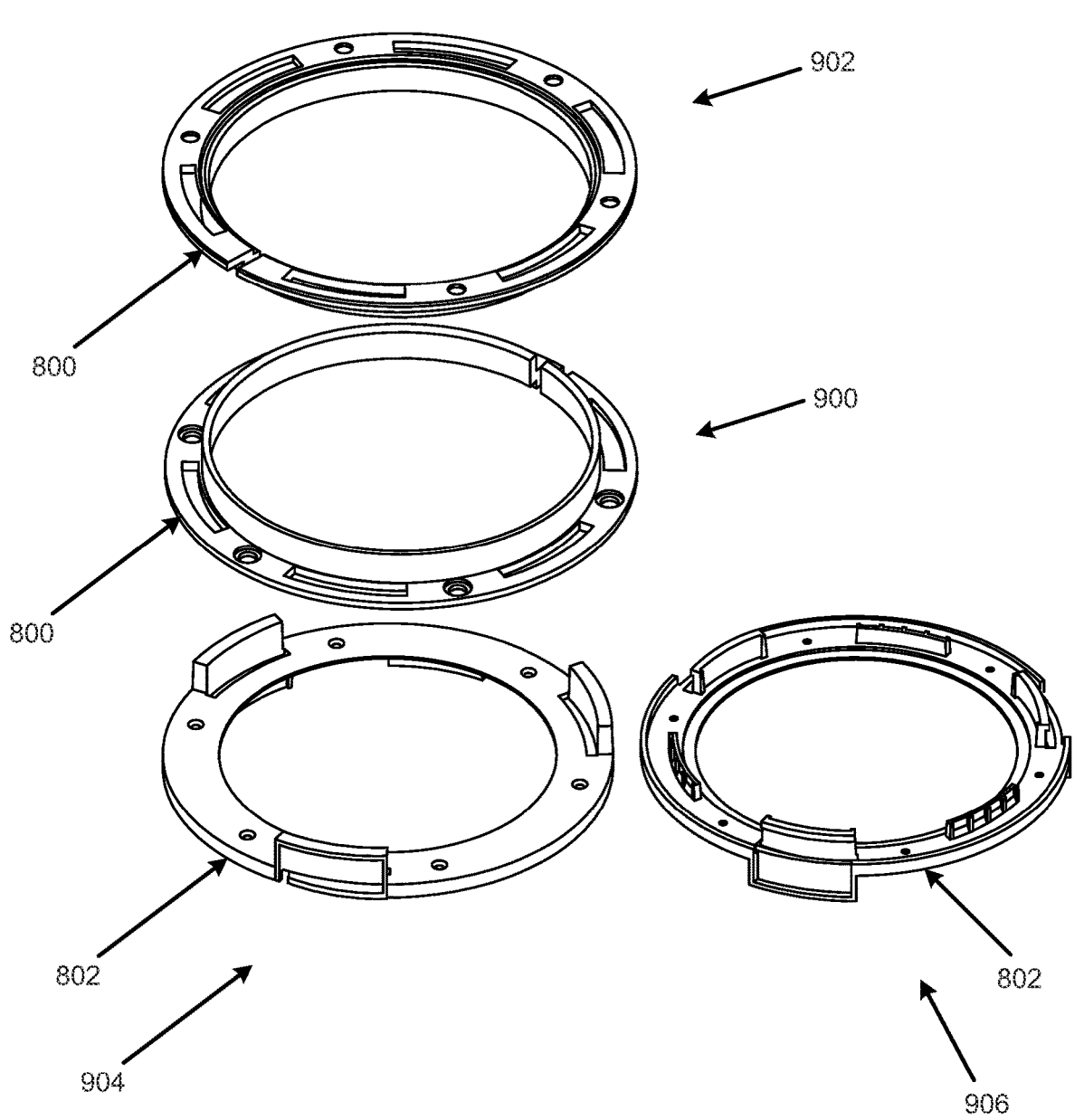
FIG. 9 illustrates further isometric views of different configurations of the first and second collars for different vessel sizes, in accordance with an example of the present disclosure.

FIG. 9 illustrates further isometric views of different configurations of the first and second collars for different vessel sizes, in accordance with an example of the present disclosure.

Referring to FIG. 9, further views of the first collar 800 and the second collar 802 are shown. For the first collar 800, an isometric view of one surface is shown at 900, and an isometric view of an opposite surface is shown at 902. Further, for the second collar 802, an isometric view of one surface is shown at 904, and an isometric view of an opposite surface is shown at 906.

With reference to FIGS. 8 and 9, the first collar 800 and the second collar 802 may be utilized with non-precision vessels where an inner vessel surface may be utilized as a reference relative to the positioning features in the second collar 802. Comparably, the first collar 102 and the second collar 104 may be utilized with precision vessels where the groove 302 may be utilized as a reference relative to the positioning features in the second collar 104. For both the first collar 102 and the second collar 104, and the first collar 800 and the second collar 802, if needed, a bonding material such as glue may be utilized to more securely attach the collars to each other, and/or onto the vessel 106.

Figure 10:
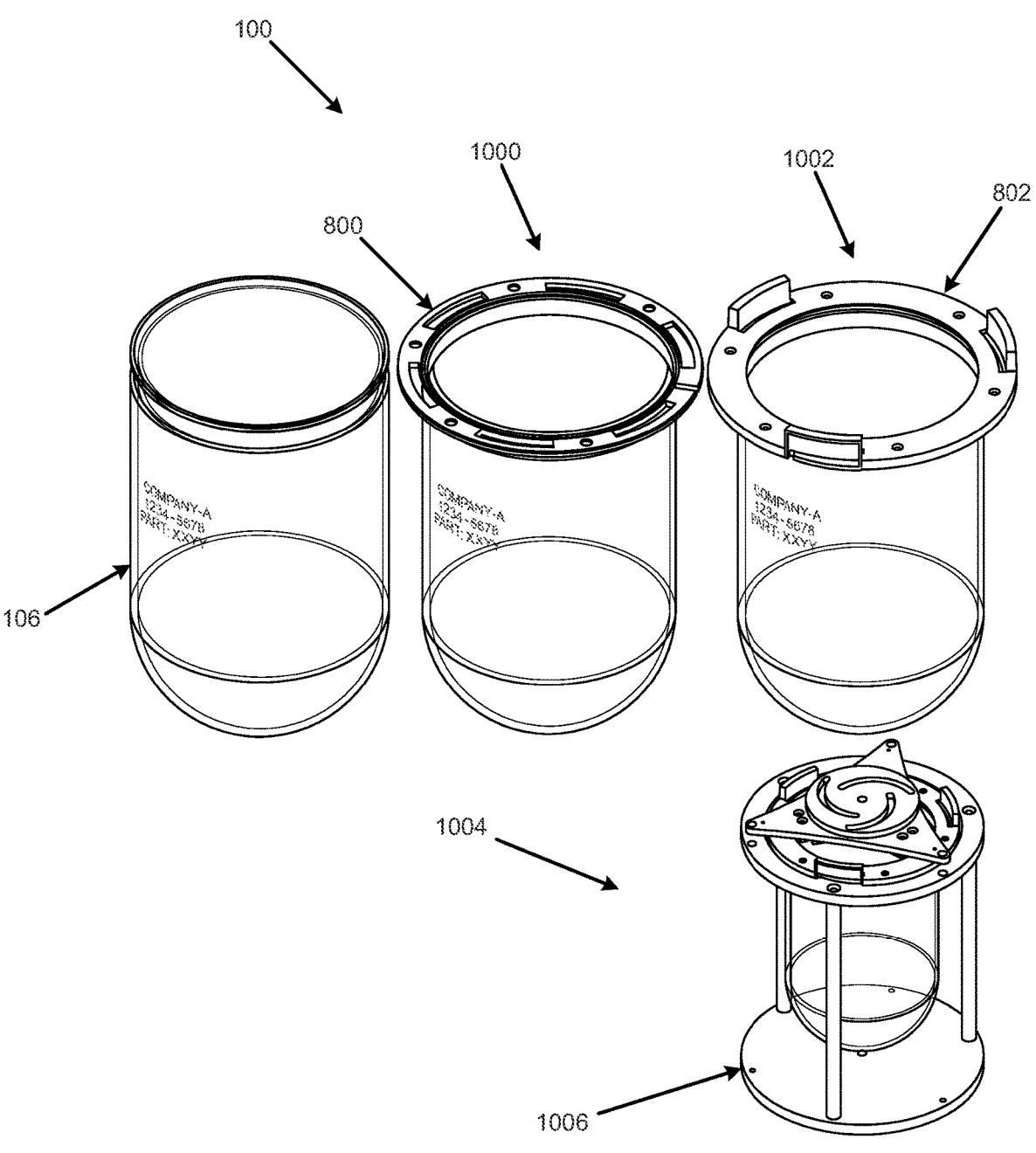
FIG. 10 illustrates further isometric views of attachment stages of the first and second collars to a vessel, in accordance with an example of the present disclosure.

FIG. 10 illustrates further isometric views of attachment stages of the first and second collars to the vessel 106, in accordance with an example of the present disclosure.

Referring to FIG. 10, with respect to the first collar 800 and the second collar 802 of FIGS. 8 and 9, these collars may be attached to the vessel 106 as shown. For example, at 1000, the first collar 800 may be attached to the vessel 106. At 1002, the second collar 802 may be attached to the first collar 800. Further, at 1004, the assembly including the first collar 800, the second collar 802, and the vessel 106 may be placed in a holder 1006 for placement in vessel holder 1200 (e.g., see FIG. 12A).

Figure 11:
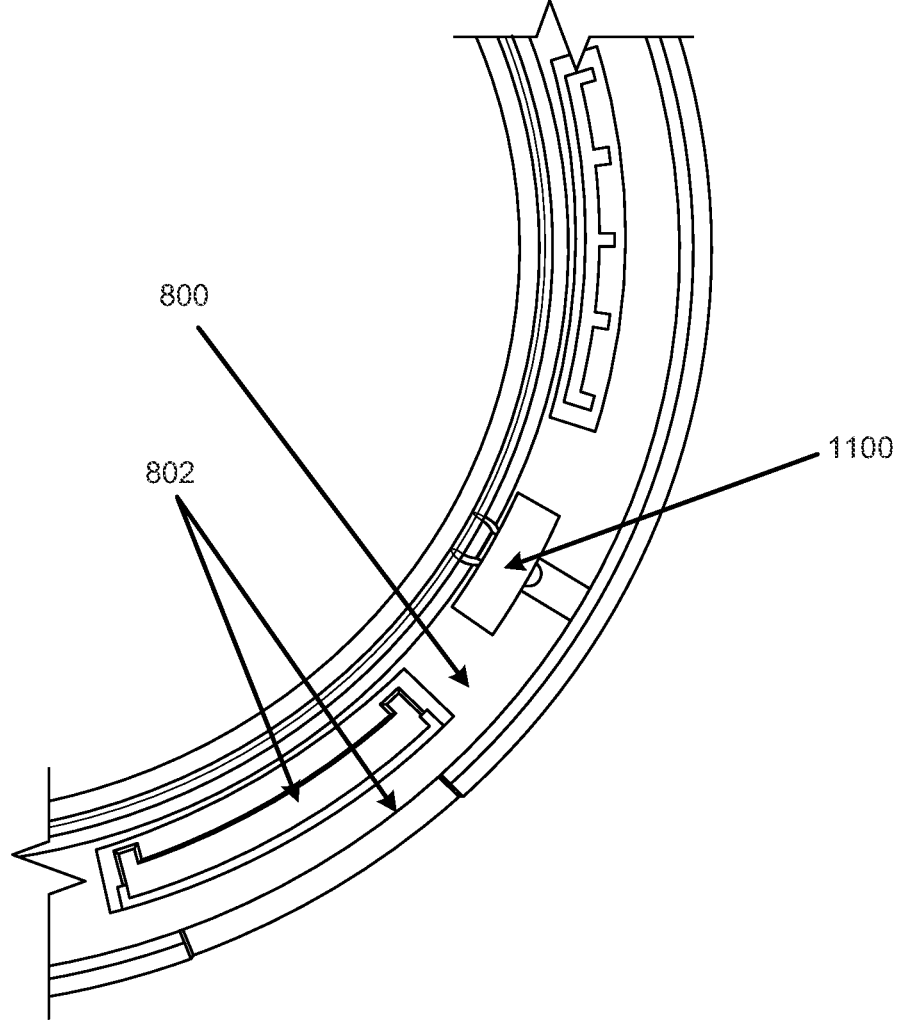
FIG. 11 illustrates a cutout view to illustrate attachment of the first and second collars, in accordance with an example of the present disclosure.

FIG. 11 illustrates a cutout view to illustrate attachment of the first and second collars, in accordance with an example of the present disclosure.

Referring to FIGS. 10 and 11, as discussed above, at 1002, the second collar 802 may be attached to the first collar 800. In this regard, a clamp 1100 may be utilized to fix the first collar 800 and the second collar 802 in position. For example, the clamp 1100 may fix the first collar 800 and the second collar 802 in a specified engaged position.

Figure 12A:
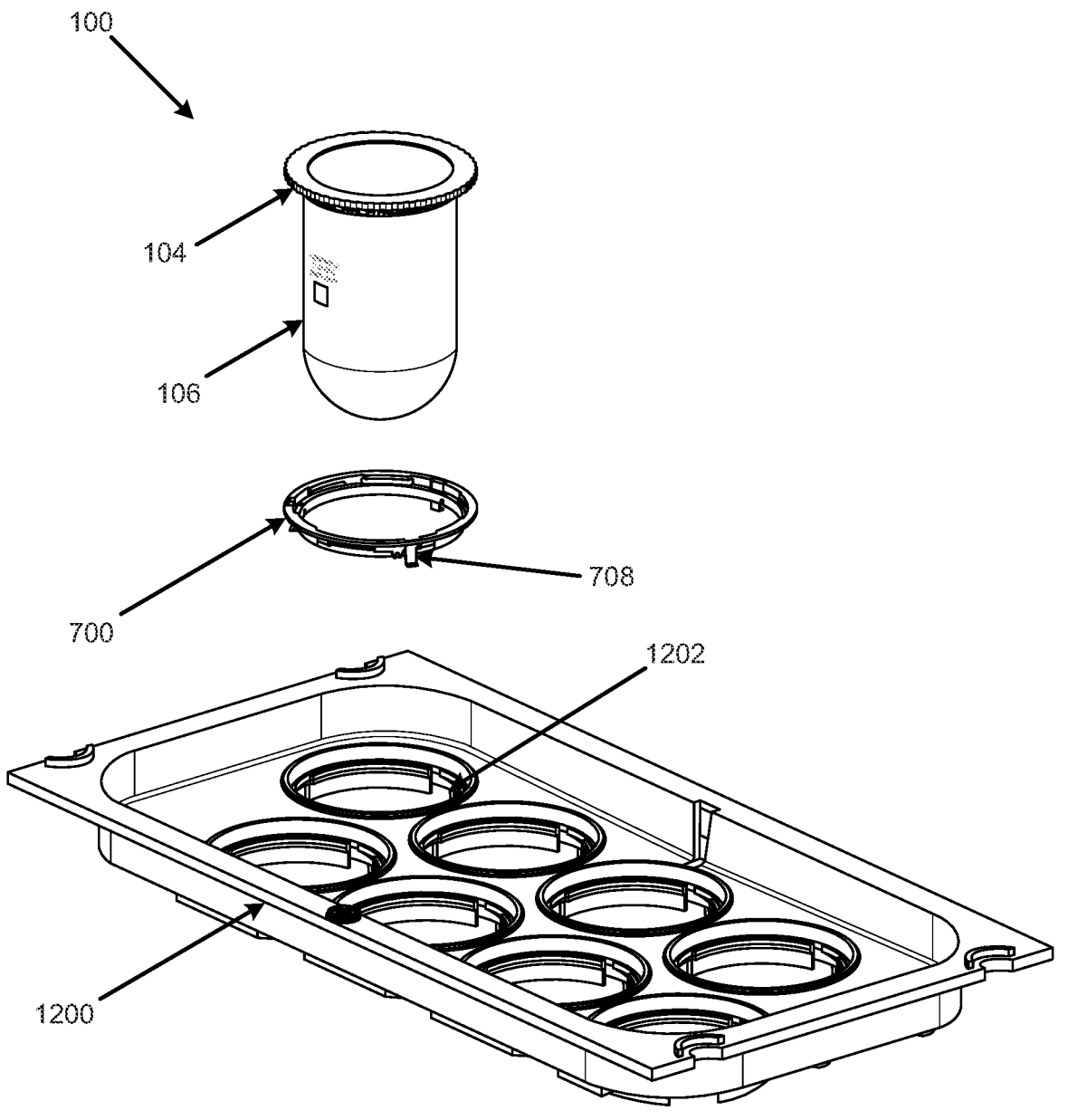
FIG. 12A illustrates a vessel including first and second collars installed thereon, and the adapter for alignment and locking of the vessel relative a vessel holder, in accordance with an example of the present disclosure.
Figure 12C:
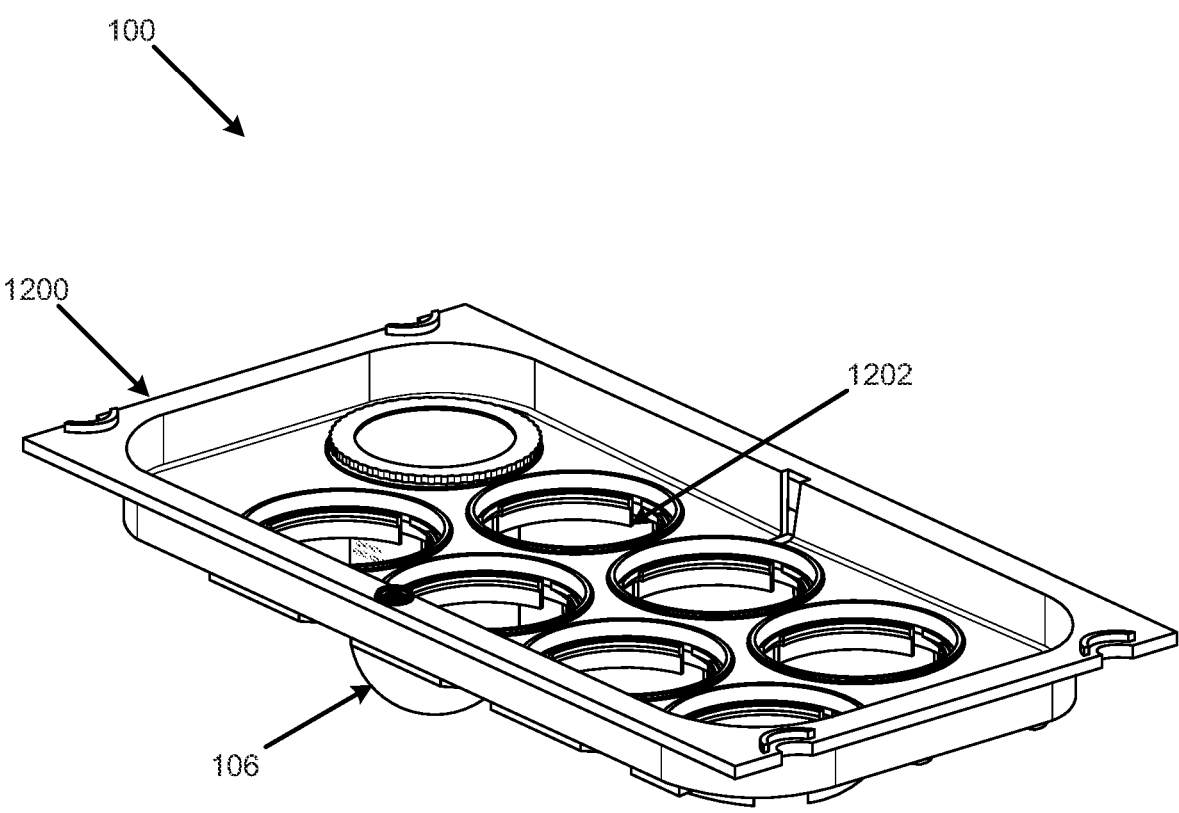
FIG. 12C illustrates the vessel of FIG. 12B including first and second collars installed thereon, the vessel being aligned and locked relative the vessel holder via the adapter, in accordance with an example of the present disclosure.

FIG. 12A illustrates a vessel 106 including first and second collars installed thereon, and the adapter 700 for alignment and locking of the vessel 106 relative a vessel holder 1200, in accordance with an example of the present disclosure. FIG. 12B illustrates the vessel 106 of FIG. 12A including first and second collars installed thereon, and the adapter 700 installed onto the vessel holder 1200, in accordance with an example of the present disclosure. Further, FIG. 12C illustrates the vessel 106 of FIG. 12B including first and second collars installed thereon, the vessel 106 being aligned and locked relative the vessel holder 1200 via the adapter 700, in accordance with an example of the present disclosure.

As shown in FIGS. 1A, 2B, 4B, 7B, and 12A, in another example of the vessel mounting system 100, the vessel mounting system 100 may include the adapter 700 including at least one positioning opening 702 to receive at least one positioning member 208 of a collar (e.g., the first collar 102) to position the collar relative to the adapter 700. The adapter 700 may be mountable to the vessel 106 to align the vessel 106 relative to the vessel holder 1200.

As shown in FIGS. 1A, 2B, and 7B, the adapter 700 may further include at least one interlocking opening 704 to receive at least one interlocking member 210 of the collar (e.g., the first collar 102). The at least one interlocking member 210 may be lockable with at least one corresponding edge 706 of the at least one interlocking opening 704.

As shown in FIGS. 1A, 2B, 7B, and 12A, the adapter 700 may include at least one adapter leg 708 to mount the adapter 700 to the vessel holder 1200. The at least one adapter leg 708 may include a hook-shaped portion 710 that may be engageable with a catch 1202 of the vessel holder 1200 when the adapter 700 is rotated relative to the vessel holder 1200.

Figure 12D:
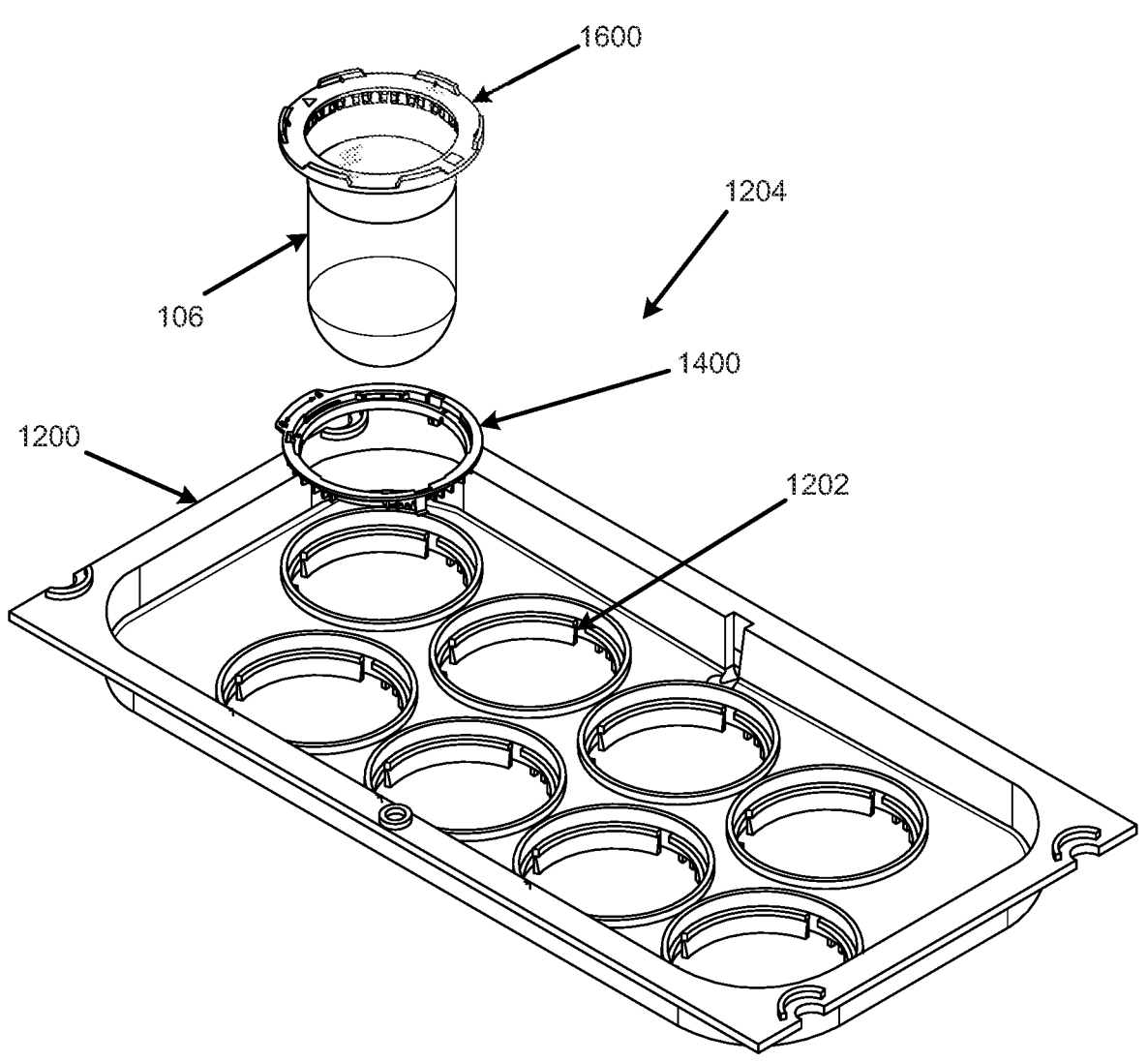
FIG. 12D illustrates another example of a vessel including first and second collars installed thereon, and an adapter for alignment and locking of the vessel relative a vessel holder, in accordance with an example of the present disclosure.
Figure 12E:
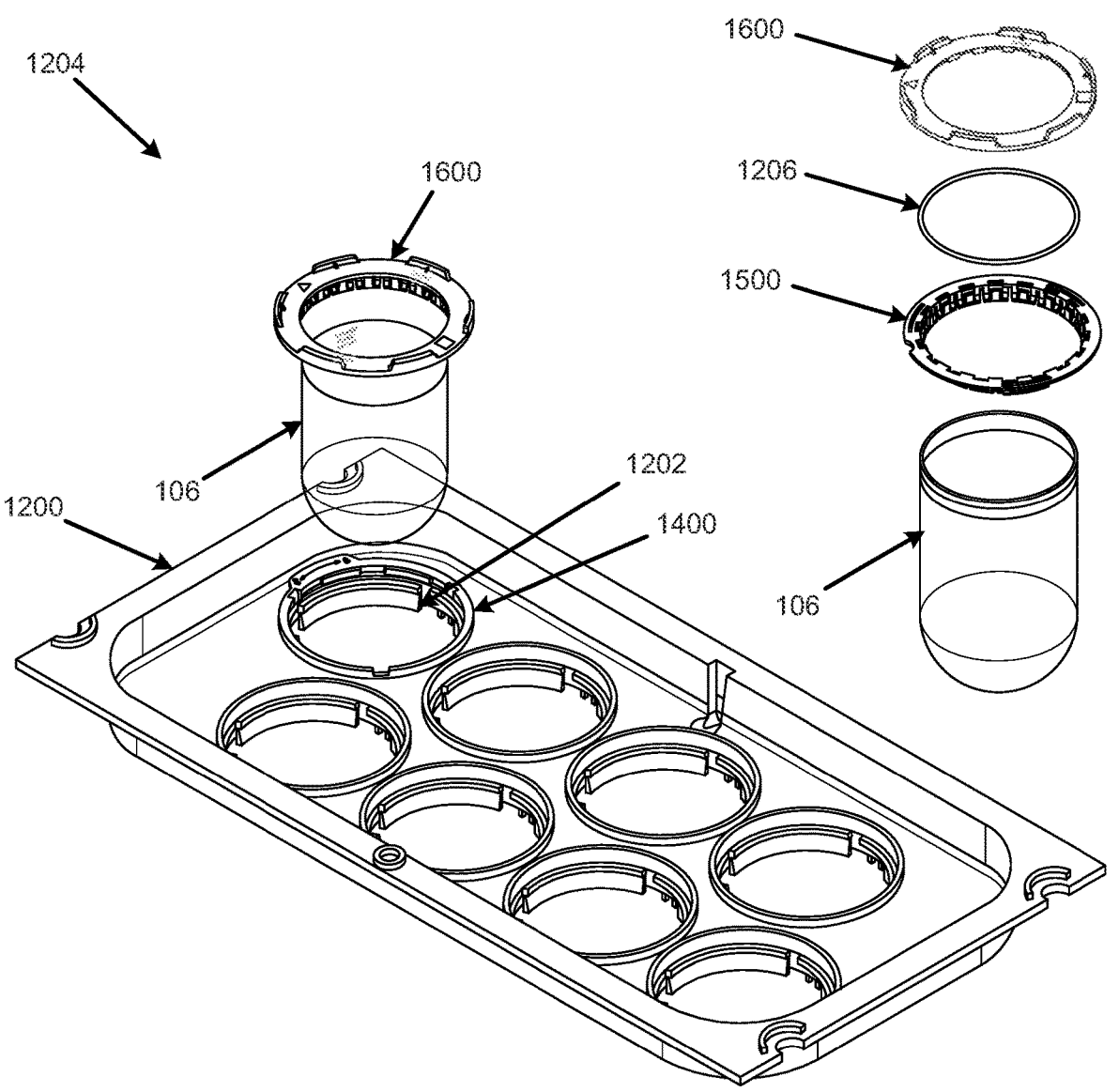
FIG. 12E illustrates the vessel of FIG. 12D including first and second collars installed thereon, and the adapter of FIG. 12D installed onto the vessel holder, in accordance with an example of the present disclosure.
Figures 12F, 12G:
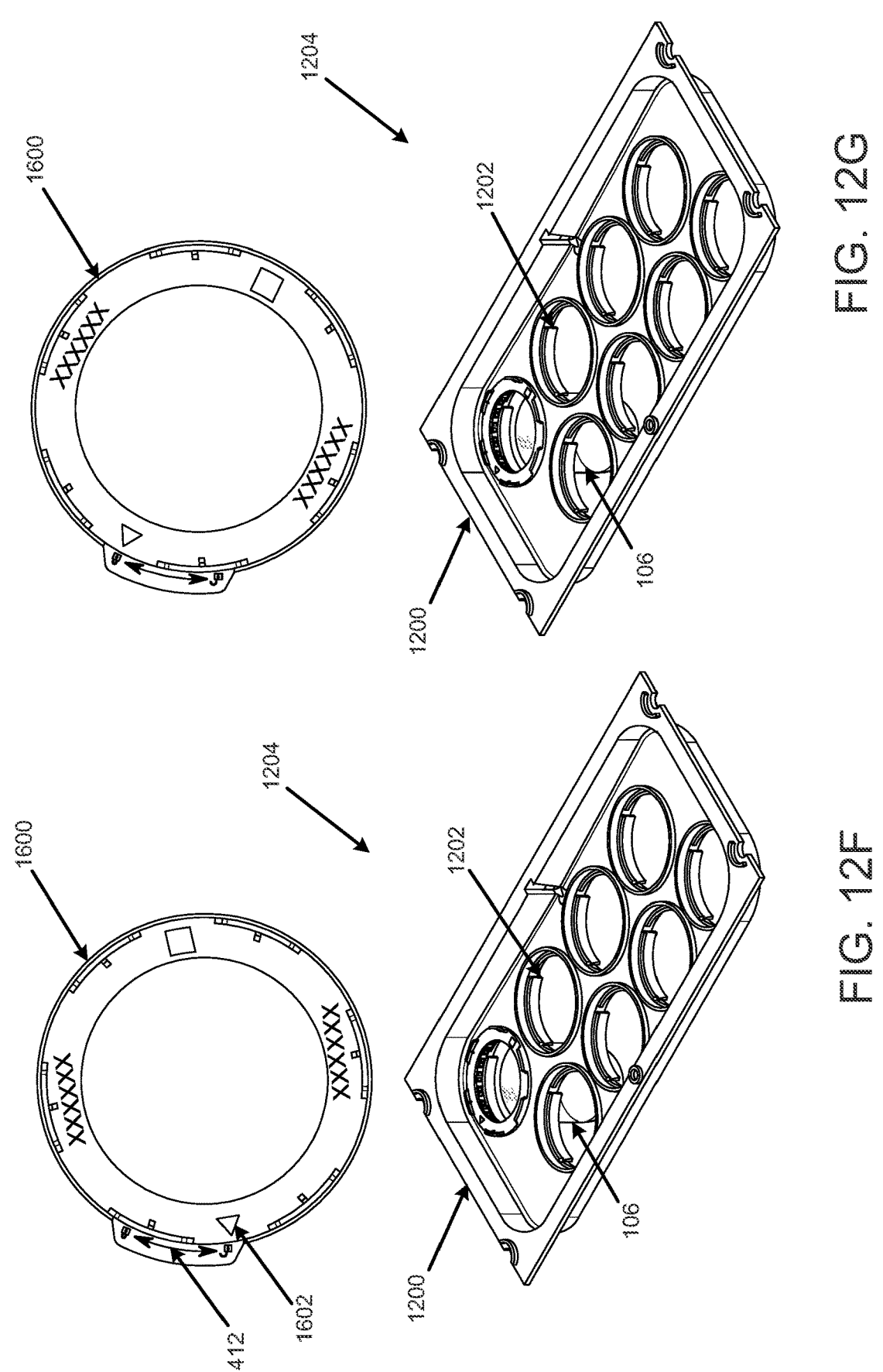
FIGS. 12F and 12G illustrate operation of the first and second collars of FIG. 12D, in accordance with an example of the present disclosure.

FIG. 12D illustrates another example of a vessel 106 including a first collar 1500 (e.g., FIG. 15A) and a second collar 1600 (e.g., FIG. 16A) installed thereon, and an adapter 1400 (e.g., FIG. 14C) for alignment and locking of the vessel 106 relative the vessel holder 1200, in accordance with an example of the present disclosure. FIG. 12E illustrates the vessel 106 of FIG. 12D including the first collar 1500 and the second collar 1600 installed thereon, and the adapter 1400 installed onto the vessel holder 1200, in accordance with an example of the present disclosure. Further, FIGS. 12F and 12G illustrate operation of the first collar 1500 and the second collar 1600 of FIG. 12D, in accordance with an example of the present disclosure.

As shown in FIGS. 12D-12G, in another example of vessel mounting system 1204, the vessel mounting system 1204 may include the adapter 1400 including at least one positioning opening 1402 (e.g., FIG. 14C) to receive at least one positioning member (e.g., 1502; FIG. 15C) of a collar (e.g., the first collar 1500) to position the collar relative to the adapter 1400. The adapter 1400 may be mountable to the vessel 106 to align the vessel 106 relative to the vessel holder 1200.

The adapter 1400 may further include at least one interlocking opening 1404 (e.g., FIG. 14C) to receive at least one interlocking member 1504 (e.g., FIG. 15C) of the collar (e.g., the first collar 1500). The at least one interlocking member 1504 may be lockable with at least one corresponding edge 1406 (e.g., FIG. 14C) of the at least one interlocking opening 1404.

The adapter 1400 may include at least one adapter leg 1408 (e.g., FIG. 14C) to mount the adapter 1400 to the vessel holder 1200. The at least one adapter leg 1408 may include a hook-shaped portion 1410 that may be engageable with a catch 1202 of the vessel holder 1200 when the adapter 1400 is rotated relative to the vessel holder 1200.

As shown in FIG. 12E, a sealing ring 1206 may be disposed between the first collar 1500 and the second collar 1600. The sealing ring 1206 may be compressed located on top of the glass body of the vessel 106 to prevent fluid from entering between the vessel 106 and other components such as the first collar 1500 and the second collar 1600. The sealing ring 1206 may also prevent (e.g., by friction) the vessel 106 from being able to be unintentionally rotated in the final assembly to maintain a persistent relative position between the vessel 106, and the first collar 1500 and the second collar 1600.

Referring particularly to FIGS. 12F and 12G, the second collar 1600 may include indicia 1602 that may indicate, based on a rotational location relative to indicia 1412 of the adapter 1400, whether the vessel 106 is locked or unlocked relative to the adapter 1400, and thus the vessel holder 1200. In this regard, the second collar 1600 may be rotated relative to the adapter 1400.

The vessel 106 for the examples of FIGS. 12A-12G may represent a relatively large volume vessel, such as a 1 L vessel. However, as apparent to those skilled in the art in view of this disclosure, other larger or smaller volume vessels may be utilized for the examples of FIGS. 12A-12G.

Figure 13A:
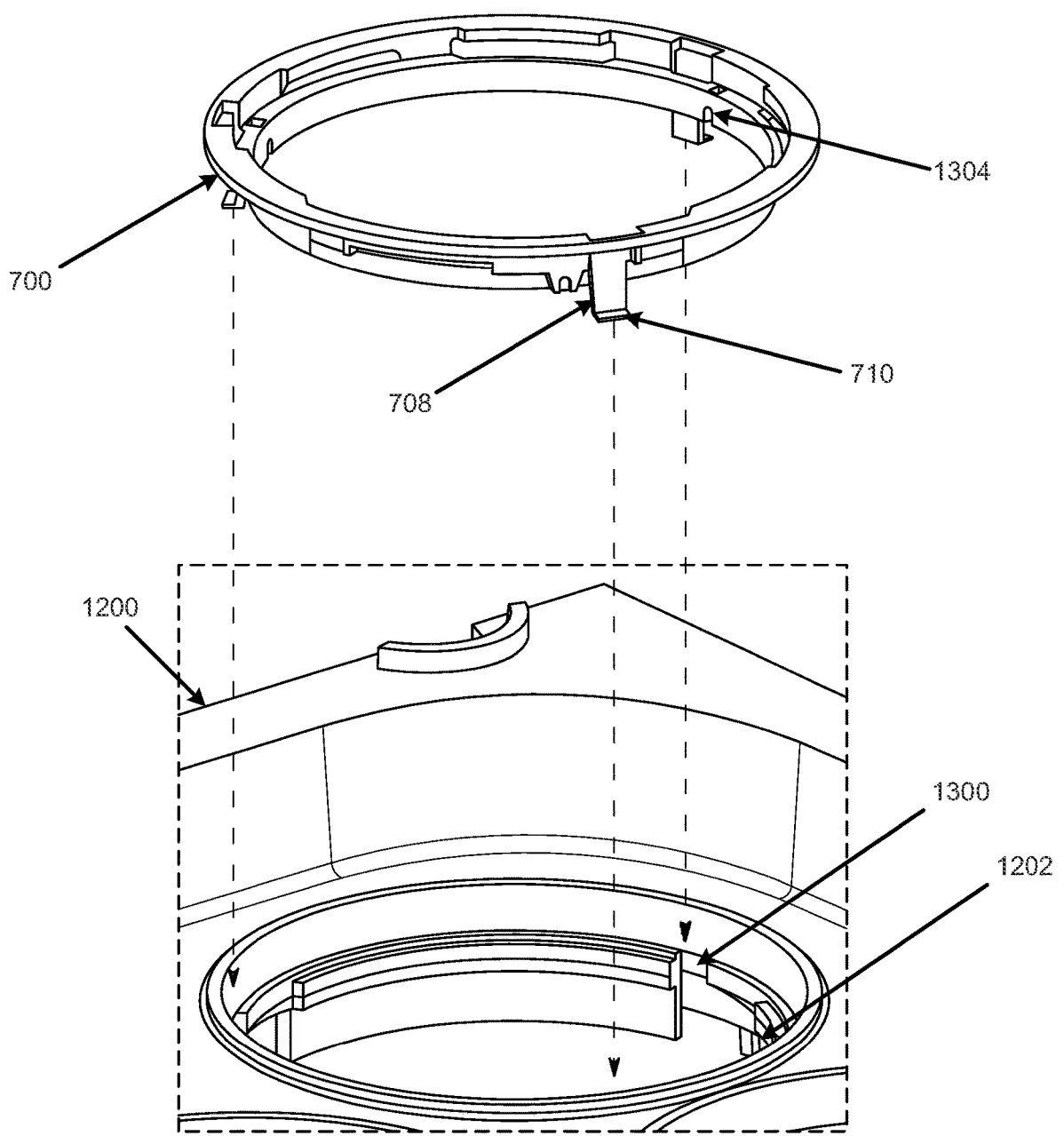
FIGS. 13A-13C illustrate isometric cutout views of the vessel, the first and second collars, the adapter of FIG. 7B, and the vessel holder to illustrate alignment and locking of the vessel relative to the vessel holder, in accordance with an example of the present disclosure.
Figure 13B:
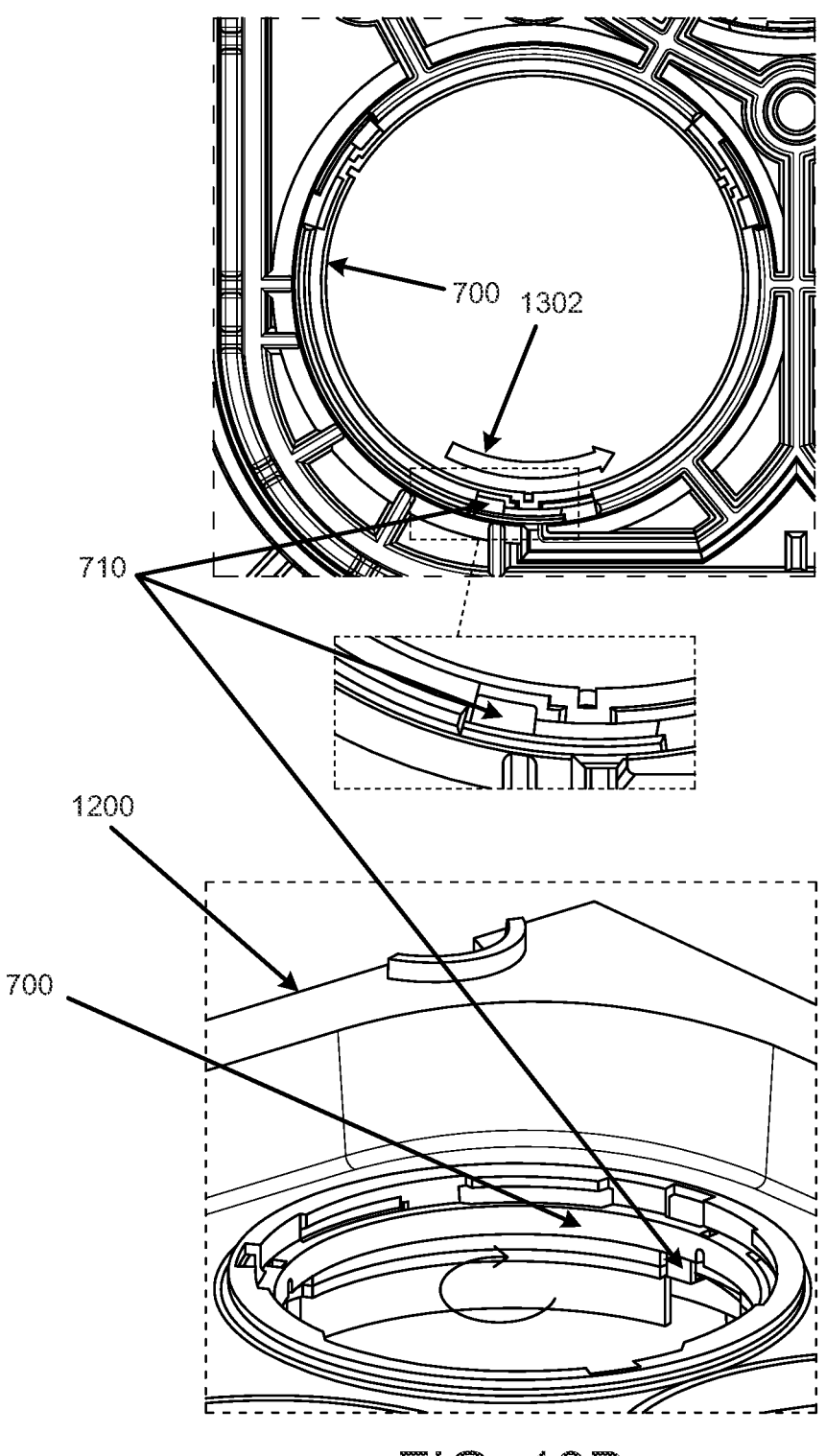
Figure 13C:
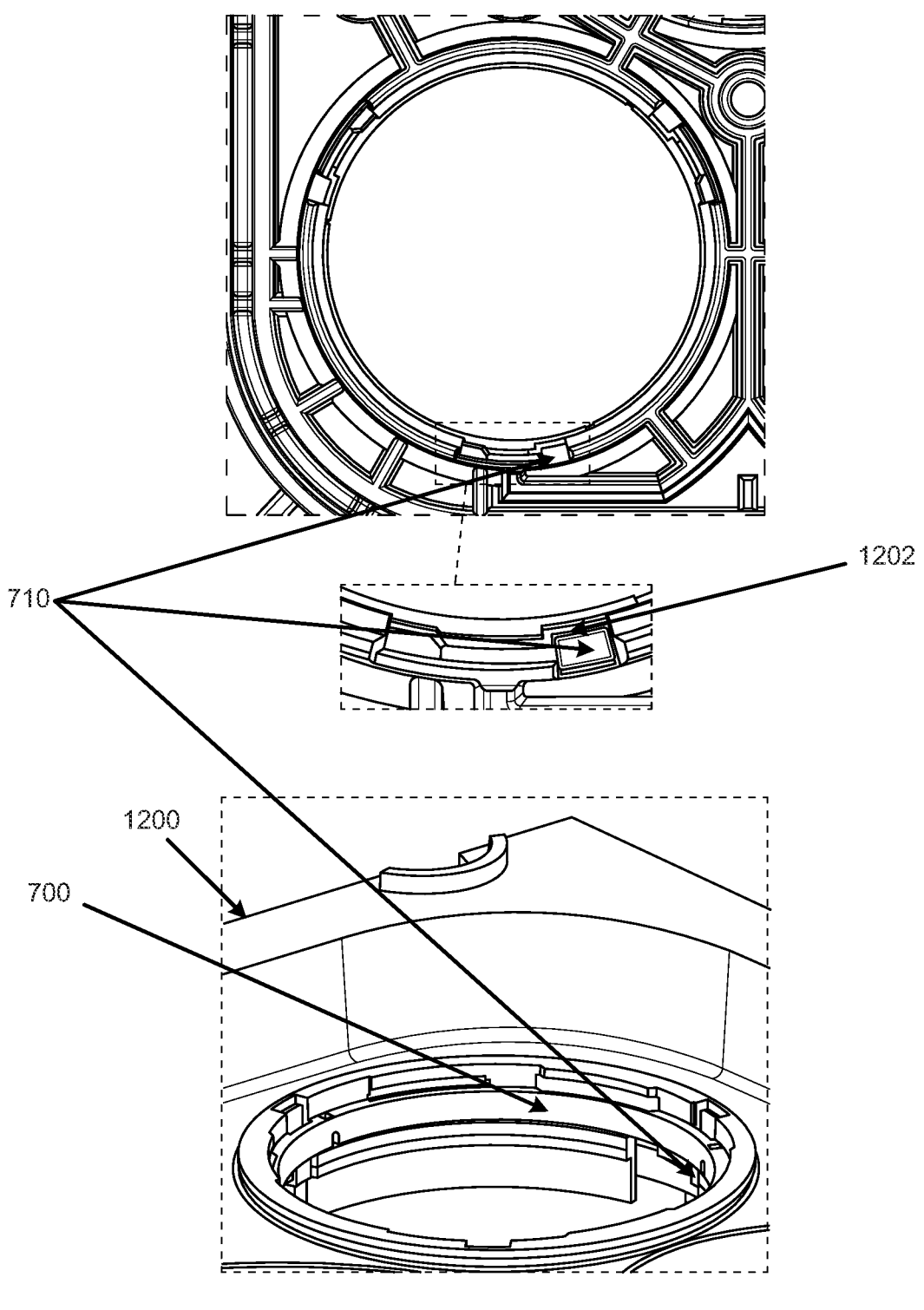

FIGS. 13A-13C illustrate isometric cutout views of the vessel 106, the first and second collars, the adapter 700, and the vessel holder 1200 to illustrate alignment and locking of the vessel 106 relative to the vessel holder 1200, in accordance with an example of the present disclosure.

Figure 14B:
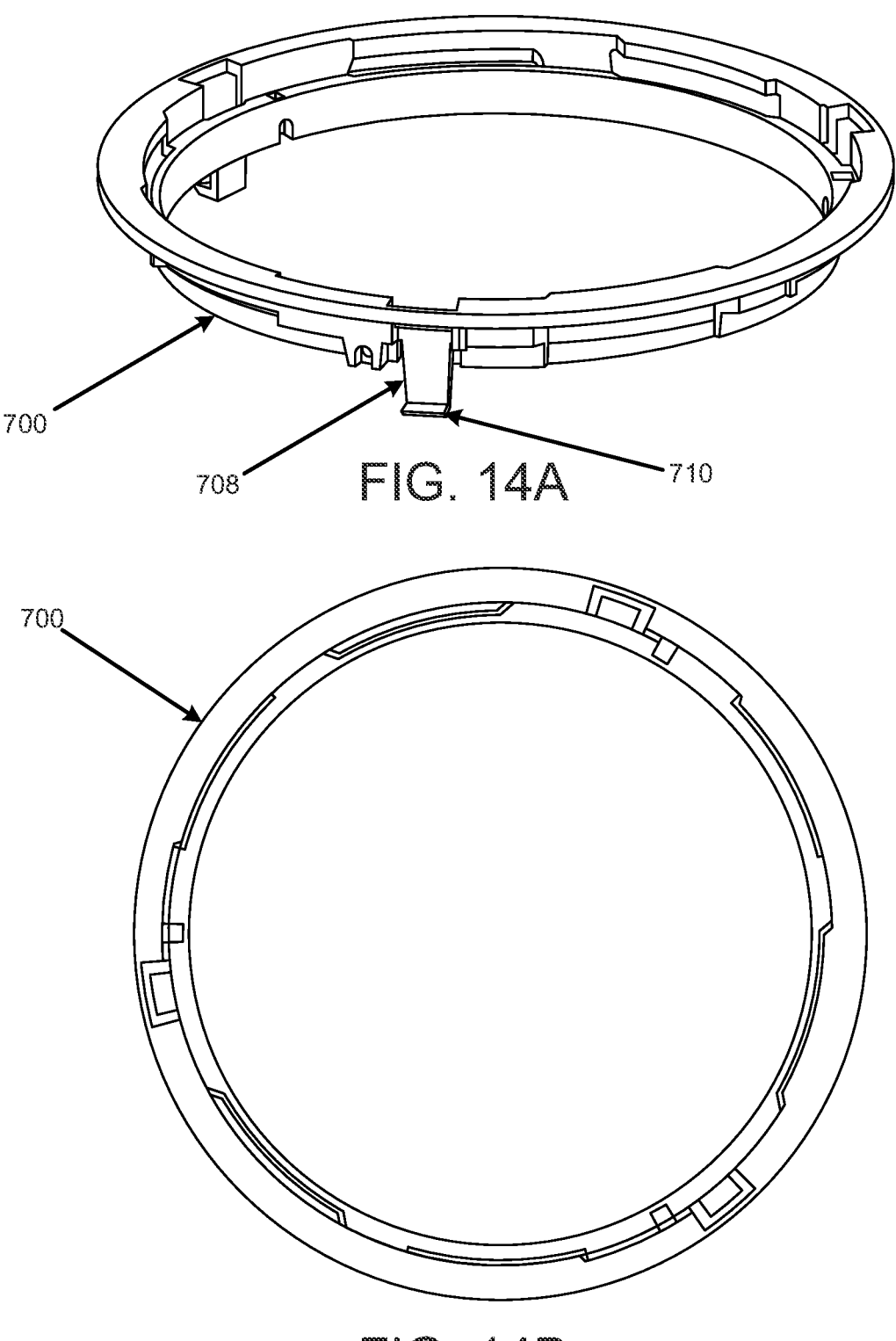

FIGS. 14A-14B illustrate isometric and top views of the adapter 700, in accordance with an example of the present disclosure.

Referring to FIGS. 13A and 14A, the adapter 700 may be inserted into the vessel holder 1200. The adapter leg 708 (e.g., three legs) may pass through dedicated openings 1300 in the vessel holder 1200. When the adapter 700 is touching the vessel holder 1200, as shown in FIGS. 13B and 13C, the adapter 700 may be turned (e.g., at 1302) in one direction. At the end of the rotation, the hook-shaped portion 710 of each leg may snap into a catch 1202 (e.g., recess) to lock the adapter 700 to the vessel holder 1200, and may not be readily turned back. A reverse rotation of the adapter 700 relative to the vessel holder 1200 may release the hook-shaped portion 710 from the catch 1202 to unlock the adapter 700 from the vessel holder 1200.

The adapter 700 may function as an interface between the vessel holder 1200 and the vessel assembly (e.g., including the collars and vessel 106). The adapter 700 may be installed during initial instrument assembly. The inner shape of the adapter 700 may be changed as needed in the future to address new or different needs with respect to the vessel 106 and/or the vessel holder 1200.

As shown in FIG. 13A, the adapter 700 may include radial openings 1304 which may be used to screw in screws or other type of adjustment devices to center the adapter 700 with respect to the vessel holder 1200.

Figure 14C:
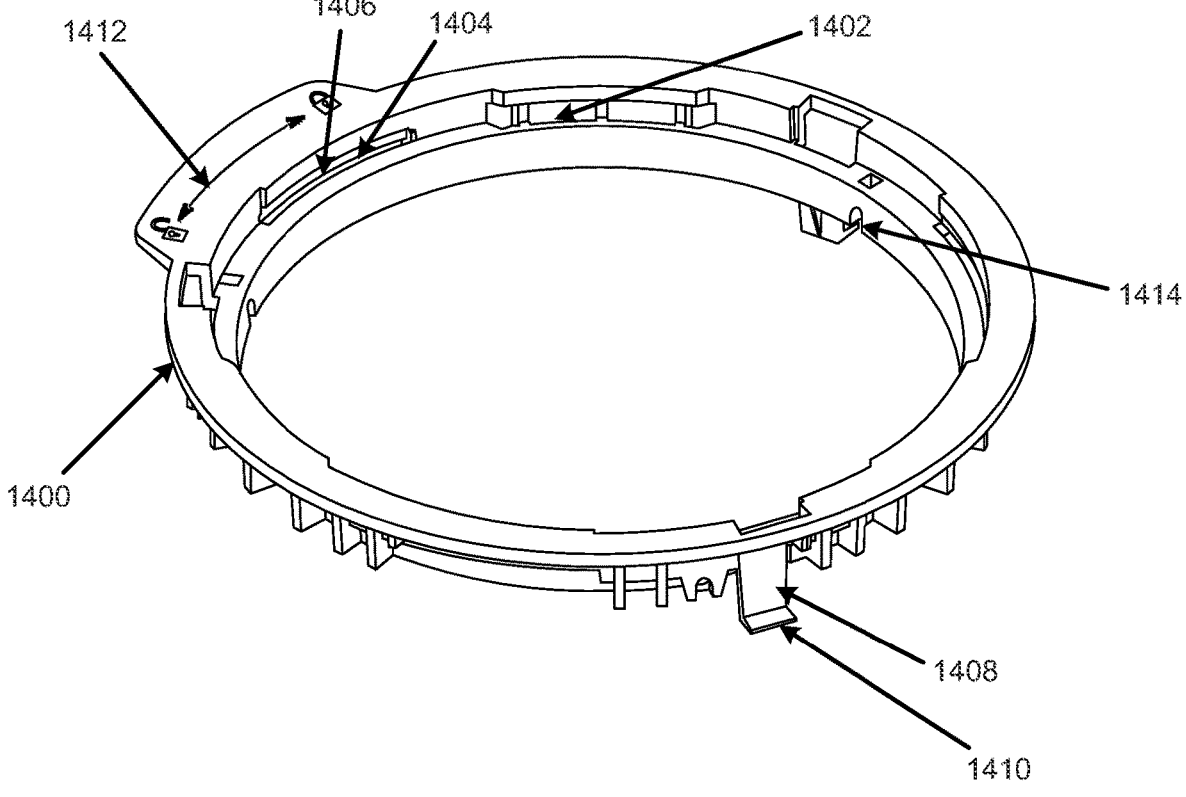
FIGS. 14C and 14D illustrate isometric and bottom views of another example of the adapter of FIG. 12D, in accordance with an example of the present disclosure.
Figure 14D:
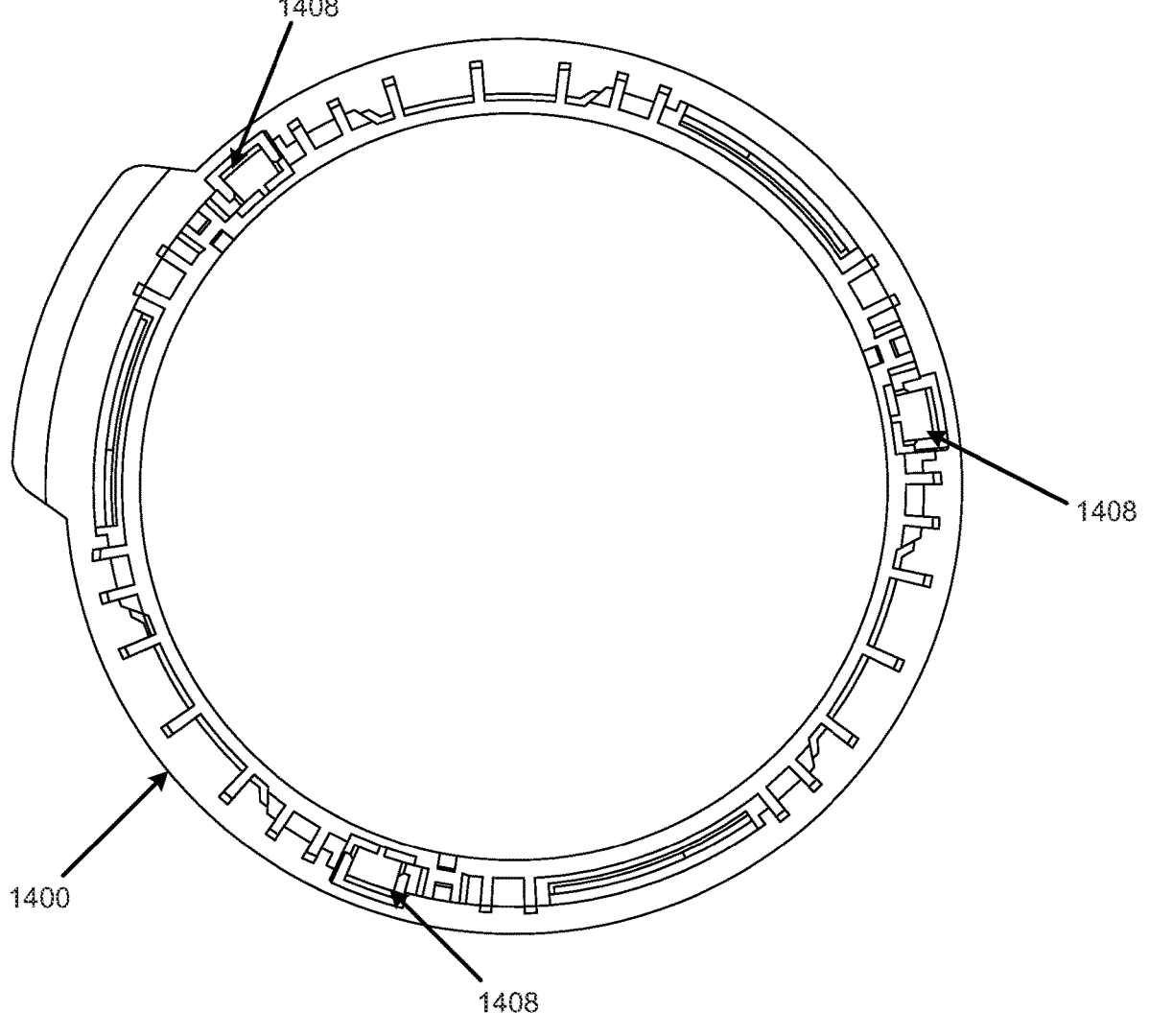

FIGS. 14C and 14D illustrate isometric and bottom views of the adapter 1400, in accordance with an example of the present disclosure. Further, FIG. 14E illustrates an isometric view of another example of an adapter 1450, in accordance with an example of the present disclosure.

Referring to FIGS. 13A and 14C-14E, in a similar manner as the adapter 700, the adapters 1400 and 1450 may be inserted into the vessel holder 1200. The adapter leg 1408 (e.g., three legs) may pass through dedicated openings 1300 in the vessel holder 1200. When the adapters 1400 or 1450 are touching the vessel holder 1200, in a similar manner as shown in FIGS. 13B and 13C for the adapter 700, the adapters 1400 and 1450 may be turned (e.g., at 1302) in one direction. At the end of the rotation, the hook-shaped portion 1410 of each leg may snap into a catch 1202 (e.g., recess) to lock the adapters 1400 and 1450 to the vessel holder 1200, and may not be readily turned back. A reverse rotation of the adapters 1400 and 1450 relative to the vessel holder 1200 may release the hook-shaped portion 1410 from the catch 1202 to unlock the adapters 1400 and 1450 from the vessel holder 1200.

In a similar manner as the adapter 700, the adapters 1400 and 1450 may function as an interface between the vessel holder 1200 and the vessel assembly (e.g., including the collars and vessel 106). The adapters 1400 and 1450 may be installed during initial instrument assembly. The inner shape of the adapters 1400 and 1450 may be changed as needed in the future to address new or different needs with respect to the vessel 106 and/or the vessel holder 1200.

Figure 14E:
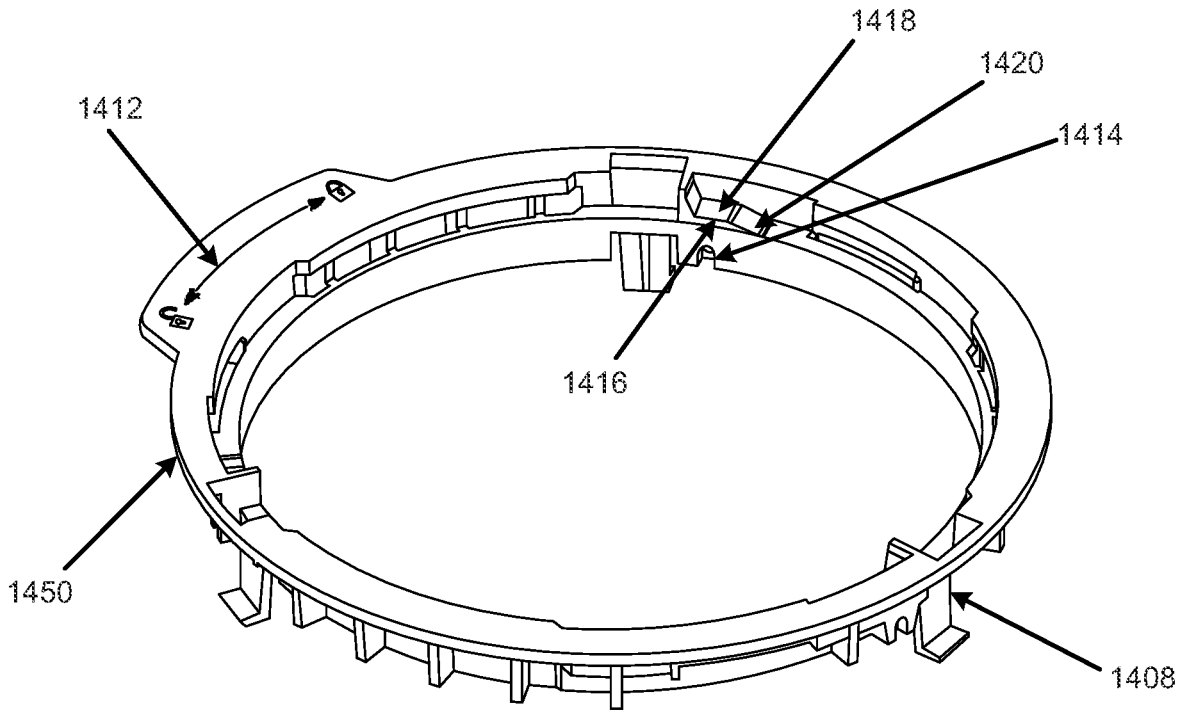
FIG. 14E illustrates an isometric view of another example of an adapter, in accordance with an example of the present disclosure.
Figures 15A, 15B, 15C:
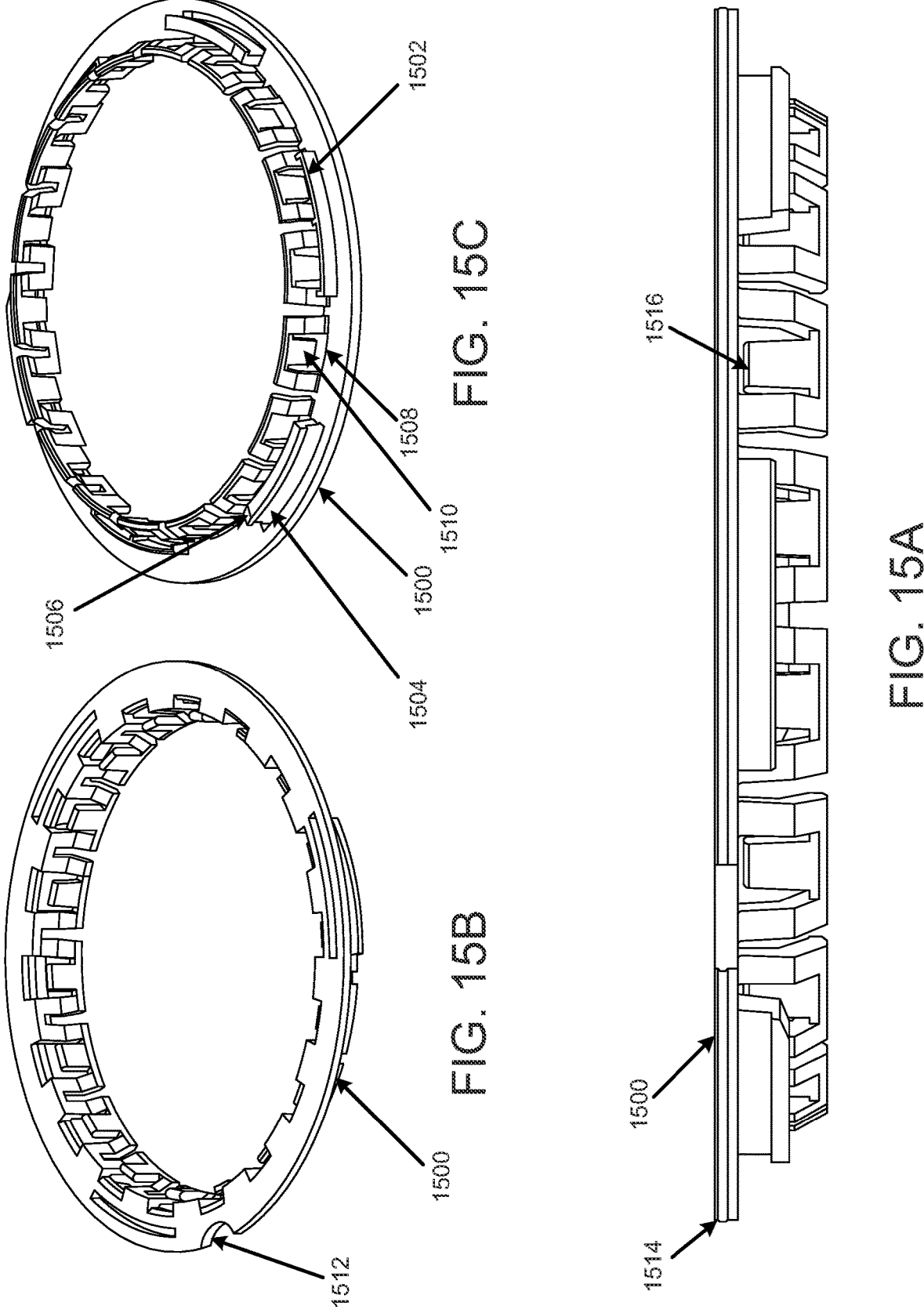
FIGS. 15A-15C illustrate isometric top and bottom, and side views of another example of the first collar, in accordance with an example of the present disclosure.

As shown in FIGS. 14C and 14E, the adapters 1400 and 1450 may include radial openings 1414 which may be used to screw in screws or other type of adjustment devices to center the adapters 1400 and 1450 with respect to the vessel holder 1200.

Referring to FIG. 14E, compared to the adapter 1400, the adapter 1450 may include a lifting guide 1416. The lifting guide 1416 may include a flat section 1418 and a tapered section 1420 to facilitate lifting of the first collar 1500 relative to the adapter 1450. For example, the first collar 1500 may include a chamfered area 1506 (e.g., FIG. 15C) that may engage with the tapered section 1420 to lift the first collar 1500 relative to the adapter 1450 upon rotation of the first collar 1500 relative to the adapter 1450. The lifting of the first collar 1500 relative to the adapter 1450 may further minimize movement of the vessel 106 relative to the vessel holder 1200.

FIGS. 15A-15C illustrate isometric top and bottom, and side views of the first collar 1500, in accordance with an example of the present disclosure.

Referring to FIGS. 15A-15C, the first collar 1500 may include semi-circular cutout 1512 that may receive the at least one positioning member 1614 (e.g., FIG. 16C) of the second collar 1600. The engagement of the at least one positioning member 1614 within the semi-circular cutout 1512 may position the second collar 1600 relative to the first collar 1500 to orient the indicia 1602 (e.g., FIG. 16B) and the information 1612 (e.g., FIG. 16B) in a predetermined orientation relative to the vessel holder 1200.

With continued reference to FIGS. 15A-15C, the first collar 1500 may include the at least one protrusion 1510 that engages the vessel 106. In this regard, the hook 1606 (e.g., FIG. 16A) of each clip 1604 (e.g., FIG. 16C) may be biased to engage the edge 1508 by the corresponding protrusion 1510. The at least one protrusion 1510 may include a surface 1516 that contacts groove 1800 (e.g., FIG. 18A) of the vessel 106. The groove 1800 of the vessel 106 may serve as a reference relative to the at least one protrusion 1510.

The first collar 1500 may include at least one interlocking member 1504 that is received by the at least one interlocking opening 1404 (e.g., FIG. 14C) of the adapter 1400. The at least one interlocking member 1504 may be lockable with at least one corresponding edge 1406 (e.g., FIG. 14C) of the at least one interlocking opening 1404.

The first collar 1500 may include at least one positioning member 1502 that is received by the at least one positioning opening 1402 (e.g., FIG. 14C) of the adapter 1400 to position the first collar 1500 relative to the adapter 1400.

Referring to FIGS. 14E and 15A-15C, the first collar 1500 may include the chamfered area 1506 that may engage with the tapered section 1420 to lift the first collar 1500 relative to the adapter 1450 upon rotation of the first collar 1500 relative to the adapter 1450. As disclosed herein, the lifting of the first collar 1500 relative to the adapter 1450 may further minimize movement of the vessel 106 relative to the vessel holder 1200.

As shown in FIG. 15A, the first collar 1500 may include the ribbed area 1514, where the at least one undercut 1616 (e.g., FIG. 16C) of the second collar 1600 may snap around the ribbed area 1514 to grip the first collar 1500.

Figures 16A, 16B, 16C:
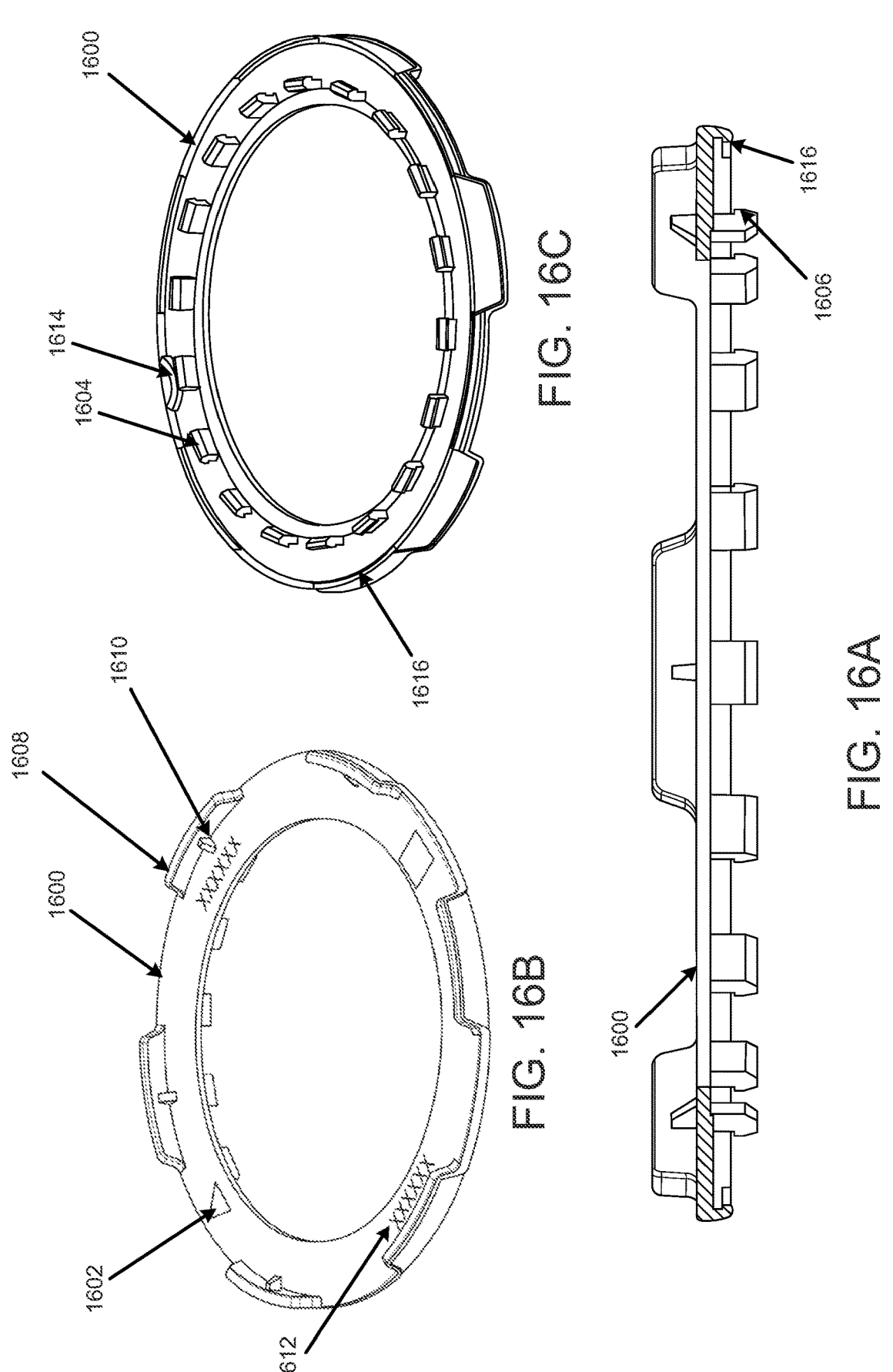
FIGS. 16A-16C illustrate isometric top and bottom, and side views of another example of the second collar, in accordance with an example of the present disclosure.

FIGS. 16A-16C illustrate isometric top and bottom, and side views of the second collar 1600, in accordance with an example of the present disclosure.

For the example of FIGS. 16A-16C, the second collar 1600 may include at least one clip 1604 to attach the second collar 1600 to the first collar 1500. In this regard, each clip 1604 may include a hook 1606 that may snap onto a corresponding edge 1508 (e.g., FIG. 15C) of the first collar 1500. The hook 1606 of each clip 1604 may be biased to engage the edge 1508 by a corresponding protrusion 1510 (e.g., FIG. 15C) that also contiguously engages the vessel 106.

The second collar 1600 may include at least one flange 1608 to facilitate gripping of the second collar 1600 to turn the second collar 1600 relative to the adapter 1400 (or the adapter 1450). In the example of FIGS. 16A-16C, six flanges are shown. However, the number and size of the flanges may be increased or decreased based on specific requirements for gripping of the second collar 1600.

The second collar 1600 may include at least one rib 1610 to facilitate positioning of another device that may attach onto the second collar 1600 and/or the vessel 106. For example, the at least one rib 1610 may facilitate positioning of another device such as an evaporation cover (not shown).

Referring to FIGS. 14C and 16B, the second collar 1600 may include the indicia 1602 that may indicate, based on a rotational location relative to indicia 1412 of the adapter 1400 (or the adapter 1450), whether the vessel 106 is locked or unlocked relative to the adapter 1400, and thus the vessel holder 1200. In this regard, the second collar 1600 may be rotated relative to the adapter 1400.

Referring to FIG. 16B, the second collar 1600 may include additional information 1612 printed thereon. For example, the additional information 1612 may include a brand name, unique serial number, unique code, etc., associated with the second collar 1600, the vessel 106, and/or other related components. In one example, the additional information 1612 may be laser marked. The additional information 1612 may also include information with respect to a specified collar or another component as disclosed herein that is usable with a particular vessel to facilitate assembly of a vessel mounting system, as well as to eliminate possible errors of component mismatch associated with the vessel mounting system.

Referring to FIGS. 16B and 16C, the second collar 1600 may include at least one positioning member 1614 to position the second collar 1600 relative to the first collar 1500. For example, the at least one positioning member 1614 may include a semi-circular profile that may fit within complementary semi-circular cutout 1512 (e.g., FIG. 15B) of the first collar 1500. In this regard, the second collar 1600 may be positioned relative to the first collar 1500 based on implementation of the positioning member 1614 that may orient the indicia 1602 and the information 1612 in a predetermined orientation relative to the vessel holder 1200.

With continued reference to FIGS. 16B and 16C, the second collar 1600 may include at least one undercut 1616 to snap around and retain the first collar 1500. In this regard, the at least one undercut 1616 may snap around ribbed area 1514 (e.g., FIG. 15A) of the first collar 1500. In the example of FIGS. 16A-16C, the second collar 1600 may include six undercuts. However, the number and size of the undercuts may be increased or decreased based on specific requirements for gripping of the first collar 1500.

Figures 17A, 17B, 17C:
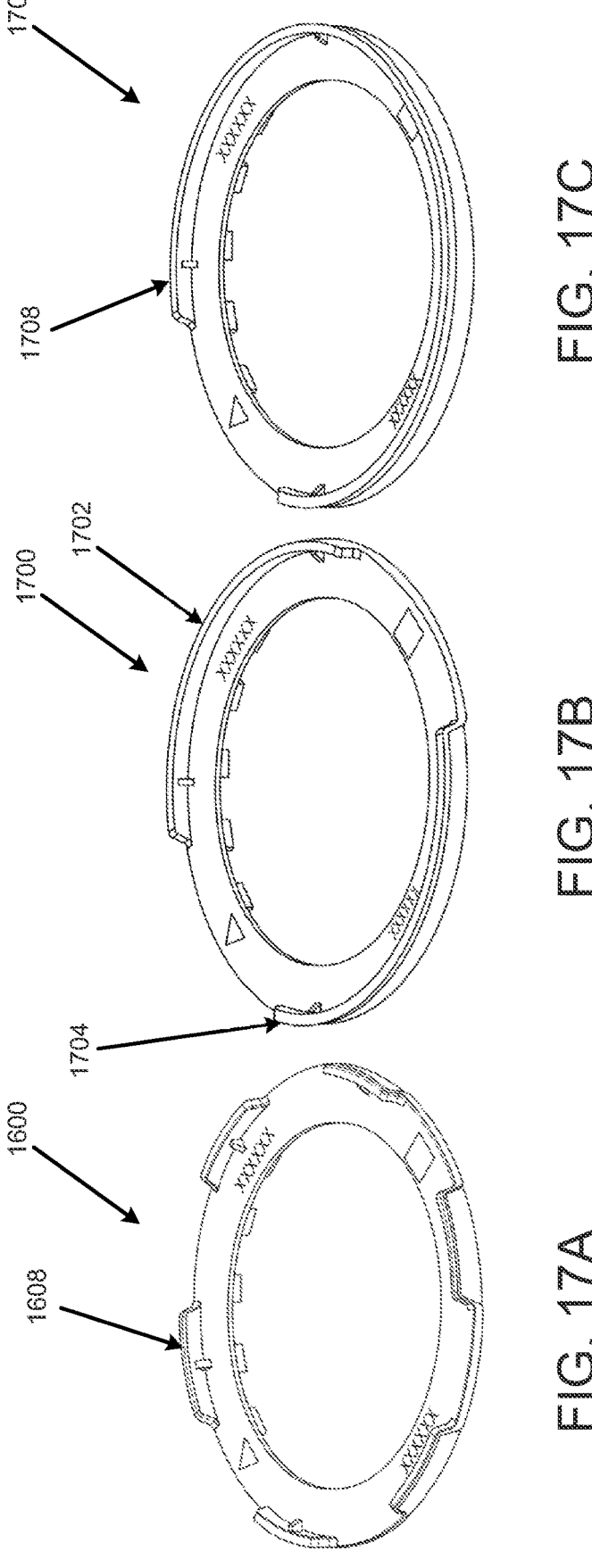
FIGS. 17A-17C illustrate isometric views of further examples of the second collar, in accordance with an example of the present disclosure.

FIGS. 17A-17C illustrate isometric views of further examples of the second collar 1600, in accordance with an example of the present disclosure.

Referring to FIGS. 16A-16C and 17A-17C, as disclosed herein, the second collar 1600 may include at least one flange 1608 to facilitate gripping of the second collar 1600 to turn the second collar 1600 relative to the adapter 1400. In the example of FIGS. 16A-16C, six flanges are shown. However, as shown in FIGS. 17B and 17C, the number and size of the flanges may be increased or decreased based on specific requirements for gripping of the second collar 1600. For example, compared to the example of FIG. 17A, which is also shown in FIGS. 16A-16C, for second collar 1700 of FIG. 17B, two relatively larger flanges 1702 and 1704 are shown. Similarly, for second collar 1706 of FIG. 17C, one relatively larger flange 1708 is shown.

FIGS. 18A-18C illustrate isometric, isometric cutout, and side views of the first collar, the second collar, and the vessel with respect to the examples of FIGS. 15A-15C and 16A-16C, illustrating alignment of the first collar and the second collar relative to the vessel, in accordance with an example of the present disclosure.

Referring to FIGS. 15A-15C and 18A-18C, the first collar 1500 may include the at least one protrusion 1510 that engages the vessel 106. In this regard, the at least one protrusion 1510 may include the surface 1516 that contacts the groove 1800 of the vessel 106. The groove 1800 of the vessel 106 may serve as a reference relative to the at least one protrusion 1510.

The groove 1800 may provide a surface that is concentric to the inner surface of the vessel 106. The groove 1800 may also be formed as an undercut or a step that sits on at least one extrusion of the first collar 102.

Referring to FIGS. 15A-15C, 16A-16C, and 18A-18C, the second collar 1600 may include at least one undercut 1616 to snap around and retain the first collar 1500. In this regard, the at least one undercut 1616 may snap around ribbed area 1514 of the first collar 1500.

FIG. 19 illustrates assembly views of a vessel and the first and second collars of FIGS. 18A-18C, in accordance with an example of the present disclosure.

Referring to FIG. 19, at 1900, the vessel 106 may be placed upside down on a flat surface in the orientation of FIG. 19.

At 1902, the first collar 1500 may be placed onto the vessel 106.

At 1904, the first collar 1500 may snap onto the groove 1800 of the vessel 106.

At 1906, the second collar 1600 may be placed on a mounting tool (not shown) in the orientation of FIG. 19, and a seal 1908 may be applied.

At 1910, the vessel 106 with the first collar 1500 may be placed onto the second collar 1600 (still on the mounting tool), and pressed downwards in the orientation of FIG. 19 until each clip 1604 (FIG. 16C) engages the edge 1508 (FIG. 15C) to lock the first collar 1500 to the second collar 1600.

FIG. 20 illustrates isometric views of different configurations of the first and second collars of FIGS. 15A-15C and 16A-16C for different vessel sizes, in accordance with an example of the present disclosure.

Referring to FIG. 20, compared to the examples of FIGS. 14C-19 that are to be utilized for vessels of relative large volume (e.g., 1 L), the examples of FIG. 20 may be utilized for vessels of relative smaller volume (e.g., less than 1 L). For example, vessel assembly 2000 may represent a 250 mL small volume vessel assembly with second collar 2200 (e.g., FIG. 22B) and vessel 2002.

Vessel assembly 2004 may represent, for example, a 100/200 mL small volume vessel assembly with second collar 2400 (e.g., FIG. 24B) and vessel 2006.

Vessel assembly 2008 may represent, for example, a 100/200 mL small volume vessel assembly with a 1 L collar (e.g., the second collar 1600), collar adapters 2600 and 2602 (e.g., FIGS. 26E-26F), and the vessel 2006.

Vessel assembly 2010 may represent, for example, a 250 mL small volume vessel assembly with a 1 L collar (e.g., the second collar 1600), collar adapters 2800 and 2802 (e.g., FIGS. 28E-28F), and the vessel 2002.

FIGS. 21A-21D illustrate isometric, top, bottom, and isometric cutout views of another example of the first collar for a relatively small volume vessel, in accordance with an example of the present disclosure.

Referring to FIGS. 20 and 21A-21D, with respect to the vessel assemblies 2000 and 2004, these vessel assemblies may include a common first collar 2100. For example, the first collar 2100 may be utilized for both 100/200 mL and 250 mL sized vessels.

Referring to FIGS. 20, 21A-21D, and 22A-22C, the first collar 2100 may include at least one flexible member 2112 engageable with a groove of a vessel 2002 to align the first collar 2100 relative to the vessel 2002. Further, a second collar 2200 may include at least one clip 2208 engageable with a complementary clip 2116 of the first collar to engage the second collar 2200 with the first collar 2100.

Referring to FIGS. 21A-21D, 22A-22C, and 24A-24F, the first collar 2100 may include semi-circular cutout 2102 (e.g., similar to semi-circular cutout 1512 of the first collar 1500) that may receive at least one positioning member (e.g., similar to positioning member 1614 of second collar 1600) of the second collars 2200 and 2400 to rotationally orient the first collar 2100 relative to the second collar (e.g., the second collars 2200 and 2400). The engagement of the at least one positioning member within the semi-circular cutout 2102 may position the second collars 2200 and 2400 relative to the first collar 2100 to orient the indicia 2202 (e.g., FIG. 22B), the indicia 2402 (e.g., FIG. 24B), the information 2204 (e.g., FIG. 22B), and the information 2404 (e.g., FIG. 24B) in a predetermined orientation relative to a vessel holder, such as the vessel holder 1200 (e.g., FIG. 12A). Thus, the second collar 2200 may include the indicia 2202 to indicate a locked or unlocked status of the second collar 2200 relative to further indicia 1412 (e.g., FIG. 14C) on the adapter 1400.

Referring to FIGS. 14C and 21A-21D, the first collar 2100 may include at least one positioning member 2104 (similar to positioning member 1502 of the first collar 1500) that is received by the at least one positioning opening 1402 (e.g., FIG. 14C) of the adapter 1400 to position the first collar 2100 relative to the adapter 1400.

With continued reference to FIGS. 14C and 21A-21D, the first collar 2100 may include at least one interlocking member 2106 (similar to interlocking member 1504 of the first collar 1500) that is received by the at least one interlocking opening 1404 (e.g., FIG. 14C) of the adapter 1400. The at least one interlocking member 2106 may be lockable with at least one corresponding edge 1406 (e.g., FIG. 14C) of the at least one interlocking opening 1404.

Referring to FIGS. 14E, 20, and 21A-21D, the first collar 2100 may include chamfered area 2108 (similar to the chamfered area 1506 of the first collar 1500) that may engage with the tapered section 1420 to lift the first collar 2100 relative to the adapter 1450 upon rotation of the first collar 2100 relative to the adapter 1450. The lifting of the first collar 2100 relative to the adapter 1450 may further minimize movement of the vessel 2002 or 2006 relative to the vessel holder 1200 (e.g., FIG. 12A).

Referring to FIGS. 21A-21D, 22A-22C, and 24A-24F, the first collar 2100 may include at least one spring loaded finger 2110 to push the vessel 2002 or adapter ring 2406 (e.g., FIG. 24F) against a seal and second collars 2200 or 2400. The at least one spring loaded finger 2110 may be biased as shown in FIG. 21A to push the vessel 2002 or the adapter ring 2406 (e.g., FIG. 24F) against a seal and second collars 2200 or 2400. Thus, the at least one finger 2110 may be engageable with the vessel 2002 to push the vessel towards the second collar.

Referring to FIGS. 21A-21D, the first collar 2100 may include at least one flexible member 2112 to align the 250 mL vessel 2002 or adapter ring 2406 for a 100/200 mL vessel 2006 concentrically. The flexible member 2112 may also lock the adapter ring 2406 as described in further detail.

Referring to FIG. 21D, the first collar 2100 may include the ribbed area 2114 (similar to ribbed area 1514 of first collar 1500 of FIG. 15A), where at least one undercut 2206 (e.g., FIG. 22A; similar to undercut 1616 of the second collar 1600 of FIG. 16C) of the second collar 2200 may snap around (e.g., engage with) the ribbed area 2114 to grip the first collar 2100.

FIGS. 22A-22C illustrate side cutout, isometric and side views of the first collar of FIGS. 21A-21D and one of the second collars of FIG. 20 installed onto a relatively small volume vessel, in accordance with an example of the present disclosure. FIG. 22A illustrates an enlarged side cutout view of an assembly of the components of FIG. 22B.

Referring to FIGS. 20 and 22A-22C, the vessel assembly 2000 may represent a 250 mL small volume vessel assembly with second collar 2200 and vessel 2002. As shown in FIG. 22A, the second collar 2200 may include the at least one undercut 2206 that may snap around the ribbed area 2114 of the first collar 2100 to grip the first collar 2100. In some examples, the undercut 2206 may be referred to as an outer clipping geometry or an outer clip.

The second collar 2200 may include at least one inner clip 2208 (also denoted inner clipping geometry) that engages complementary clip 2116 of the first collar 2100.

A seal 2210 may be provided between a body of the vessel 2002 and the second collar 2200.

FIGS. 23A-23D illustrate installment stages of the first collar of FIGS. 21A-21D and one of the second collars of FIG. 20, for installment onto a relatively small volume vessel, in accordance with an example of the present disclosure.

Figures 23A, 23B, 23C, 23D:
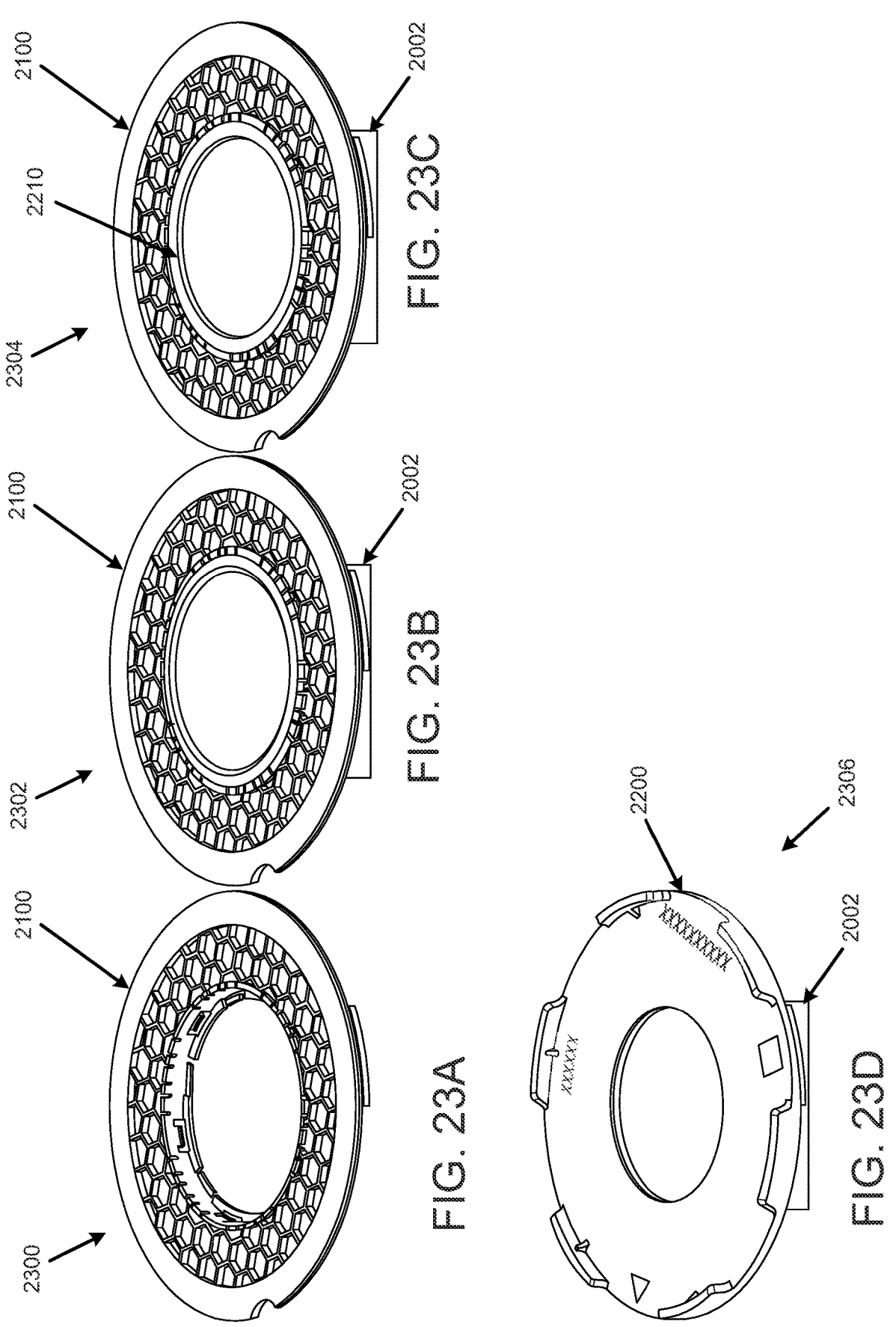

Referring to FIGS. 23A-23D, at 2300, the first collar 2100 may be oriented as shown in FIG. 23A.

At 2302, the first collar 2100 may be attached onto the vessel 2002. In this regard, the at least one flexible member 2112 of the first collar 2100 may align the vessel 2002 concentrically.

At 2304, the seal 2210 may be placed onto a rim of the vessel 2002.

At 2306, the second collar 2200 may be attached onto the first collar 2100, and thus to the vessel 2002. In this regard, the at least one spring loaded finger 2110 of the first collar 2100 may push the vessel 2002 against seal 2210 and the second collar 2200. The at least one undercut 2206 (e.g., FIG. 22A) of the second collar 2200 may snap around the ribbed area 2114 to grip the first collar 2100. Further, the at least one inner clip 2208 may engage complementary clip 2116 of the first collar 2100.

FIGS. 24A-24F illustrate side cutout, isometric and side views of the first collar of FIGS. 21A-21D, one of the second collars of FIG. 20, and a ring installed onto a relatively small volume vessel, in accordance with an example of the present disclosure. FIG. 24A illustrates an enlarged side cutout view of an assembly of the components of FIGS. 24B and 24C. Further, FIG. 24D illustrates a side cutout view of an assembly of the components of FIGS. 24B and 24C.

Referring to FIGS. 24A-24F, compared to the vessel 2002 that may represent a 250 mL small volume vessel, the vessel 2006 may represent a 100/200 mL small volume vessel. Other than the utilization of the adapter ring 2406, the remaining functionality of the first collar 2100 and the second collar 2400 as shown in FIGS. 24A-24F may be identical to the respective functionality of the first collar 2100 and the second collar 2200 as shown in FIGS. 22A-22C. In this regard, the flexible member 2112 (e.g., FIGS. 21D and 24E) may also lock the adapter ring 2406 by engagement of the flexible member 2112 with an edge 2408 of the adapter ring 2406. Further, the at least one spring loaded finger 2110 may push the adapter ring 2406 (e.g., FIG. 24A) against the second collar 2400.

The adapter ring 2406 may further include at least one clip 2410 that engages a groove 2412 of the vessel 2006 to retain the adapter ring 2406 relative to the vessel 2006.

Thus, with respect to the functionality of the adapter ring 2406, referring to FIGS. 21A-21D, 22A-22C, and 24A-24F, the first collar 2100 may include a specified opening diameter 2118 for the vessel 2002 that includes a specified diameter 2212. Further, the at least one flexible member 2112 may be engageable with the adapter ring 2406 to permit engagement of the first collar with another vessel (e.g., vessel 2006) that includes a diameter 2416 that is less than the specified diameter 2212.

FIGS. 25A-25D illustrate installment stages of the first collar and the adapter ring of FIGS. 24A-24C, and one of the second collars of FIG. 20, for installment onto a relatively small volume vessel, in accordance with an example of the present disclosure.

Referring to FIGS. 25A-25D, at 2500, the first collar 2100 may be oriented as shown in FIG. 25A. Further, the adapter ring 2406 may be installed onto the first collar 2100 as disclosed herein with respect to FIGS. 24A-24F.

At 2502, the first collar 2100 and the adapter ring 2406 may be attached onto the vessel 2006.

At 2504, a seal 2414 (similar to the seal 2210 of FIG. 22A) may be placed onto a rim of the vessel 2006.

At 2506, the second collar 2400 may be attached onto the first collar 2100, and thus to the vessel 2006 as disclosed herein with respect to FIGS. 24A-24F.

Figures 26A, 26B, 26C, 26D, 26E, 26F, 26G:
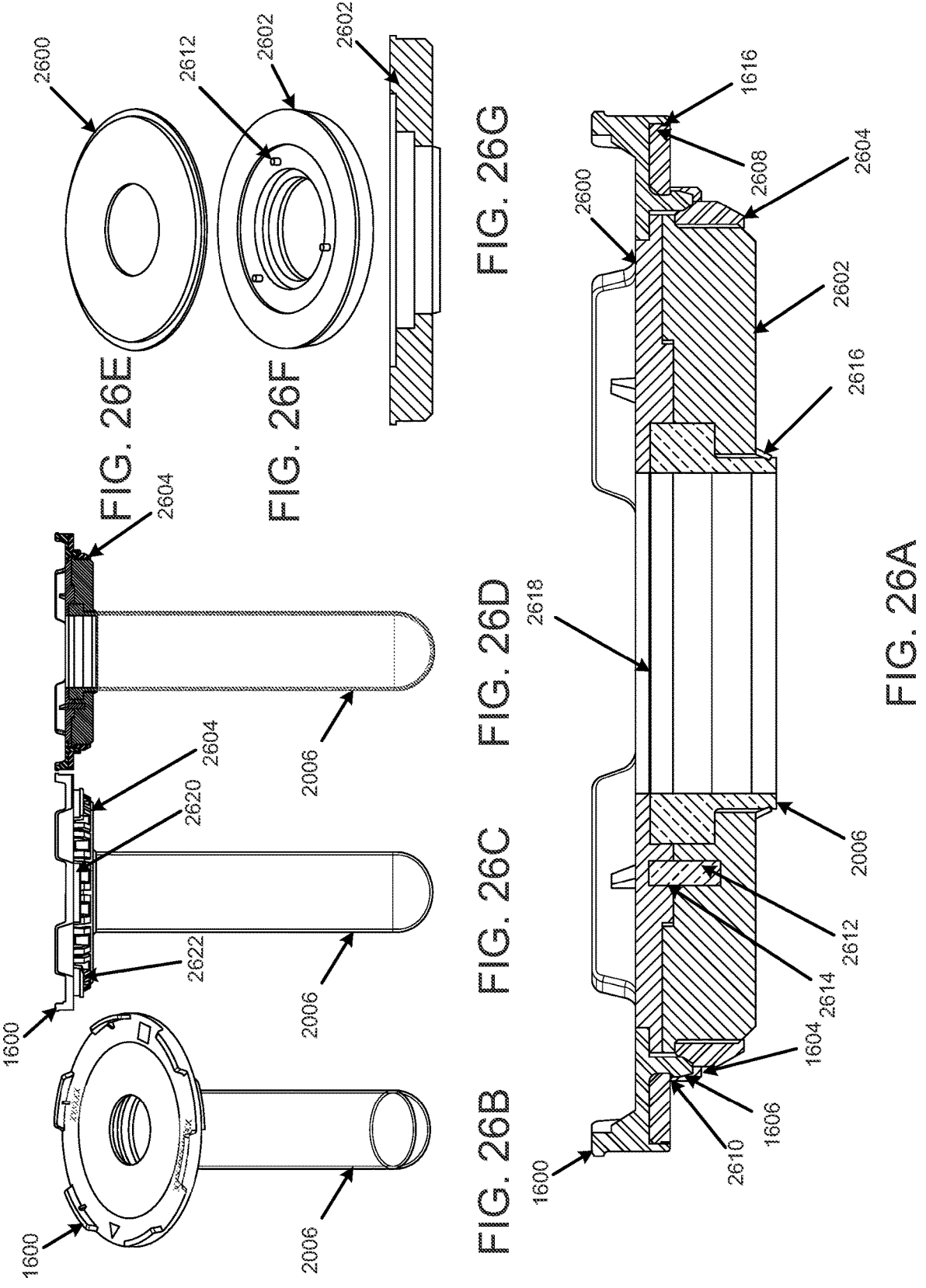

FIGS. 26A-26G illustrate side cutout, isometric and side views of another example of a first collar, one of the second collars of FIG. 20, and an example of a collar adapter installed onto a relatively small volume vessel, in accordance with an example of the present disclosure. FIG. 26A illustrates an enlarged side cutout view of an assembly of the components of FIGS. 26B and 26C. FIG. 26D illustrates a side cutout view of an assembly of the components of FIGS. 26B and 26C. Further, FIG. 26G illustrates a side cutout view of the collar adapter of FIG. 26F.

Referring to FIGS. 20 and 26A-26G, the vessel assembly 2008 may represent a 100/200 mL small volume vessel assembly with a 1 L collar (e.g., the second collar 1600), collar adapters 2600 and 2602 (e.g., FIGS. 26E-26F), and the vessel 2006.

As disclosed herein with respect to FIGS. 16A-16C and 18A-18C, the second collar 1600 may include at least one undercut 1616 to snap around and retain first collar 2604. The first collar 2604 may include a ribbed area 2608 (similar to ribbed area 1514 (e.g., FIG. 15A) of the first collar 1500), where the at least one undercut 1616 may snap around the ribbed area 2608. In the example of FIGS. 26A-26G, the second collar 1600 may include six undercuts. However, the number and size of the undercuts may be increased or decreased based on specific requirements for gripping of the first collar 2604.

Referring again to FIGS. 20 and 26A-26G, the first collar 2604 may include a cutout (similar to cutout 1512 of FIG. 15B) to receive a complementary shaped positioning member (similar to positioning member 1614 of FIG. 16C) of the second collar 1600 to rotationally orient the first collar 2604 relative to the second collar 1600.

The first collar 2604 may include at least one positioning member 2620 to position the first collar 2604 relative to an adapter such as the adapter 1400 of FIG. 14C. The at least one positioning member 2620 may be insertable in at least one corresponding positioning opening 1402 of the adapter 1400.

The first collar 2604 may include at least one interlocking member 2622 to lock the first collar to an adapter. The at least one interlocking member 2622 may be insertable in at least one corresponding interlocking opening 1404 of the adapter 1400. Further, the at least one interlocking member 2622 may be lockable with at least one corresponding edge 1406 of the at least one corresponding interlocking opening 1404.

As also disclosed herein with respect to FIGS. 16A-16C, the second collar 1600 may include at least one clip 1604 to attach the second collar 1600 to the first collar 2604. In this regard, each clip 1604 may include a hook 1606 that may snap onto a corresponding edge 2610 (similar to edge 1508 (e.g., FIG. 15C) of the first collar 1500) of the first collar 2604. The hook 1606 of each clip 1604 may be biased to engage the edge 2610 by a corresponding protrusion (e.g., such as protrusion 1510 (e.g., FIG. 15C)). In one example, the protrusion may also contiguously engage the collar adapters 2600 and 2602.

Referring to FIGS. 26A and 26E-26G, the collar adapters 2600 and 2602 (e.g., FIGS. 26E-26F), which may also be respectively denoted as a conversion cover and a conversion ring, may be utilized to adapt the first collar 2604 and the second collar 1600 to the vessel 2006. The collar adapter 2600 may be disposed as shown in FIG. 26A to contiguously engage with the collar adapter 2602. In this regard, at least one dowel pin 2612 may be provided in the collar adapter 2602 to engage in at least one complementary hole 2614 of the collar adapter 2600.

Thus, with respect to the collar adapter 2600, the first collar may include a specified opening diameter 2716 (e.g., FIG. 27E) for a vessel 106 that includes a specified diameter (e.g., diameter 110 of FIG. 1A). The collar adapter 2602 may be engageable with the first collar and/or the second collar to retain another vessel (e.g., vessel 2006) that includes a diameter 2718 (e.g., FIG. 27B) that is less than the specified diameter. The collar adapter 2602 may include a flexible portion (e.g., flexible machined shape 2616) for concentric alignment of the another vessel (e.g., vessel 2006). Further, the collar adapter 2602 may represent a first collar adapter, and a second collar adapter 2600 may be engageable with the first collar adapter 2602 by at least one alignment member (e.g., dowel pin 2612) to seal a portion of the another vessel.

As shown in FIG. 26A, the collar adapter 2602 may include a flexible machined shape 2616 for concentric alignment of the vessel 2006. The flexible machined shape 2616 may also prevent the vessel 2006 from falling out of the collar adapter 2602 during assembly.

FIGS. 27A-27G illustrate installment stages of the first collar and the collar adapter of FIGS. 26A-26G, and one of the second collars of FIG. 20, for installment onto a relatively small volume vessel, in accordance with an example of the present disclosure.

Referring to FIGS. 27A-27G, at 2700, the collar adapter 2602 may be oriented as shown in FIG. 27A.

At 2702, the collar adapter 2602 may be attached to the vessel 2006 as disclosed herein with respect to FIGS. 26A-26G.

At 2704, a seal 2618 (e.g., see FIG. 26A) may be placed onto a rim of the vessel 2006.

At 2706, the collar adapter 2600 may be installed onto the collar adapter 2602.

At 2708, the first collar 2604 may be installed onto the collar adapter 2602.

At 2710, a seal 2712 may be placed onto the collar adapter 2600.

At 2714, the second collar 1600 may be attached onto the first collar 2604.

Figures 28A, 28B, 28C, 28D, 28E, 28F, 28G:
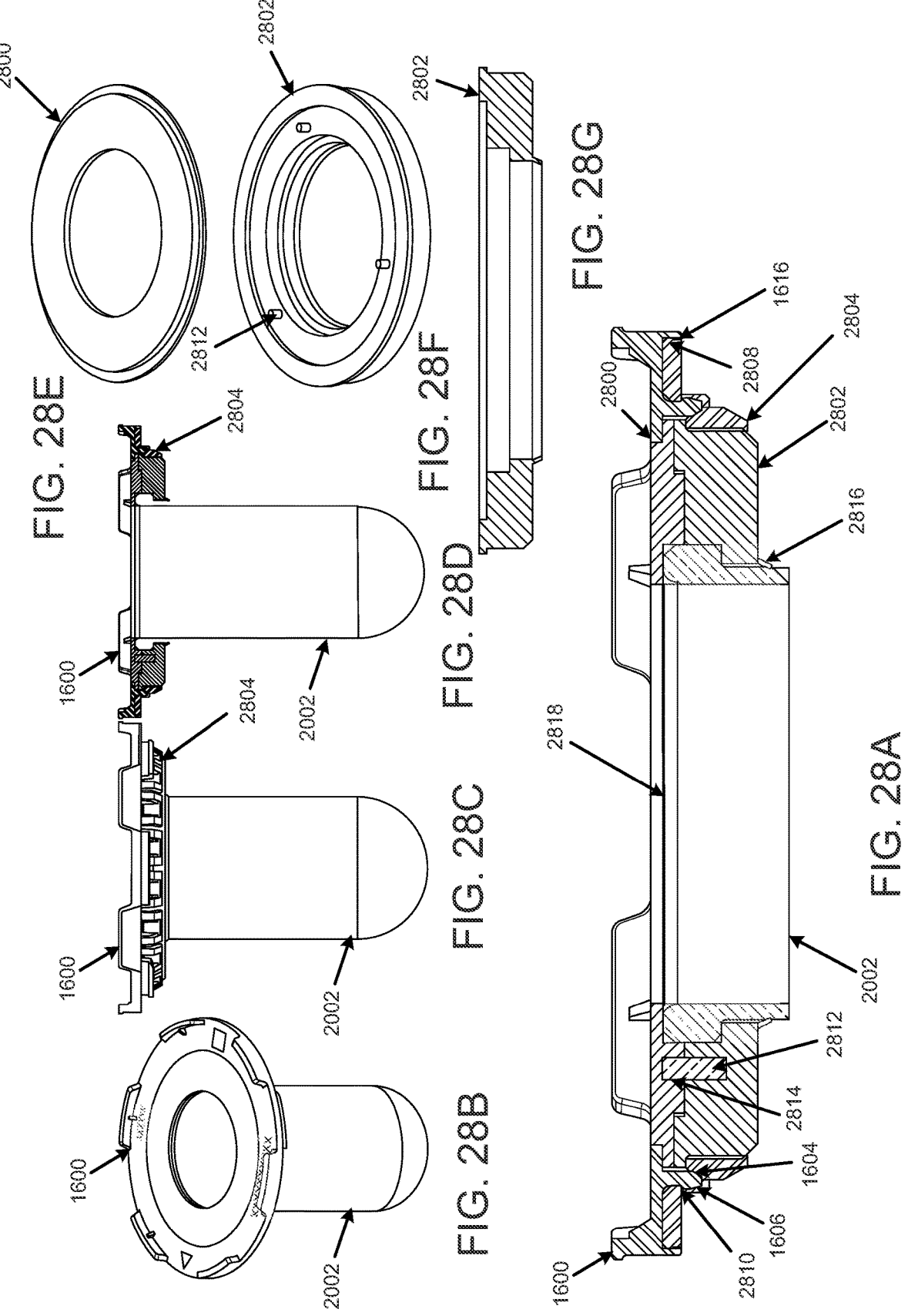

FIGS. 28A-28G illustrate side cutout, isometric and side views of another example of a first collar, one of the second collars of FIG. 20, and another example of a collar adapter installed onto a relatively small volume vessel, in accordance with an example of the present disclosure. FIG. 28A illustrates an enlarged side cutout view of an assembly of the components of FIGS. 28B and 28C. FIG. 28D illustrates a side cutout view of an assembly of the components of FIGS.

28B and 28C. Further, FIG. 28G illustrates a side cutout view of the collar adapter of FIG. 28F.

Referring to FIGS. 20 and 28A-28G, the vessel assembly 2008 may represent a 250 mL small volume vessel assembly with a 1 L collar (e.g., the second collar 1600), collar adapters 2800 and 2802 (e.g., FIGS. 28E-28F), and the vessel 2002.

As disclosed herein with respect to FIGS. 16A-16C and 18A-18C, the second collar 1600 may include at least one undercut 1616 to snap around and retain first collar 2804. The first collar 2804 may include a ribbed area 2808 (similar to ribbed area 1514 (e.g., FIG. 15A) of the first collar 1500), where the at least one undercut 1616 may snap around the ribbed area 2808. In the example of FIGS. 28A-28G, the second collar 1600 may include six undercuts. However, the number and size of the undercuts may be increased or decreased based on specific requirements for gripping of the first collar 2804.

As also disclosed herein with respect to FIGS. 16A-16C, the second collar 1600 may include at least one clip 1604 to attach the second collar 1600 to the first collar 2804. In this regard, each clip 1604 may include a hook 1606 that may snap onto a corresponding edge 2810 (similar to edge 1508 (e.g., FIG. 15C) of the first collar 1500) of the first collar 2804. The hook 1606 of each clip 1604 may be biased to engage the edge 2810 by a corresponding protrusion (e.g., such as protrusion 1510 (e.g., FIG. 15C)). In one example, the protrusion may also contiguously engage the collar adapters 2800 and 2802.

Referring to FIGS. 28A and 28E-28G, the collar adapters 2800 and 2802 (e.g., FIGS. 28E-28F), which may also be respectively denoted as a conversion cover and a conversion ring, may be utilized to adapt the first collar 2804 and the second collar 1600 to the vessel 2002. The collar adapter 2800 may be disposed as shown in FIG. 28A to contiguously engage with the collar adapter 2802. In this regard, at least one dowel pin 2812 may be provided in the collar adapter 2802 to engage in at least one complementary hole 2814 of the collar adapter 2800.

As shown in FIG. 28A, the collar adapter 2802 may include a flexible machined shape 2816 for concentric alignment of the vessel 2002. The flexible machined shape 2816 may also prevent the vessel 2002 from falling out of the collar adapter 2802 during assembly.

FIGS. 29A-29G illustrate installment stages of the first collar and the collar adapter of FIGS. 28A-28G, and one of the second collars of FIG. 20, for installment onto a relatively small volume vessel, in accordance with an example of the present disclosure.

Figures 29A, 29B, 29C, 29D, 29E, 29F, 29G:
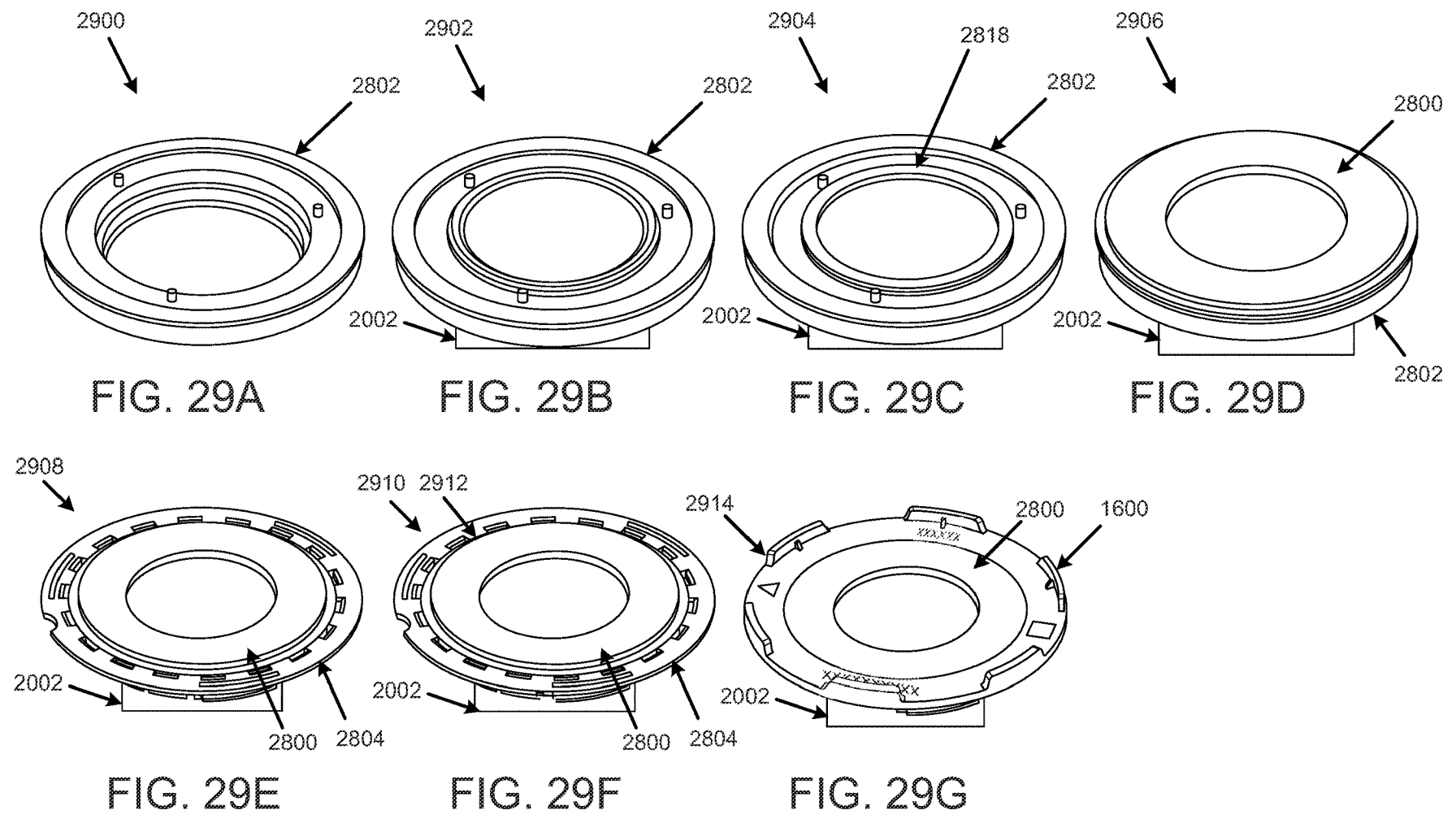

Referring to FIGS. 29A-29G, at 2900, the collar adapter 2802 may be oriented as shown in FIG. 29A.

At 2902, the collar adapter 2802 may be attached to the vessel 2002 as disclosed herein with respect to FIGS. 28A-28G.

At 2904, a seal 2818 (e.g., see FIG. 28A) may be placed onto a rim of the vessel 2002.

At 2906, the collar adapter 2800 may be installed onto the collar adapter 2802.

At 2908, the first collar 2804 may be installed onto the collar adapter 2802.

At 2910, a seal 2912 may be placed onto the collar adapter 2800.

At 2914, the second collar 1600 may be attached onto the first collar 2804.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A vessel mounting system comprising:
a first collar and a second collar,
wherein the second collar includes a clip engageable with an edge of the first collar to engage the second collar with the first collar,
wherein the second collar includes at least one undercut that is configured to engage with a ribbed area of the first collar, and
wherein the ribbed area is configured to protrude radially outwardly from the first collar.

2. The vessel mounting system according to claim 1, wherein the second collar includes indicia to indicate a locked or unlocked status of the second collar relative to further indicia on an adapter.

3. The vessel mounting system according to claim 1, wherein the first collar includes a cutout to receive a complementary shaped positioning member of the second collar to rotationally orient the first collar relative to the second collar.

4. The vessel mounting system according to claim 1, wherein the first collar includes at least one positioning member to position the first collar relative to an adapter.

5. The vessel mounting system according to claim 4, wherein the at least one positioning member is insertable in at least one corresponding positioning opening of the adapter.

6. The vessel mounting system according to claim 1, wherein the first collar includes at least one interlocking member to lock the first collar to an adapter.

7. The vessel mounting system according to claim 6,
wherein the at least one interlocking member is insertable in at least one corresponding interlocking opening of the adapter, and
wherein the at least one interlocking member is lockable with at least one corresponding edge of the at least one corresponding interlocking opening.

8. The vessel mounting system according to claim 1, wherein the first collar includes a specified opening diameter for a vessel that includes a specified diameter, further comprising:
a collar adapter engageable with at least one of the first collar or the second collar to retain another vessel that includes a diameter that is less than the specified diameter.

9. The vessel mounting system according to claim 8, wherein the collar adapter includes a flexible portion for concentric alignment of the another vessel.

10. The vessel mounting system according to claim 8, wherein the collar adapter is a first collar adapter, further comprising a second collar adapter that is configured to engage the first collar adapter through the use of at least one alignment member to seal a portion of the another vessel.

11. A vessel mounting system comprising:
a first collar and a second collar, wherein the first collar includes a specified opening diameter for a vessel that includes a specified diameter; and
a collar adapter comprising an outermost circumference that is disposed within a boundary formed by an external diameter of at least one of the first collar or the second collar, and
engageable with at least one of the first collar or the second collar to retain another vessel that includes a diameter that is less than the specified diameter.

12. The vessel mounting system according to claim 11, wherein the second collar includes a clip engageable with an edge of the first collar to engage the second collar with the first collar.

13. The vessel mounting system according to claim 11, wherein the second collar includes indicia to indicate a locked or unlocked status of the second collar relative to further indicia on an adapter.

14. The vessel mounting system according to claim 11, wherein the first collar includes a cutout to receive a complementary shaped positioning member of the second collar to rotationally orient the first collar relative to the second collar.

15. The vessel mounting system according to claim 11,
wherein the first collar includes at least one positioning member to position the first collar relative to an adapter, and
wherein the at least one positioning member is insertable in at least one corresponding positioning opening of the adapter.

16. The vessel mounting system according to claim 11,
wherein the first collar includes at least one interlocking member to lock the first collar to an adapter,
wherein the at least one interlocking member is insertable in at least one corresponding interlocking opening of the adapter, and
wherein the at least one interlocking member is lockable with at least one corresponding edge of the at least one corresponding interlocking opening.

17. The vessel mounting system according to claim 11, wherein the second collar includes at least one undercut engageable with a ribbed area of the first collar to grip the first collar.

18. A vessel mounting system comprising:
a first collar and a second collar, wherein the first collar includes a specified opening diameter for a vessel that includes a specified diameter; and
a collar adapter comprising an outermost circumference that is disposed within a boundary formed by an external diameter of at least one of the first collar or the second collar, and engageable with at least one of the first collar or the second collar and including a flexible portion for concentric alignment of another vessel that includes a diameter that is less than the specified diameter.

19. The vessel mounting system according to claim 18, wherein the collar adapter is a first collar adapter, further comprising a second collar adapter that is configured to engage the first collar adapter through the use of at least one alignment member to seal a portion of the another vessel.

* * * * *